United States Patent
Ode

(10) Patent No.: US 10,194,384 B2
(45) Date of Patent: *Jan. 29, 2019

(54) WIRELESS COMMUNICATION SYSTEM, BASE STATION, AND TERMINAL

(71) Applicant: FUJITSU LIMITED, Kawasaki-shi, Kanagawa (JP)

(72) Inventor: Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 66 days.

This patent is subject to a terminal disclaimer.

(21) Appl. No.: 15/287,275

(22) Filed: Oct. 6, 2016

(65) Prior Publication Data

US 2017/0026904 A1 Jan. 26, 2017

Related U.S. Application Data

(63) Continuation of application No. PCT/JP2014/060875, filed on Apr. 16, 2014.

(51) Int. Cl.
*H04W 48/18* (2009.01)
*H04W 76/15* (2018.01)
(Continued)

(52) U.S. Cl.
CPC .............. *H04W 48/18* (2013.01); *H04L 5/00* (2013.01); *H04W 48/12* (2013.01); *H04W 72/02* (2013.01);
(Continued)

(58) Field of Classification Search
CPC ..... H04W 36/0005–36/0016; H04W 36/0055; H04W 36/0061; H04W 36/0077;
(Continued)

(56) References Cited

U.S. PATENT DOCUMENTS 5,546,443 A 8/1996 Raith
9,106,380 B2 8/2015 Baldemair et al.
(Continued)

FOREIGN PATENT DOCUMENTS

JP H-07-509826 A 10/1995
JP 2007-535205 A 11/2007
(Continued)

OTHER PUBLICATIONS

MediaTek Inc., Handover with Carrier Aggregation, 3GPP TSG-RAN WG2#70, May 10-14, Montreal, Canada.
(Continued)

*Primary Examiner* — Pao Sinkantarakorn
(74) *Attorney, Agent, or Firm* — Arent Fox LLP

(57) ABSTRACT

A wireless communication system includes a terminal configured to perform wireless communication concurrently using a cell of a first type enabling connection without association with another cell and a cell of a second type enabling connection by being associated with the cell of the first type; and a base station configured to form a first cell of the second type and when detecting that the terminal selects the first cell for the cell of the first type, the base station notifies the terminal of a second cell of the first type different from the first cell so as to allow the terminal to change connection to the second cell.

12 Claims, 27 Drawing Sheets

(51) Int. Cl.
*H04W 48/12* (2009.01)
*H04W 72/02* (2009.01)
*H04L 5/00* (2006.01)
H04W 88/06 (2009.01)
H04W 36/00 (2009.01)

(52) U.S. Cl.
CPC ........ *H04W 76/15* (2018.02); *H04W 36/0061* (2013.01); *H04W 88/06* (2013.01)

(58) Field of Classification Search
CPC . H04W 36/0083; H04W 36/04–36/08; H04W 36/38
See application file for complete search history.

(56) References Cited

U.S. PATENT DOCUMENTS

| | | |
|---|---|---|
| 9,801,144 B2 | 10/2017 | Luo et al. |
| 2008/0108353 A1 | 5/2008 | Lee et al. |
| 2008/0220784 A1 | 9/2008 | Somasundaram et al. |
| 2009/0042572 A1 | 2/2009 | Craig et al. |
| 2009/0274086 A1 | 11/2009 | Petrovic et al. |
| 2010/0022250 A1 | 1/2010 | Petrovic et al. |
| 2011/0201367 A1 | 8/2011 | Aminaka et al. |
| 2012/0040696 A1 | 2/2012 | Siomina et al. |
| 2012/0044910 A1 | 2/2012 | Maeda et al. |
| 2012/0088516 A1 | 4/2012 | Ji et al. |
| 2012/0094711 A1 | 4/2012 | Lee et al. |
| 2012/0100854 A1 | 4/2012 | Hanaoka |
| 2012/0113839 A1 | 5/2012 | Etemad |
| 2012/0201226 A1 | 8/2012 | Sambhwani et al. |
| 2012/0250578 A1 | 10/2012 | Pani et al. |
| 2012/0281602 A1 | 11/2012 | Tsunekawa |
| 2013/0022026 A1 | 1/2013 | Ishii et al. |
| 2013/0107826 A1 | 5/2013 | Dinan |
| 2013/0114472 A1 | 5/2013 | Tamaki et al. |
| 2013/0114568 A1 | 5/2013 | Sagae et al. |
| 2013/0130682 A1 | 5/2013 | Awad et al. |
| 2013/0182583 A1 | 7/2013 | Siomina et al. |
| 2013/0188473 A1 | 7/2013 | Dinan |
| 2013/0258895 A1 | 10/2013 | Kim et al. |
| 2013/0301565 A1 | 11/2013 | Xu et al. |
| 2013/0303168 A1 | 11/2013 | Aminzadeh Gohari et al. |
| 2013/0336296 A1 | 12/2013 | Dinan |
| 2014/0112300 A1 | 4/2014 | Han et al. |
| 2014/0274095 A1 | 9/2014 | Saito |
| 2014/0301301 A1 | 10/2014 | Cheng et al. |
| 2014/0378126 A1 | 12/2014 | Uchino et al. |
| 2015/0063148 A1 | 3/2015 | Sadek |
| 2015/0092750 A1* | 4/2015 | Huang ................. H04W 36/08 370/331 |
| 2015/0124743 A1* | 5/2015 | Damnjanovic ..... H04W 76/025 370/329 |
| 2015/0146692 A1* | 5/2015 | Yi ........................ H04W 36/24 370/331 |
| 2015/0215926 A1 | 7/2015 | Huang et al. |
| 2015/0223149 A1 | 8/2015 | Liu et al. |
| 2015/0223212 A1 | 8/2015 | Der Velde et al. |
| 2015/0319754 A1 | 11/2015 | Ishida et al. |
| 2015/0319800 A1 | 11/2015 | Park et al. |
| 2015/0373767 A1 | 12/2015 | Park et al. |
| 2016/0081036 A1 | 3/2016 | Luo et al. |
| 2017/0026965 A1 | 1/2017 | Ode |

FOREIGN PATENT DOCUMENTS

| | | |
|---|---|---|
| JP | 2008-118404 A | 5/2008 |
| JP | 2008-543217 A | 11/2008 |
| JP | 2010-506446 A | 2/2010 |
| JP | 2010-521119 A | 6/2010 |
| JP | 2010-263449 A | 11/2010 |
| JP | 2011-515941 A | 5/2011 |
| JP | 2011-124732 A | 6/2011 |
| JP | 2012-005084 A1 | 1/2012 |
| JP | 2013-042259 A | 2/2013 |
| JP | 2013-078061 A | 4/2013 |
| JP | 2013-526155 A | 6/2013 |
| JP | 2013-162327 A | 8/2013 |
| JP | 2013-532913 A | 8/2013 |
| JP | 2013-183366 A | 9/2013 |
| WO | WO 2010/061503 A1 | 6/2010 |
| WO | WO 2010-125769 A | 11/2010 |
| WO | WO-2010/134202 A1 | 11/2010 |
| WO | WO-2011/087022 A1 | 7/2011 |
| WO | WO 2011/099634 A1 | 8/2011 |
| WO | WO-2013/140533 A1 | 9/2013 |
| WO | WO 2014/020903 A1 | 2/2014 |

OTHER PUBLICATIONS

International Search Report of International Patent Application No. PCT/JP2014/060875 dated Jul. 15, 2014. 1 Total Page.

Fujitsu, Consideration on efficient discovery of small cell, 3GPP TSG RAN WG1, Meeting #72bis, R1-131100, Chicago, US, URL:http://www.3gpp.org/ftp/tsg_ran/WG1_RL1/TSGR1_72b/Docs/R1-131100.zip, Apr. 15-19, 2013.

International Search Report of related International Patent Application No. PCT/JP2014/060035 dated Jul. 8, 2014.

Japanese Office Action of related Japanese Patent Application No. 2016-511304 dated Jul. 11 2017.

International Search Report of related International Patent Application No. PCT/JP2014/060547 dated Jun. 3, 2014.

U.S. Office Action of related U.S. Appl. No. 15/284,235 dated May 10, 2018.

U.S. Office Action of related U.S. Appl. No. 15/280,309 dated Jun. 1, 2018.

* cited by examiner

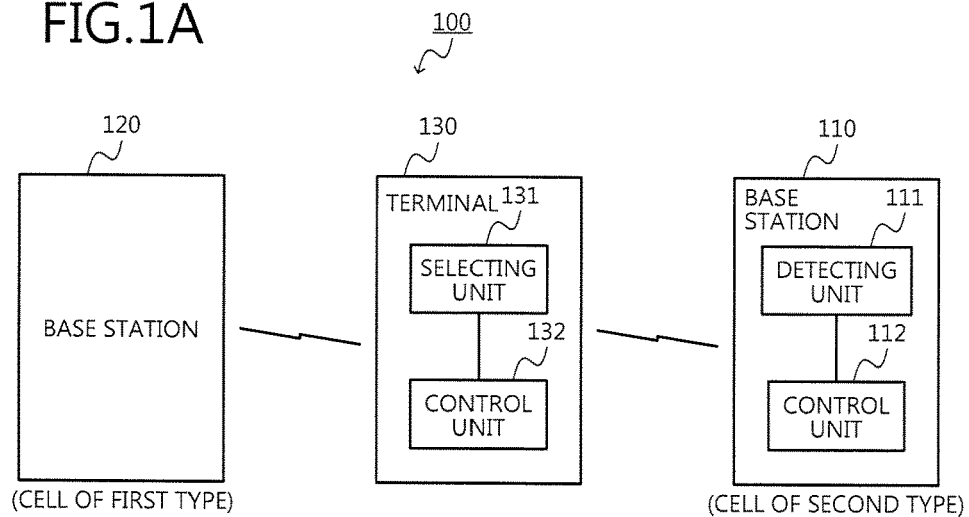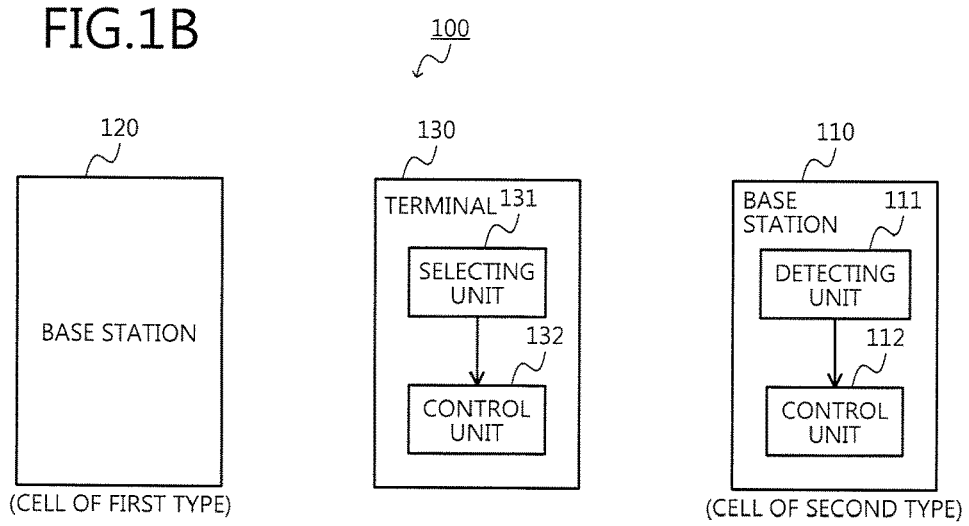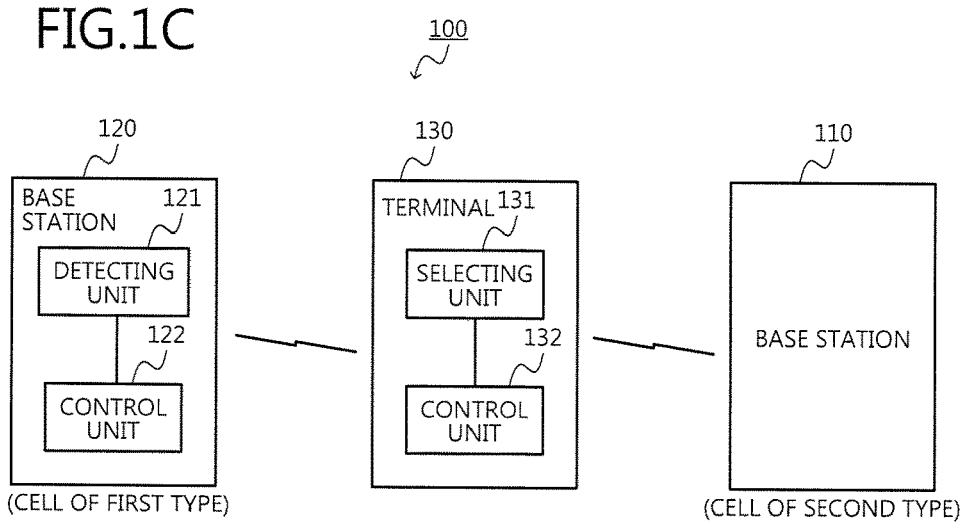

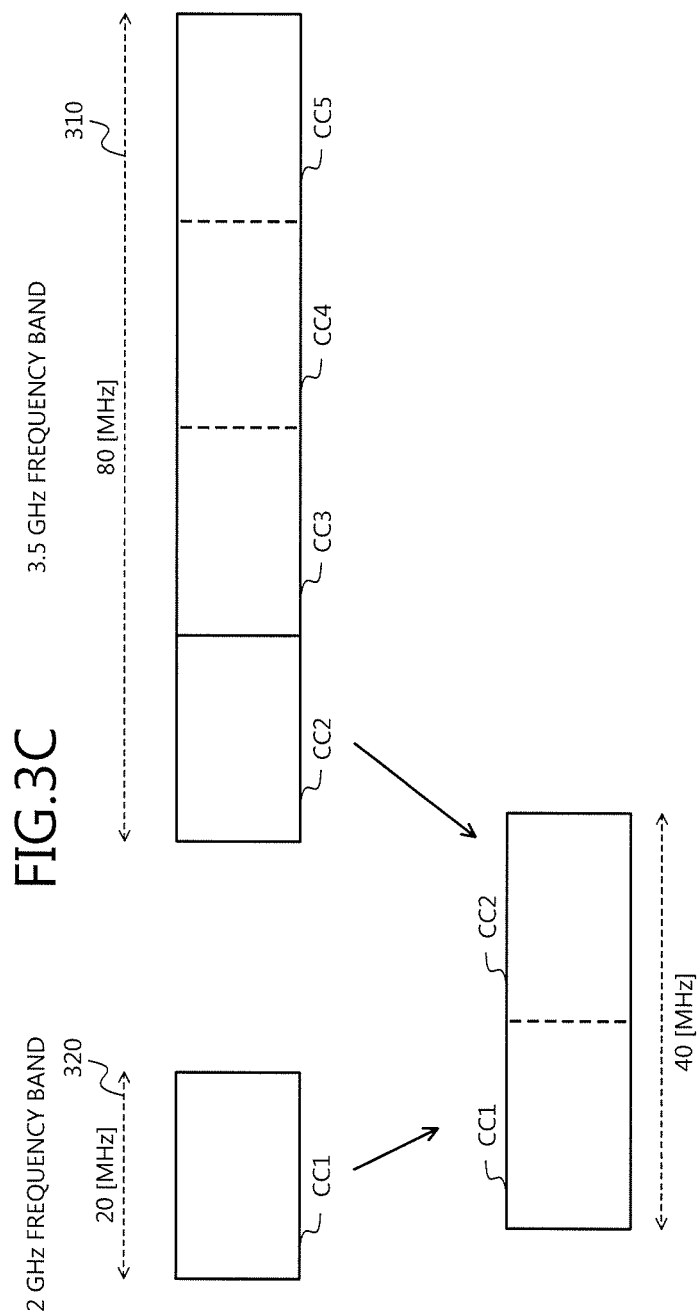

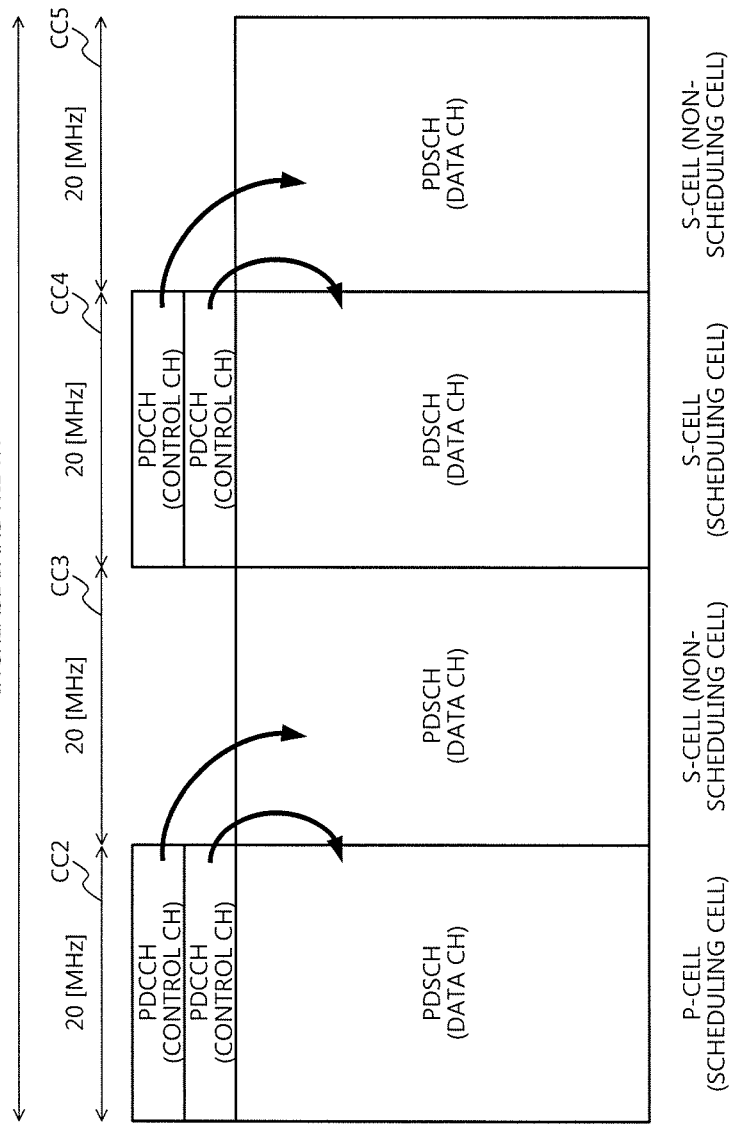

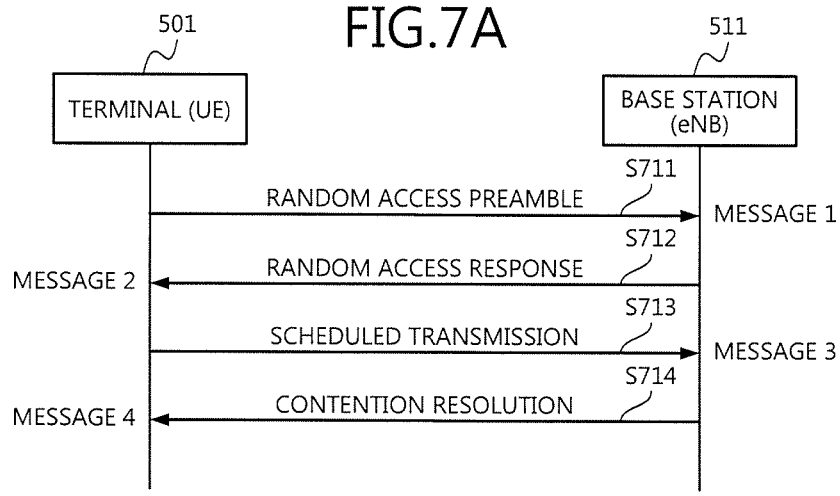
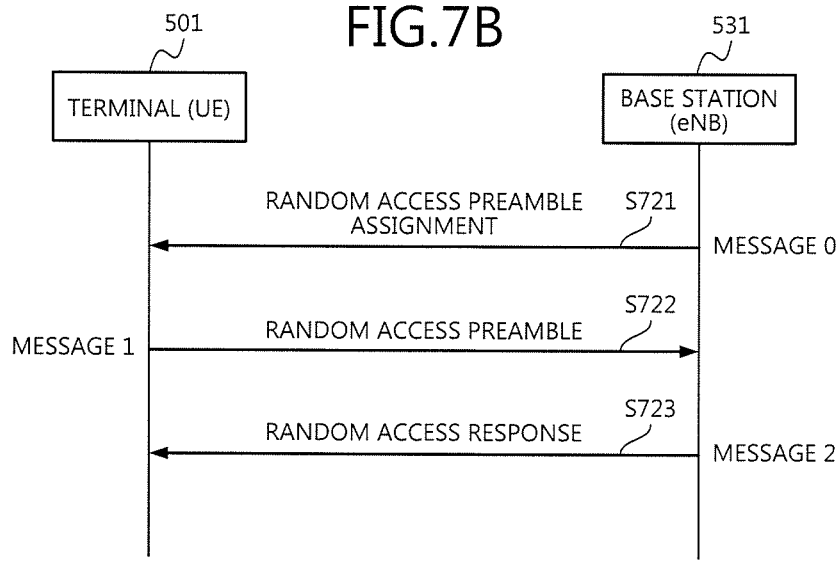

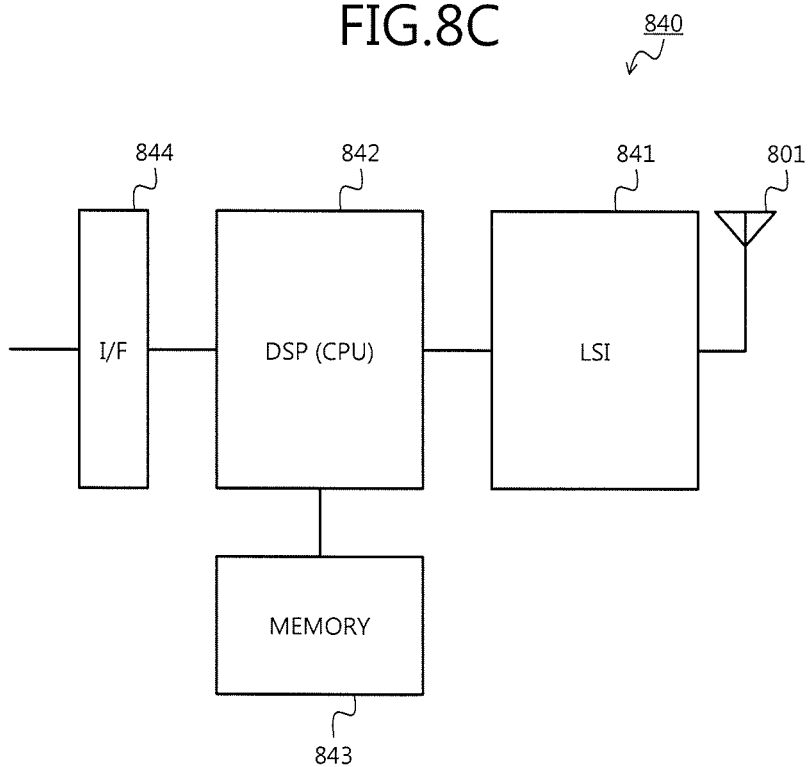

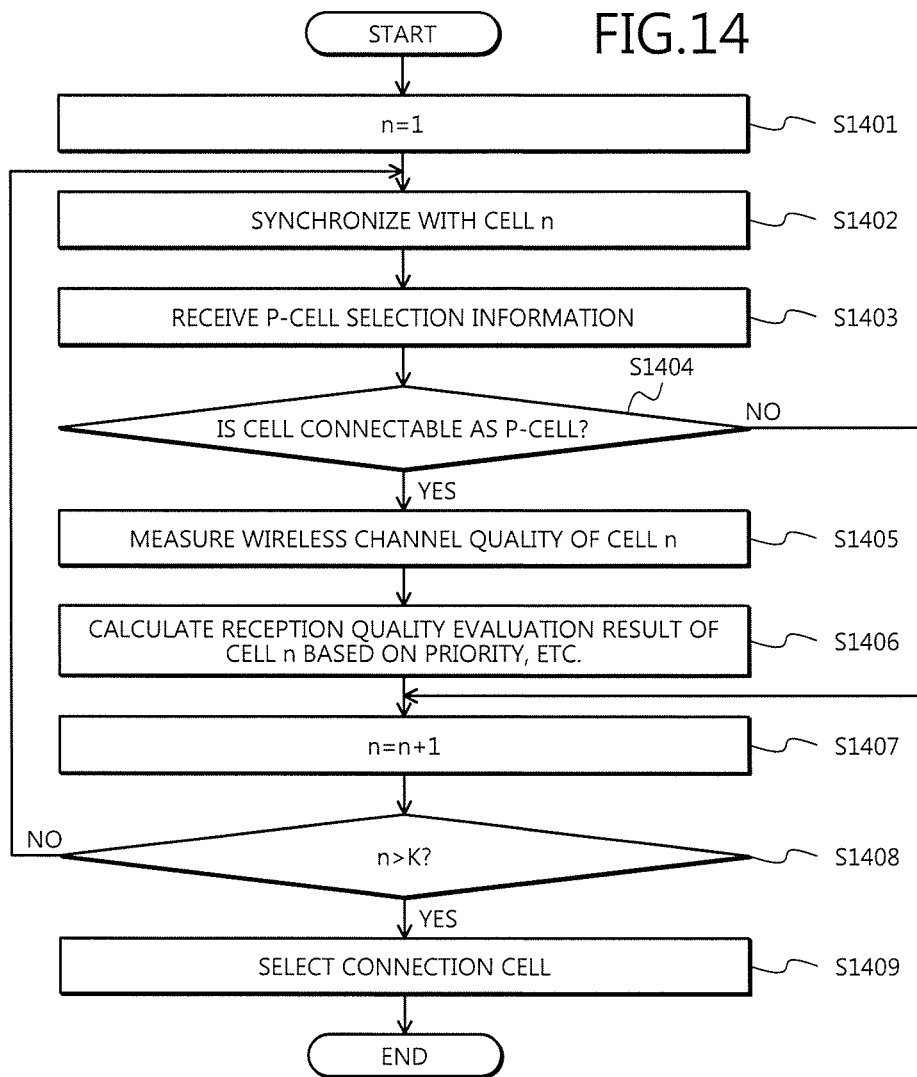

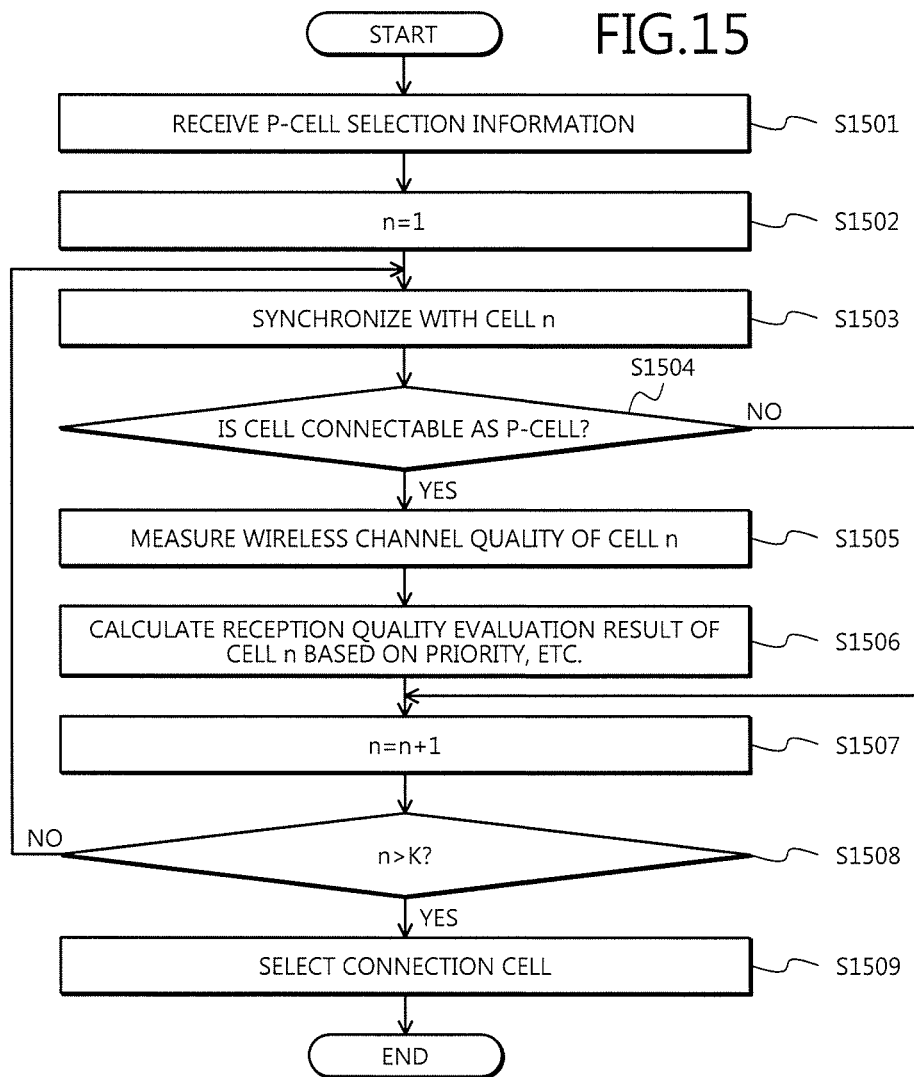

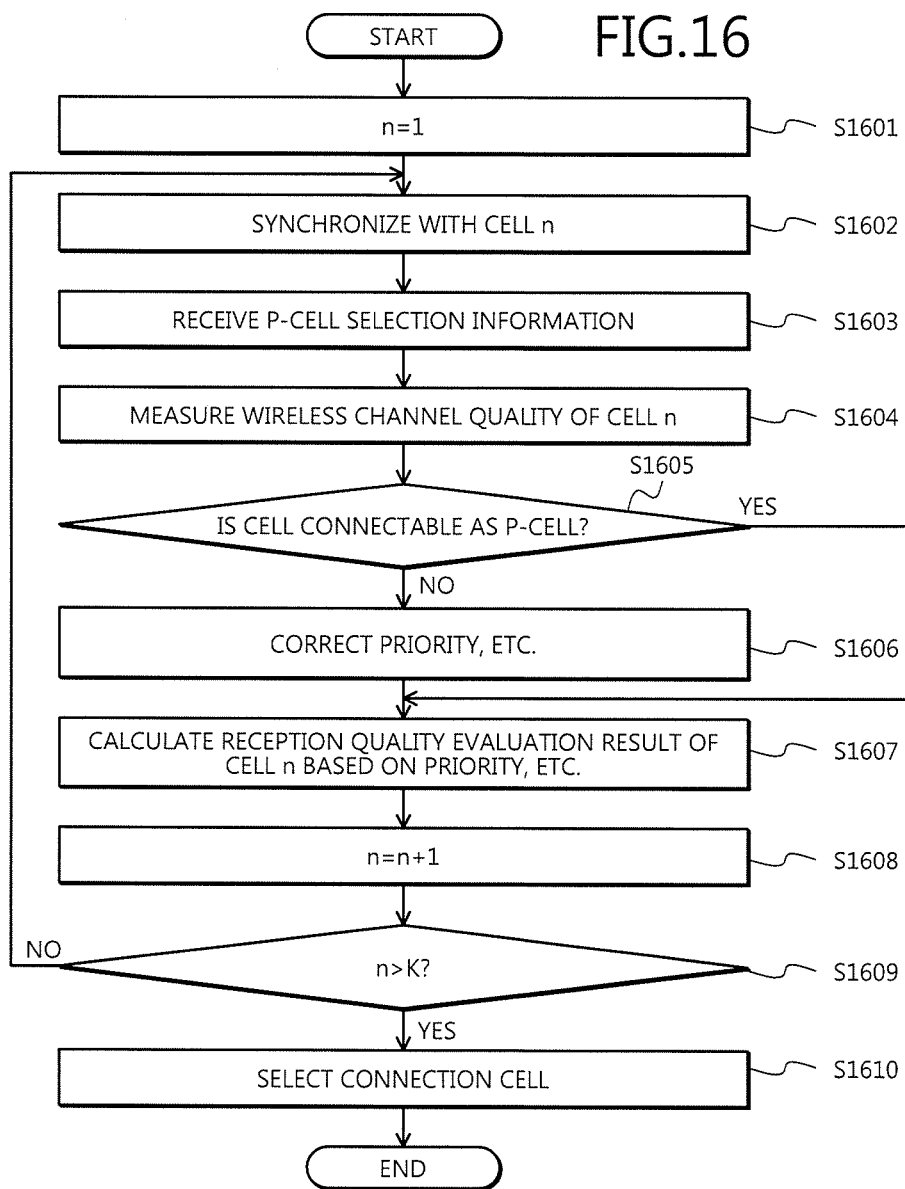

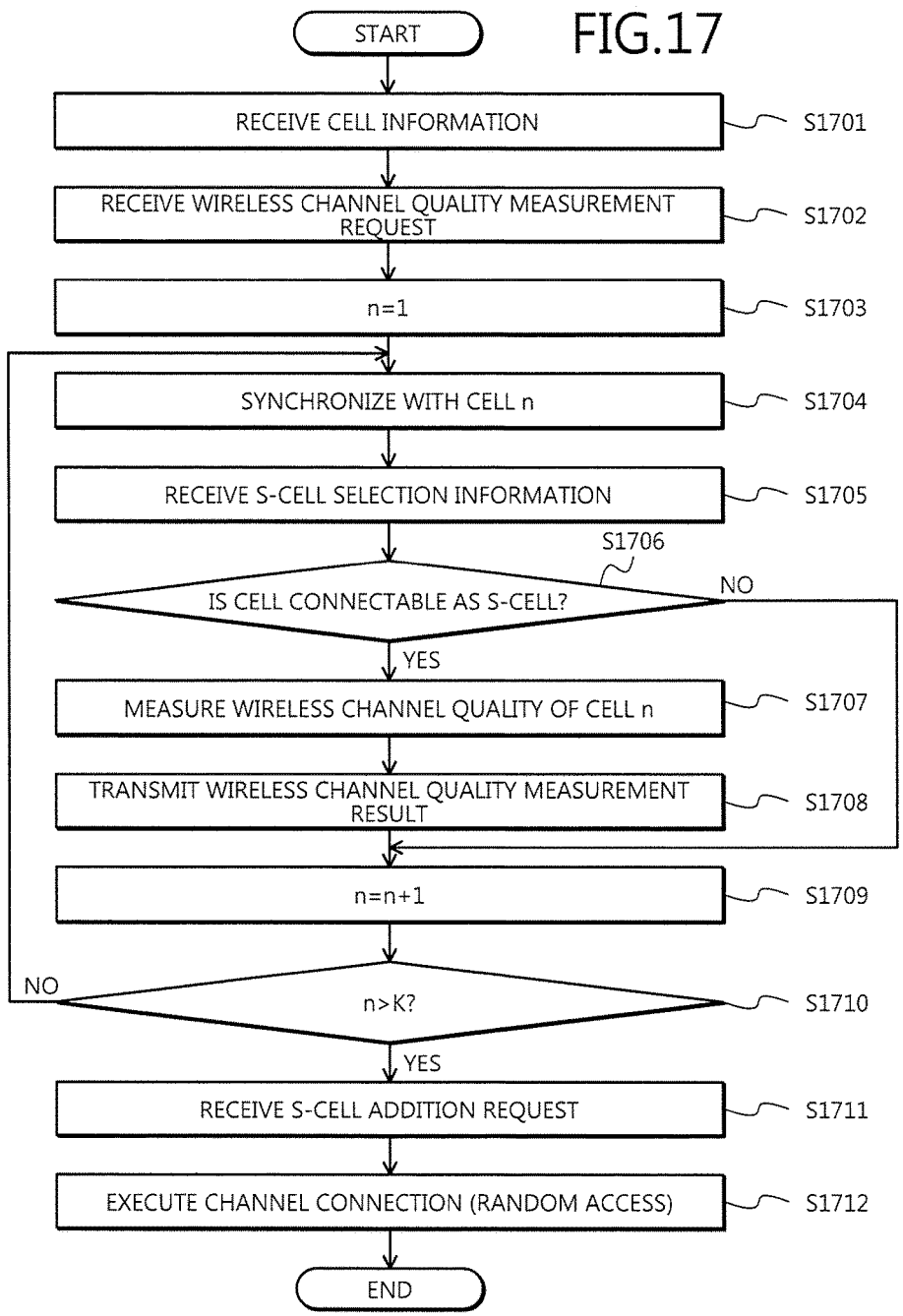

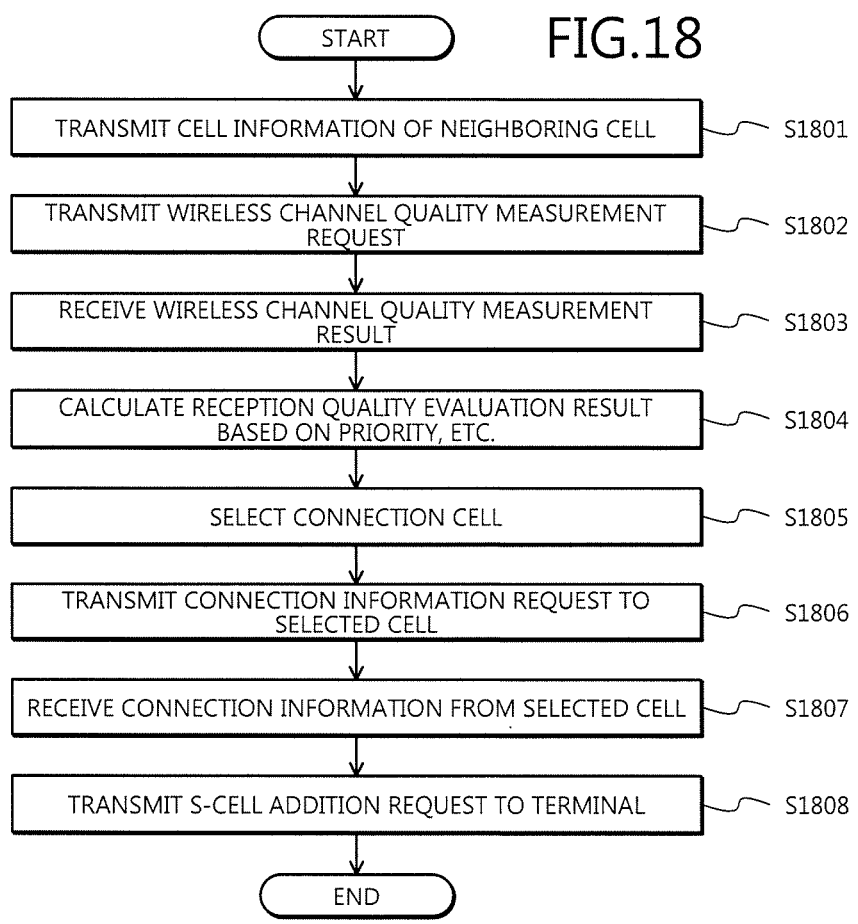

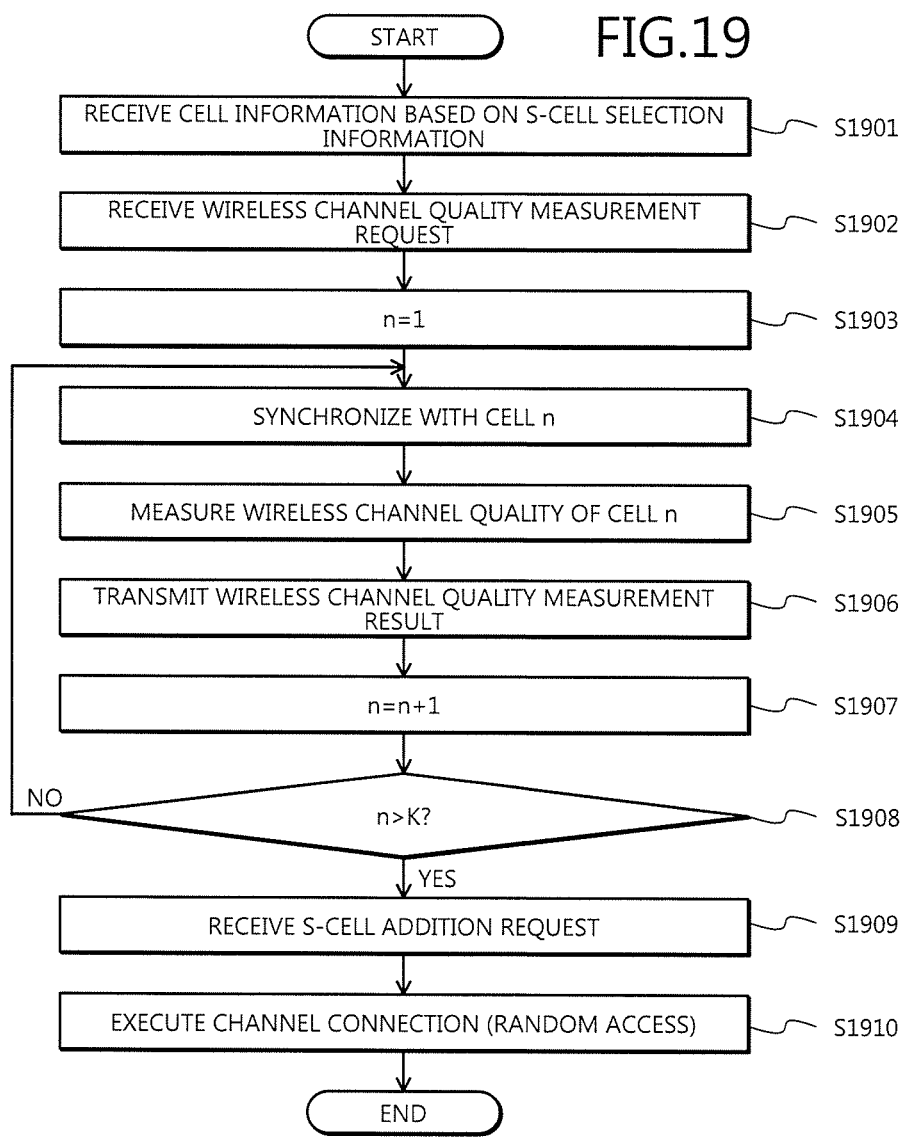

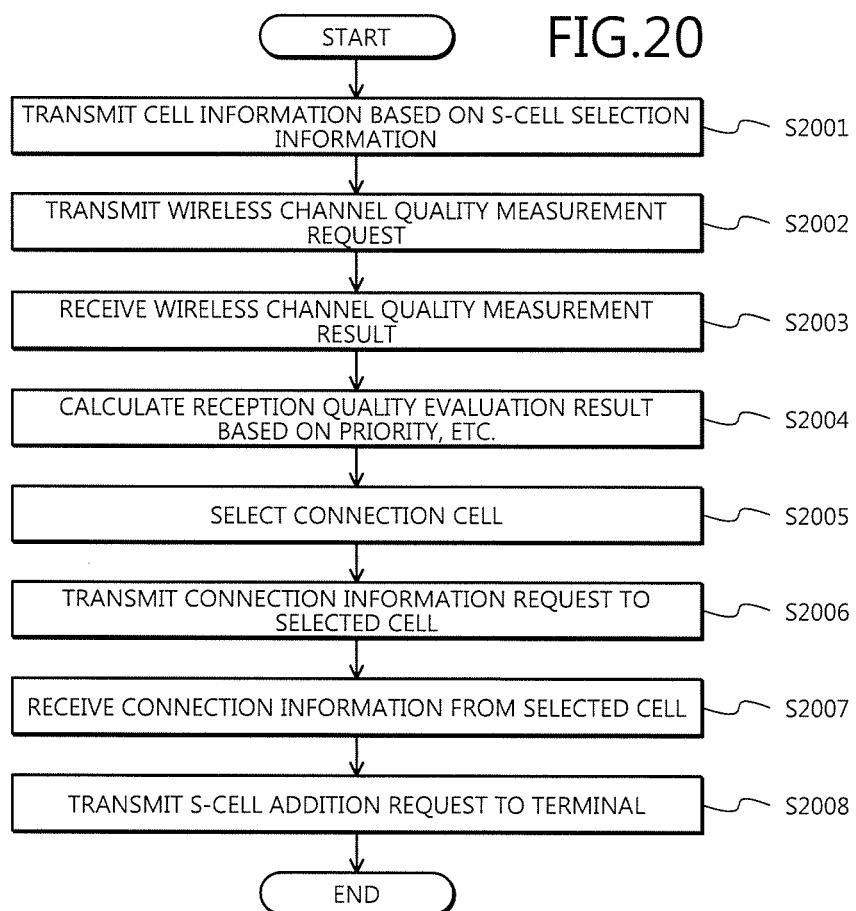

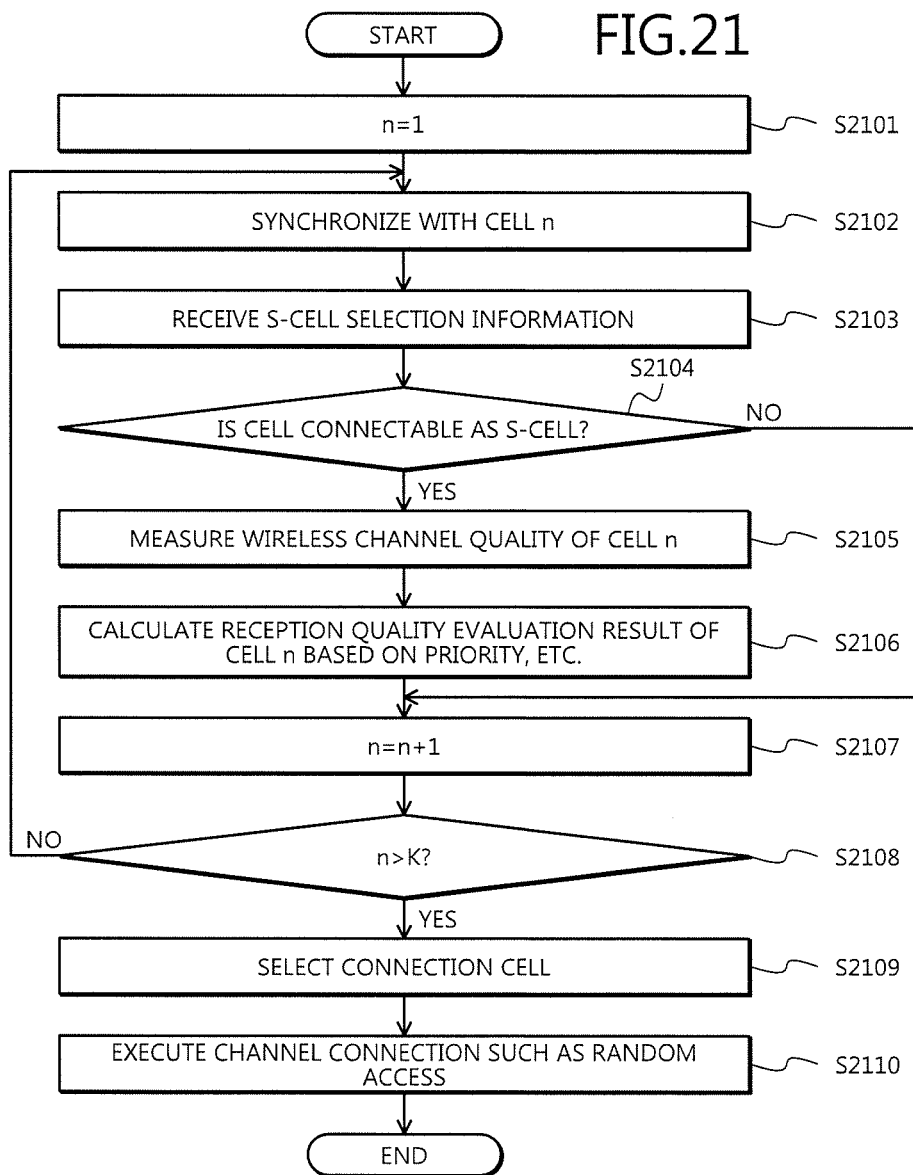

WIRELESS COMMUNICATION SYSTEM, BASE STATION, AND TERMINAL

CROSS REFERENCE TO RELATED APPLICATIONS

This application is a continuation application of International Application PCT/JP2014/060875, filed on Apr. 16, 2014 and designating the U.S., the entire contents of which are incorporated herein by reference.

FIELD

The embodiments discussed herein relate to a wireless communication system, base station, and terminal.

BACKGROUND

Conventionally, in a mobile communication system such as a long term evolution (LTE), cell selection of selecting a cell (base station) to which a terminal is connected based on the wireless quality or for which the terminal waits (camps on, idles) (see, for example, Published Japanese-Translation of PCT Application, Publication No. H7-509826, International Publication No. 2011/087022, Japanese Laid-Open Patent Publication No. 2011-124732, and International Publication No. 2010/134202). Carrier aggregation (CA) is also known in which communication is performed using a primary cell and a secondary cell at the same time.

SUMMARY

According to an aspect of an embodiment, a wireless communication system includes a terminal configured to perform wireless communication concurrently using a cell of a first type enabling connection without association with another cell and a cell of a second type enabling connection by being associated with the cell of the first type; and a base station configured to form a first cell of the second type and when detecting that the terminal selects the first cell for the cell of the first type, the base station notifies the terminal of a second cell of the first type different from the first cell so as to allow the terminal to change connection to the second cell.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram depicting an example of a system according to a first embodiment;

FIG. 1B is a diagram depicting an example of signal flow in the system depicted in FIG. 1A;

FIG. 1C is a diagram depicting a variant of the system according to the first embodiment;

FIG. 3C is a diagram depicting Example 3 of the carrier aggregation;

FIG. 4C is a diagram depicting Example 3 of the P-cell and S-cell;

FIG. 7A is a diagram depicting an example of contention-based random access;

FIG. 7B is a diagram depicting an example of non-contention-based random access;

FIG. 8C is a diagram depicting an example of hardware configuration of the base station;

FIG. 14 is a flowchart of an example of a P-cell selection process by a terminal;

FIG. 15 is a flowchart of a variant 1 of the P-cell selection process by a terminal;

FIG. 16 is a flowchart of a variant 2 of the P-cell selection process by a terminal;

FIG. 17 is a flowchart depicting an example of an S-cell connection process by a terminal;

FIG. 18 is a flowchart depicting an example of an S-cell selection process by the base station (P-cell);

FIG. 19 is a flowchart depicting a variant of the S-cell connection process by the terminal;

FIG. 20 is a flowchart depicting a variant of the S-cell selection process by the base station (P-cell); and FIG. 21 is a flowchart depicting an example of the S-cell connection process by the terminal.

DESCRIPTION OF THE INVENTION

Figure 1D:
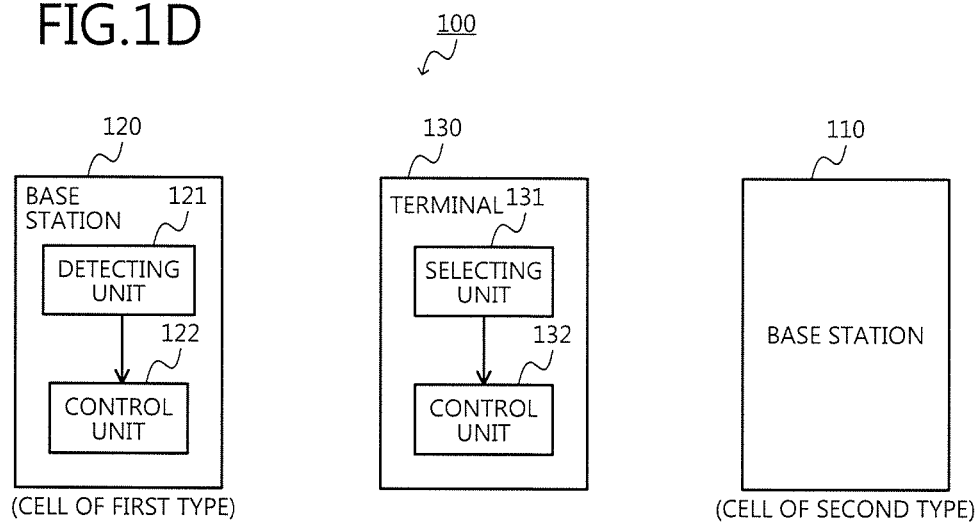
FIG. 1D is a diagram depicting an example of signal flow in the system depicted in FIG. 1C.

Embodiments of a system (wireless communication system), a base station, and a terminal according to the present invention will be described in detail with reference to the accompanying drawings.

FIG. 1A is a diagram depicting an example of a system according to a first embodiment. FIG. 1B is a diagram depicting an example of signal flow in the system depicted in FIG. 1A. As depicted in FIGS. 1A and 1B, a system 100 according to the first embodiment includes base stations 110 and 120 and a terminal 130.

In the system 100, the terminal 130 performs wireless communication that uses a cell of a first type and a cell of a second type at the same time. This wireless communication is, for example, communication using plural cells (or bands) at the same time, such as carrier aggregation. The cell of the first type is a cell enabling independent connection without association with another cell. The cell of the second type is a cell enabling connection with association with the cell of the first type but is not independently connectable.

The base station 110 is a base station forming a first cell of the second type. The base station 110 includes a detecting unit 111 and a control unit 112. The detecting unit 111 performs error detection of the terminal 130 errantly selecting the first cell of the second type formed by the base station 110 for the cell of the first type, and notifies the control unit 112 of a detection result.

When notified of error detection by the detecting unit 111, the control unit 112 notifies the terminal 130 of a second cell of the first type different from the first cell and executes a process of allowing the terminal 130 to perform handover to the second cell. The second cell of the first type is a cell formed by the base station 120, for example.

The base station 120 is a base station forming the second cell of the first type. The base station 120 is a base station different from the base station 110, for example.

The terminal 130 includes a selecting unit 131 and a control unit 132. The selecting unit 131 selects the cell of the first type described above and notifies the control unit 132 of the selected cell. However, errant selection may occur at the selecting unit 131 when the cell of the second type is errantly selected for the cell of the first type. In the example depicted in FIGS. 1A and 1B, the selecting unit 131 is assumed to errantly select the first cell of the second type formed by the base station 110 for the cell of the first type.

The control unit 132 performs connection to the cell given in the notification from the selecting unit 131. If the errant selection described above occurs and the terminal 130 receives from the base station 110, notification of the second cell of the first type different from the first cell selected by the selecting unit 131, the control unit 132 performs handover of the terminal 130 to the second cell given in the notification. In the example depicted in FIGS. 1A and 1B, the control unit 132 performs connection to the second cell of the base station 120 for the cell of the first type.

In this case, the selecting unit 131 again selects a cell of the second type from among cells different from the first cell described above and notifies the control unit 132 of the selected cell. The cell of the second type selected by the selecting unit 131 in this case may be the first cell formed by the base station 110 or may be another cell of the second type. The control unit 132 performs connection to the cell of the second type given in the notification from the selecting unit 131.

As described above, according to the first embodiment, when the terminal 130 selects the first cell not connectable as the cell of the first type for the cell of the first type, the terminal 130 may be allowed to perform handover to the second cell connectable as the cell of the first type. As a result, stabilization of communication may be provided. Additionally, this enables connection to a proper cell. Moreover, this enables connection to a proper cell among cells different in type.

For example, if the terminal 130 selects the first cell not connectable as the cell of the first type for the cell of the first type, unstable operation due to the occurrence of an error may be suppressed at the base station 110 and the terminal 130. Additionally, a forcible handover, etc. may be prevented from occurring when the wireless communication described above is performed with the first cell not connectable as the cell of the first type selected by the terminal 130 for the cell of the first type.

Moreover, by notifying of the cell of the first type and allowing the handover, the terminal 130 may be prevented from selecting the cell of the second type for the cell of the first type again. As a result, stabilization of communication may be provided.

Although description has been given of a case where the base station 110 forms the first cell of the first type and the base station 120 different from the base station 110 forms the second cell of the second type, the base station 120 may be the same base station as the base station 110. That is, for example, the base station 110 may form the first cell of the first type and the second cell of the second type. In this case, the terminal 130 performs wireless communication simultaneously using the first cell and the second cell formed by the base station 110.

When the base station 110 is different from the base station 120, for example, the base station 110 is a base station disposed in the cell of the base station 120 to form a cell smaller than that of the base station 120. However, such a configuration is not a limitation and, for example, the base station 120 may be a base station disposed in the cell of the base station 110 to form a cell smaller than that of the base station 110. The base station 110 may be a base station forming a cell at least partially overlapping the cell of the base station 120.

For example, in a case of applying the system 100 to the LTE system, the above cell of the first type may be a primary cell (or a first cell, a first band, a main band, a main cell (primary cell, master cell) etc.). The cell of the second type may be a secondary cell (or a second cell, a second band, a subband, a subcell, a slave cell, an extended band, an extended cell, etc.).

A certain cell may be both the cell of the first type and the cell of the second type. A certain cell may act as a cell of the first type for a certain terminal and may act as a cell of the second type for another certain terminal.

Description will be made of a case where the base station 110 notifies the terminal 130 of multiple cells of the first type when the base station 110 detects errant selection by the terminal 130. The multiple cells of the first type are formed by the one base station 120 or two or more base stations 120, for example. In this case, the terminal 130 measures wireless channel quality at the terminal 130 for each of the multiple cells of the first type given in the notification from the base station 110. Broadcast information may be information received and stored in advance by the terminal 130 or may be information received at the time of cell selection. The terminal 130 transmits a measurement result of the wireless channel quality to the base station 110.

Based on the measurement result of the wireless channel quality transmitted from the terminal 130, the base station 110 selects a cell of the first type for the terminal 130 from among the multiple cells of the first type. The base station 110 notifies the terminal 130 of the selected cell and allows the terminal 130 to perform handover to the cell given in the notification. As a result, a cell with good wireless quality (good wireless channel quality) may be selected among the multiple cells of the first type for the cell of the first type of the terminal 130 so as to improve the communication quality.

The selection of the cell of the first type based on wireless channel quality may be made by the terminal 130. For example, based on a measurement result of wireless channel quality, the terminal 130 selects the cell of the first type for the terminal 130 from among the multiple cells of the first type.

The terminal 130 then performs handover to the selected cell of the first type. As a result, a cell with good wireless quality may be selected among the multiple cells of the first type for the cell of the first type of the terminal 130 so as to improve the communication quality.

If the base station 110 allows the terminal 130 to perform handover to the second cell of the base station 120 for the cell of the first type, the base station 110 may allow the terminal 130 to select the first cell of the base station 110 as the cell of the second type. As a result, the first cell errantly selected for the cell of the first type by the terminal 130 may be selected for the cell of the second type.

Since the cell of the first type errantly selected by the terminal 130 is highly likely to have good wireless channel quality at the terminal 130, the cell of the second type with good wireless quality may be efficiently selected by selecting the cell as the cell of the second type.

When allowing the terminal 130 to perform handover to the second cell, the base station 110 may notify the terminal 130 of a dedicated preamble for performing non-contention-based random access to the second cell. As a result, the terminal 130 may perform the non-contention-based random access even without acquiring the dedicated preamble from the second cell and therefore, the handover of the terminal 130 to the second cell may be performed efficiently.

If the base station 120 forming the second cell is a base station different from the base station 110, the base station 110 may receive and acquire from the base station 120, the dedicated preamble for performing non-contention based random access to the second cell.

FIG. 1C is a diagram depicting a variant of the system according to the first embodiment. FIG. 1D is a diagram depicting an example of signal flow in the system depicted in FIG. 1C. In FIGS. 1C and 1D, parts similar to those depicted in FIGS. 1A and 1B are denoted by the same reference numerals used in FIGS. 1A and 1B and will not again be described. The base station 120 includes a detecting unit 121 and a control unit 122. The detecting unit 121 detects an error when the terminal 130 errantly selects the second cell of the first type formed by the base station 120 for the cell of the second type, and notifies the control unit 122 of a detection result.

When notified of an error detection from the detecting unit 121, the control unit 122 notifies the terminal 130 of the first cell of the first type different from the second cell and executes a process of allowing the terminal 130 to perform handover to the first cell. The first cell of the second type is a cell formed by the base station 110, for example.

The selecting unit 131 of the terminal 130 selects a cell of the second type described above and notifies the control unit 132 of the selected cell. However, an errant selection may occur at the selecting unit 131 when a cell of the first type is errantly selected for a cell of the second type. In the example depicted in FIGS. 1C and 1D, the selecting unit 131 is assumed to errantly select the second cell of the first type formed by the base station 110 for the cell of the second type.

If the errant selection described above occurs and the terminal 130 receives from the base station 110, notification of the first cell of the second type different from the second cell selected by the selecting unit 131, the control unit 132 performs handover of the terminal 130 to the first cell given in the notification. In the example depicted in FIGS. 1C and 1D, the control unit 132 performs connection to the first cell of the base station 110 as the cell of the second type.

As described above, according to the first embodiment, when the terminal 130 selects the first cell not connectable as the cell of the second type for the cell of the second type, the terminal 130 may be allowed to perform handover to the first cell connectable as the cell of the second type. As a result, stabilization of communication may be provided.

For example, if the terminal 130 selects the second cell not connectable as the cell of the second type for the cell of the second type, unstable operation due to an occurrence of an error may be suppressed at the base station 120 and the terminal 130. Additionally, a forcible handover, etc. may be prevented from occurring when the wireless communication described above is performed with the second cell not connectable as the cell of the second type selected by the terminal 130 for the cell of the second type.

Moreover, by notifying of the cell of the second type and allowing the handover, the terminal 130 may be prevented from selecting the cell of the first type for the cell of the second type again. As a result, stabilization of communication may be provided. Additionally, this enables connection to a proper cell.

For example, at present, specifications of the LTE system and the LTE-Advanced system have been studied in the $3^{rd}$ generation partnership project (3GPP). The specification of the LTE system was formulated as an LTE Release8. Furthermore, currently, the LTE-Advanced system, i.e., an evolved version of the LTE system is being studied, and the first edition of the specification of the LTE-Advanced system was drawn up as an LTE Release10. Additionally, in the 3GPP, an LTE Release12 for example, i.e. a successor of the LTE Release10 is being studied.

Figure 2:
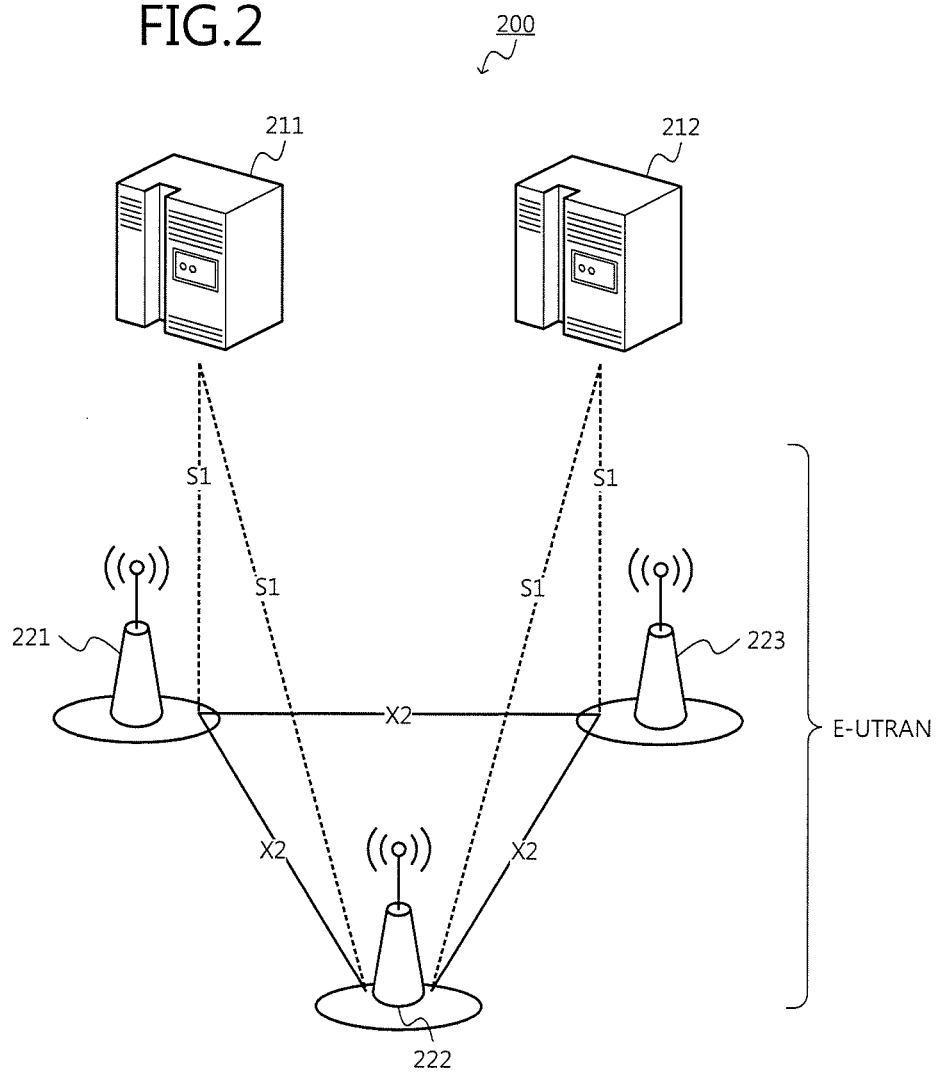
FIG. 2 is a diagram depicting an example of a communication system according to a second embodiment.

FIG. 2 is a diagram depicting an example of a communication system according to a second embodiment. As depicted in FIG. 2, a communication system 200 according to the second embodiment is an LTE system-Advanced (LTE Release10) system including MME/S-GWs 211 and 212 and base stations (eNBs) 221 to 223. The communication system 200 may include user equipment (UE) (user terminal) performing wireless communication with the base stations 221 to 223.

Each of the MME/S-GWs 211 and 212 has functions of mobility management entity (MME) and serving gateway (S-GW). The MME/S-GW 211 is connected via S1 interfaces to the base stations 221 and 222. The MME/S-GW 212 is connected via the S1 interfaces to the base stations 222 and 223.

Each of the base stations 221 to 223 is an eNodeB of an evolved universal terrestrial wireless access network (E-UTRAN) of the LTE system. The base stations 221 to 223 are connected to one another by way of X2 interfaces that are inter-base-station interfaces. Each of the base stations 221 to 223 performs data communication with UE through wireless communication. Each of the UEs is a mobile terminal (mobile station) such as a cellular phone.

The communication system 200 depicted in FIG. 2 will hereinafter be described by way of example. However, the present invention is not limited to the communication system 200 depicted in FIG. 2 and is applicable to various mobile communication systems and wireless communications systems such as the global system for mobile communications (GSM) and the wideband-code division multiple access (W-CDMA) system. The GSM is a registered trademark.

A method of implementing bandwidth expansion, which is one of the features of the LTE-Advanced system, will be described. In the LTE system, the uplink/downlink bandwidth may be configured to 1.4 [MHz], 3 [MHz], 5 [MHz], 10 [MHz], 15 [MHz], and 20 [MHz]. These are defined in, e.g., TS36.101 and TS36.104 of the 3GPP.

These configured bandwidths are called component carriers (CCs). The reason why the plural bandwidths are configured is the premise that the bandwidths allocated to the GSM system or W-CDMA system are used intactly.

In the LTE system, on the other hand, it is required to implement a high-speed transmission as compared with the GSM system or the W-CDMA system. The LTE system is, therefore, required to have a wider bandwidth as compared with the GSM system or the W-CDMA system.

In general, the bands used in the wireless communication system differ depending on the circumstances of each country. In Europe, since countries border other countries by land, the interference is required to be taken into consideration so that use frequency bands are regulated between the countries. As a result, available bandwidths are reduced and subdivided. Nevertheless, as described above, the LTE system is required to have a widened bandwidth.

Thus, the carrier aggregation has been introduced as a method of integrating and widening the narrowed and subdivided bands. When the carrier aggregation is carried out, a principal cell is configured on a terminal-to-terminal basis. This principal cell is called a first cell, primary cell, first band, primary band, main cell, etc. Hereinafter, this principal cell is referred to as a P-cell. The above-described cell of the first type is for example the P-cell.

Although the cell and the component carrier (band) intrinsically have different meanings, the definition of the cell in the 3GPP is "one configuring a single service area using a single frequency". It is thus defined that a single cell is configured for a component carrier, with one-to-one correspondence between the cell and the component carrier, so that the cell and the component carrier may be treated as synonymous. Furthermore, since a single base station has only one band, the base station and the component carrier can also be treated as synonymous.

In the carrier aggregation, another cell (band) is added and integrated to the configured P-cell. This additional cell is called a second cell, secondary cell, second band, subband, subcell, slave cell, extended band, extended cell, etc. Hereinafter, this additional cell is referred to as an S-cell. Similar to the P-cell, the S-cell and the component carrier are synonymous. The above-described cell of the second type is for example the S-cell.

Although these cells are ones obtained by dividing the band of a system, each band allows scheduling to be carried out and is capable of configuring a single system. For this reason, these cells are different from ones configuring a block (or a cluster) consisting of plural subcarriers collected together to carry out the user multiple in the orthogonal frequency division multiple access (OFDMA) for example. In other words, one bandwidth may conceivably operate as one wireless communications system.

The carrier aggregation allows up to seven S-cells to be configured. That is, the carrier aggregation is feasible using up to eight component carriers including the P-cell. The LTE-Advanced system assumes up to 100 MHz of bandwidth. For this reason, if the bandwidth of a single component carrier is 20 MHz, the number of S-cells is four at most, so that the carrier aggregation is feasible using up to five component carriers, equal to the sum of the P-cell and the S-cells.

Figure 3A:
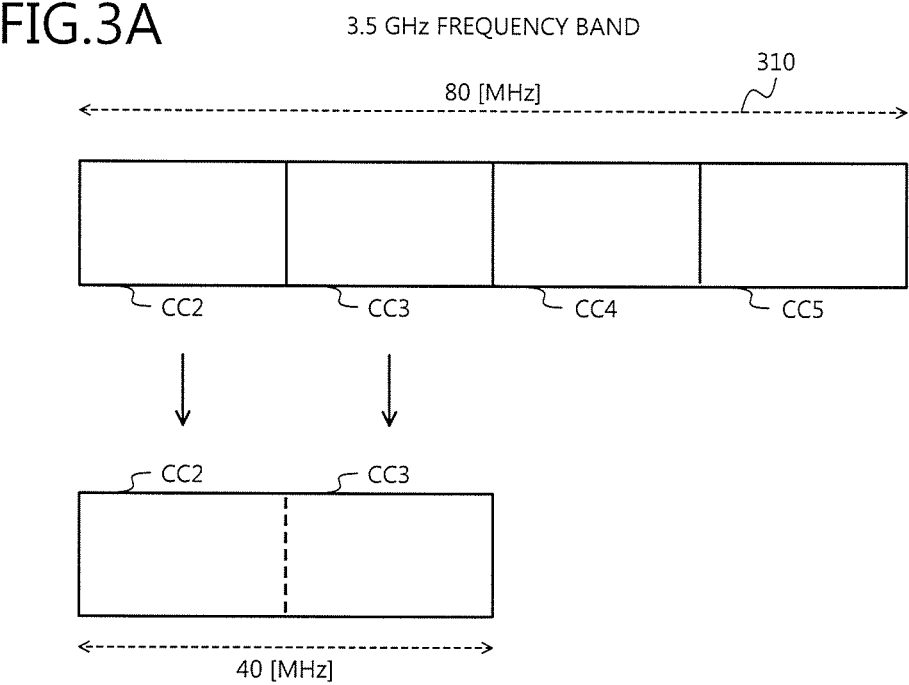
FIG. 3A is a diagram of Example 1 of carrier aggregation.
Figure 3B:
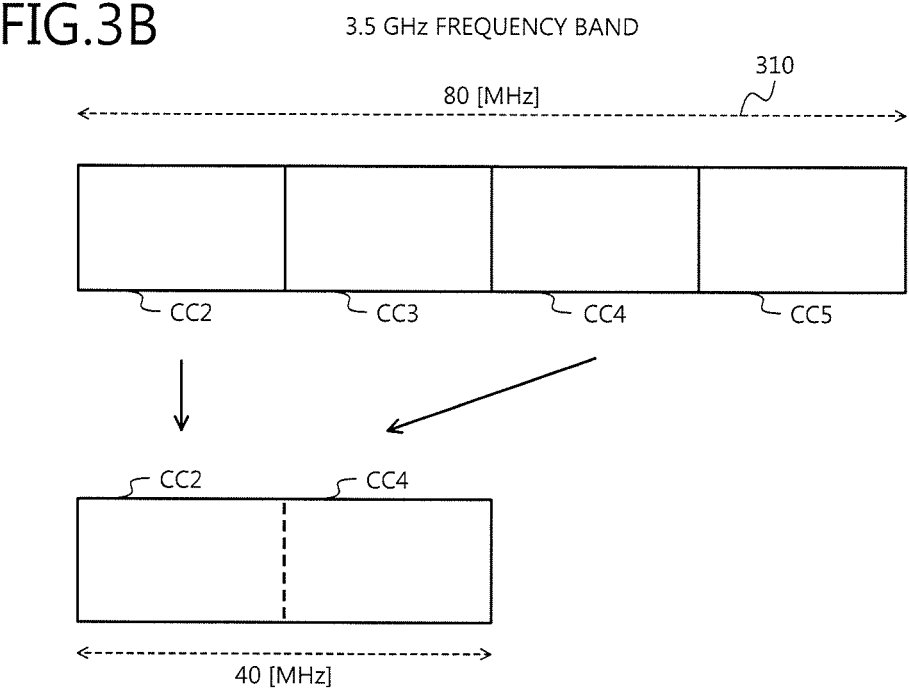
FIG. 3B is a diagram depicting Example 2 of the carrier aggregation.

That is, the carrier aggregation is an integration of the P-cell and at least one S-cell (see, e.g., FIGS. 3A to 3C). Hereinafter, for the simplicity of description, a case will be described where the carrier aggregation is carried out by two component carriers (i.e., one P-cell and one S-cell) at a single terminal (excluding FIG. 4C, etc.). By adding the second and subsequent S-cells, the carrier aggregation may be carried out using three or more component carriers (see FIG. 4C, etc.).

FIG. 3A is a diagram of Example 1 of carrier aggregation. A band 310 depicted in FIG. 3A is a frequency band of the 3.5 [GHz] band included in system band. The band 310 has the bandwidth of 80 [MHz]. The band 310 includes component carriers CC2 to CC5, for example. The component carriers CC2 to CC5 each have the bandwidth of 20 [MHz].

In the carrier aggregation, the component carriers CC2 and CC3 may be integrated for use, as depicted in FIG. 3A for example. In this manner, the carrier aggregation enables the integrated use of component carriers adjoining each other for example.

FIG. 3B is a diagram depicting Example 2 of the carrier aggregation. In FIG. 3B, parts similar to those depicted in FIG. 3A are designated by the same reference numerals used in FIG. 3B and will not again be described. In the carrier aggregation, the component carriers CC2 and CC4 may be integrated for use, as depicted in FIG. 3B, for example. In this manner, the carrier aggregation enables component carriers not adjoining each other to be integrated for use.

FIG. 3C is a diagram depicting Example 3 of the carrier aggregation. In FIG. 3C, parts similar to those depicted in FIG. 3A are designated by the same reference numerals used in FIG. 3A and will not again be described. A band 320 depicted in FIG. 3C is a 2 GHz frequency band included in system band. The band 320 includes the component carrier CC1 for example. The bandwidth of the component carrier CC1 is 20 MHz.

In the carrier aggregation, the component carriers CC1 and CC2 included in the bands 320 and 310, respectively, may be integrated for use, as depicted in FIG. 3C for example. In this manner, the carrier aggregation enables the integrated use of the component carriers having different frequency bands. Here, although a case where the two frequency bands are integrated and used will be described, three or more frequency bands may be integrated and used.

Figure 4A:
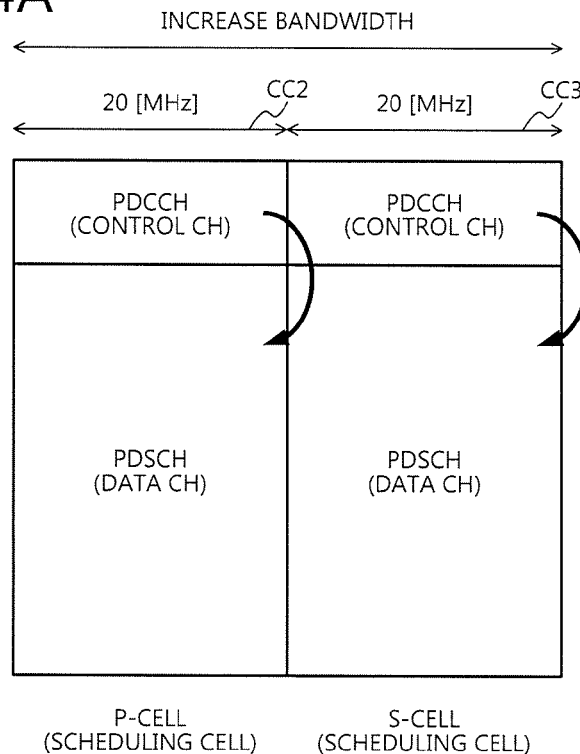
FIG. 4A is a diagram depicting Example 1 of a P-cell and S-cell.

FIG. 4A is a diagram depicting Example 1 of the P-cell and S-cell. In FIG. 4A, parts similar to those depicted in FIG. 3A are designated by the same reference numerals used in FIG. 3A and will not again be described. FIG. 4A depicts a case where in the carrier aggregation, the component carrier CC2 is selected as the P-cell and the component carrier CC3 is selected as the S-cell to thereby widen the band. In the example depicted in FIG. 4A, the component carriers CC2 and CC3 include a physical downlink control channel (PDCCH) as a control CH and a physical downlink shared channel (PDSCH) as a data CH, respectively.

In this case, both the component carriers CC2 and CC3 act as scheduling cells (serving cells). That is, in each of the component carriers CC2 and CC3, scheduling is performed and a control signal related to the scheduling is transmitted by the PDCCH. The control signal related to the scheduling includes, e.g., terminal selection, wireless resource used, modulation scheme, and coding rate. A downlink control channel (DCCH), for example, is used as a downlink control channel acting as a transport channel.

In the example depicted in FIG. 4A, data transmission is carried out using a downlink wireless shared channel and a downlink wireless control channel for data transmission in each cell, similar to a high-speed downlink packet access (HSDPA) in the W-CDMA for example. The downlink wireless shared channel is, for example, the PDSCH. The downlink wireless control channel is, for example, an enhanced-physical downlink control channel (E-PDCCH). As used herein, data means terminal-dedicated data. The terminal-dedicated data is user data or dedicated data.

Figure 4B:
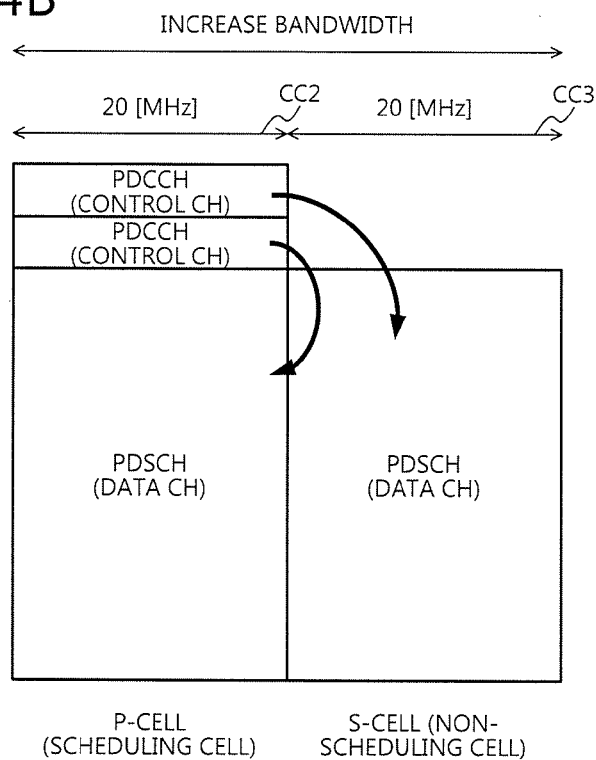
FIG. 4B is a diagram depicting Example 2 of the P-cell and S-cell.

FIG. 4B is a diagram depicting Example 2 of the P-cell and S-cell. In FIG. 4B, parts similar to those depicted in FIG. 4A are designated by the same reference numerals used in FIG. 4A and will not again be described. In the example depicted in FIG. 4B, the component carrier CC2 includes the PDCCH for the PDSCH of the component carrier CC3. In this case, the component carrier CC2 acts as the scheduling cell, while the component carrier CC3 acts as a non-scheduling cell (or a non-servicing cell).

That is, in the component carrier CC2, scheduling of the component carrier CC3 in addition to that of the component carrier CC2 is carried out. Control signals related to the component carriers CC2 and CC3 are transmitted by the PDCCH of the component carrier CC2. Here, information identifying the control signal between the component carriers CC2 and CC3 is also added to the control signals for transmission.

The scheduling is not performed in the component carrier CC3. The PDSCH of the component carrier CC3 is transmitted based on a control signal transmitted by the PDCCH of the component carrier CC2.

The scheduling and the control signal transmission method depicted in FIG. 4B are called cross-carrier scheduling. In the cross-carrier scheduling, the scheduling cell is the P-cell or the S-cell, while the non-scheduling cell is only the S-cell. That is, the P-cell acts only as the scheduling cell.

As for the example depicted in FIG. 4B, the downlink data transmission will be described by way of example. In the scheduling cell (e.g., P-cell), a control signal for data transmission of the scheduling cell is transmitted using the downlink wireless control channel (PDCCH). In the scheduling cell, data is transmitted using the downlink wireless shared channel (PDSCH), based on control information transmitted via the above-described downlink wireless control channel.

A control signal for data transmission in the non-scheduling cell is transmitted using the downlink wireless control channel (PDCCH) of the scheduling cell. In the non-scheduling cell, data is transmitted using the downlink wireless shared channel (PDSCH), based on control information for data transmission of the non-scheduling cell transmitted via the above-described downlink wireless control channel.

FIG. 4C is a diagram depicting Example 3 of the P-cell and S-cell. In FIG. 4C, parts similar to those depicted in FIG. 4A are designated by the same reference numerals used in FIG. 4A and will not again be described. The component carrier CC5 depicted in FIG. 4C is a component carrier adjoining the component carrier CC4 toward the high-frequency side. FIG. 4C depicts a case where in the carrier aggregation, the component carrier CC2 is selected as the P-cell and the component carriers CC3 to CC5 are selected as the S-cells.

In the example depicted in FIG. 4C, the component carrier CC2 includes the PDCCH for the PDSCH of the component carrier CC3. In the example depicted in FIG. 4C, the component carrier CC4 includes the PDCCH for the PDSCH of the component carrier CC5.

In this case, the component carriers CC2 and CC4 act as the scheduling cells, while the component carriers CC3 and CC5 act as the non-scheduling cells. That is, the component carrier CC2 performs scheduling of the component carrier CC3 in addition to that of the component carrier CC2. Control signals related to the component carriers CC2 and CC3 are then transmitted by the PDCCH of the component carrier CC2. Here, information identifying the control signal between the component carriers CC2 and CC3 is also added for transmission.

The scheduling is not performed in the component carrier CC3 and the PDSCH of the component carrier CC3 is transmitted based on a control signal transmitted by the PDCCH of the component carrier CC2.

In the same manner, the component carrier CC4 performs scheduling of the component carrier CC5 in addition to that of the component carrier CC4. Control signals related to the component carriers CC4 and CC5 are transmitted by the PDCCH of the component carrier CC4. Here, information identifying the control signal between the component carriers CC4 and CC5 is also added for transmission.

The scheduling is not performed in the component carrier CC5 and the PDSCH of the component carrier CC5 is transmitted based on a control signal transmitted by the PDCCH of the component carrier CC4.

As depicted in FIG. 4C, two or more S-cells may be disposed for the P-cell. The cross-carrier scheduling may not be applied to all of the S-cells as depicted in FIG. 4C. That is, in the case where plural cells are present, the cross-carrier scheduling may be applied to a certain S-cell without being applied to the other cells. As depicted in FIG. 4C, similar to the P-cell, the S-cell may also transmit the downlink control channel (PDCCH) for the other component carrier.

As depicted in FIGS. 4B and 4C, at least three wireless channels (two PDCCHs and one PDSCH) are downlink transmitted in the scheduling cell performing the cross-carrier scheduling. Besides these, for example, a physical broadcast channel (PBCH), a physical synchronization channel (PSCH), a physical control format indicator channel (PCFICH), a physical hybrid-ARQ indicator channel (PHICH), etc. may be transmitted.

In the non-scheduling cell, on the other hand, at least one wireless channel (PDSCH) is downlink transmitted.

A case has been described herein where the first component carrier is configured as the P-cell and the second component carrier is configured as the S-cell for a certain first terminal. A case will be described where in this case there is another second terminal using only the second component carrier.

Here, the second component carrier acts as the P-cell in the second terminal. For this reason, in the second component carrier, the above-described PBCH, PSCH, PCFICH, PHICH, etc. are transmitted for the second terminal using only the second component carrier.

On the other hand, in the certain first terminal having the first component carrier as the P-cell and the second component carrier as the S-cell, it is not essential to receive the PBCH, PSCH, PCFICH, etc. transmitted by the second component carrier. Hence, reception of these wireless channels may not be necessary at the first terminal. In this manner, in the second component carrier, the PBCH, PSCH, PCFICH, etc. unnecessary for the first terminal may be downlink transmitted due to the second terminal having the second component carrier as the P-cell.

In the following description, the scheduling cell is defined as a component carrier transmitting the PDCCH for its own cell or another cell, while the non-scheduling cell is defined as a component carrier transmitting only the downlink wireless shared channels (PDSCH) without transmitting the PDCCH.

In the 3GPP, the P-cell that is a first connected cell at the time of channel configuration may be called an anchor component. The channel configuration means random access channel configuration executed in a cell selected by the terminal for example.

As described above, the terminal can connect only one cell at the time of wireless channel configuration. For this reason, the connected cell at the wireless channel configuration acts as the P-cell. The P-cell may be changed by handover, etc. after the wireless channel configuration. The addition, deletion, and change of the S-cells are also feasible.

When configuring a wireless channel between the terminal and the base station, up to eight serving cells (scheduling cells) are configured by ServCellIndex IE that is an L3 control signal. Here, the ServCellIndex=0 represents a P-cell, while the ServCellIndex=1 to 7 represent an S-cell (see, e.g., TS36.331 of the 3GPP).

The S-cell may be added at a time other than at the wireless channel configuration. The wireless channel configuration may be reset or altered by handover, etc.

The ServCellIndex IE is included in CrossCarrierSchedulingConfig IE. The CrossCarrierSchedulingConfig IE is included in PhysicalConfigDedicated IE. The PhysicalConfigDedicated IE is included in RadioResourceConfigDedicated IE. The RadioResourceConfigDedicated IE is included in an RRCConnectionReconfiguration message and is notified from the base station to the terminal.

The S-cell is notified by ScellIndex IE. The ScellIndex IE is included in the RRCConnectionReconfiguration message and is notified from the base station to the terminal.

As described above, execution of the carrier aggregation between different base stations is being studied. In this case, a component carrier used in the carrier aggregation is selected from among up to seven S-cells (ServCellIndex IE=1 to 7) configured as described above.

The 3GPP specification defines that "a cell is a service area configured using a single frequency", which means that one cell corresponds to one base station in this definition. In the carrier aggregation, however, plural cells may correspond to one base station.

In the conventional carrier aggregation, plural component carriers are configured for the same base station so that the component carriers of the same base station carry out the carrier aggregation. At present, the carrier aggregation between the base stations (between the eNBs) is being studied. This is similar to the execution of Dual Cell-HSDPA (DC-HSDPA) between the base stations.

The execution of the DC-HSDPA between different base stations is called Dual Band-HSDPA (DB-HSDPA) or Dual Band-Dual Cell-HSDPA (DB-DC-HSDPA) and is expressed in specifications.

A configuration where plural small cells (e.g. picocells, nanocells, phantom cells) are arranged within a large cell (e.g. a macrocell) has been studied from W-CDMA release99. This configuration is called an umbrella cell configuration or a hierarchical cell structure (HCS). Hereinafter, this configuration is referred to as the hierarchical cell structure. A case where all of the area of the small cells is encompassed in the large cell and the case where only a part thereof is encompassed are considered. In the latter case, remaining portions may be encompassed in another large cell.

The hierarchical cell structure is configured to include plural layers in which large cells (higher-level cells, macrocells) and small cells (lower-level cells, picocells) are stacked. As used herein, a relatively large cell is referred to as the large cell, while a relatively small cell is referred to as the small cell. In the hierarchical cell structure, the sizes do not necessarily have to differ.

Figure 5A:
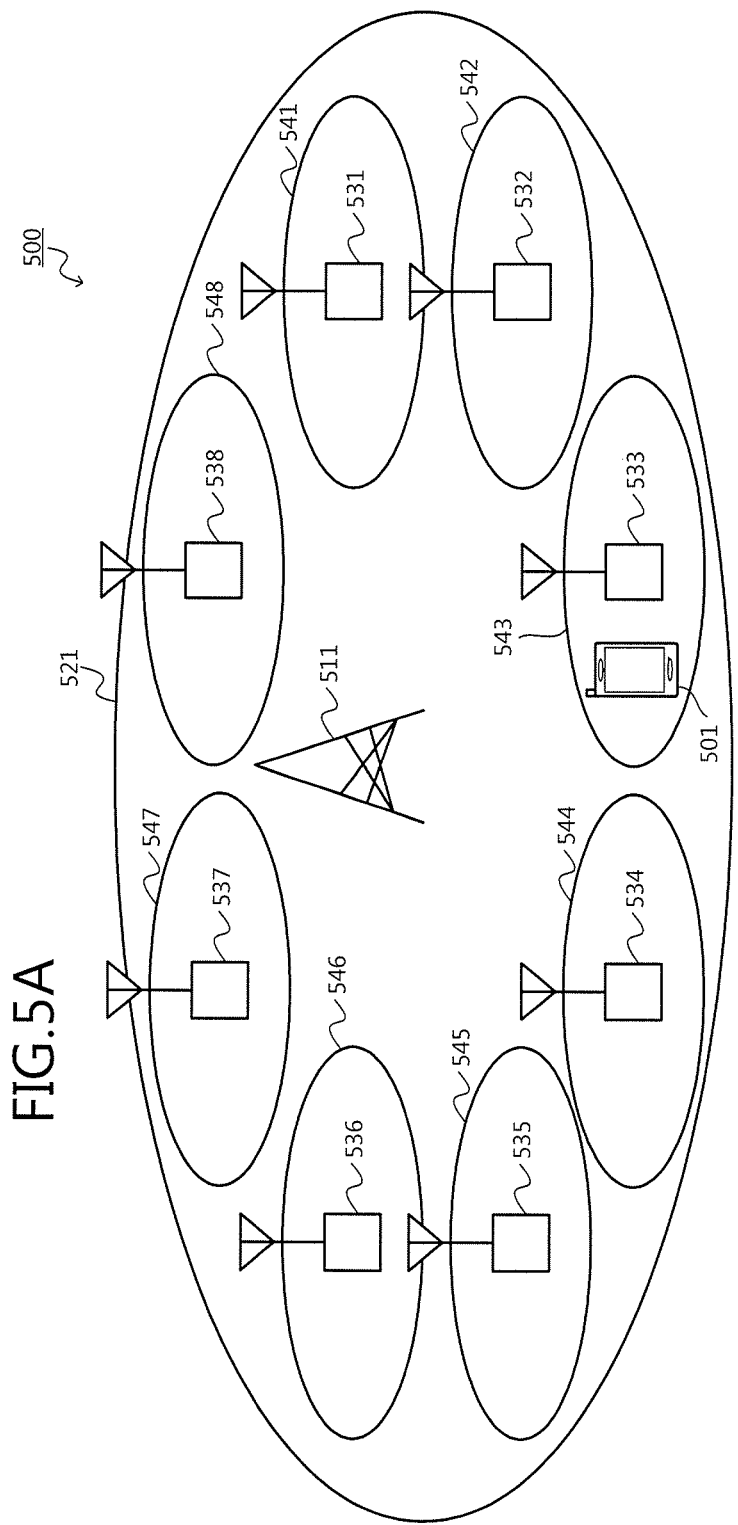
FIG. 5A is a diagram depicting an example of a hierarchical cell structure.

FIG. 5A is a diagram depicting an example of the hierarchical cell structure. A communication system 500 depicted in FIG. 5A is an example of the communication system 200 depicted in FIG. 2 for example. The communication system 500 has the hierarchical cell structure including a terminal 501, a base station 511, and base stations 531 to 538.

The system 100 depicted in FIGS. 1A to 1D may be implemented as the communication system 500 depicted in FIG. 5A, for example. In this case, the base station 120 depicted in FIGS. 1A to 1D may be implemented by the base station 511 for example. The base station 110 depicted in FIGS. 1A to 1D may be implemented by the base stations 531 to 538, for example. The terminal 130 depicted in FIGS. 1A to 1D may be implemented by the terminal 501, for example.

The base station 511 is a macro base station having a larger transmission power than the base stations 531 to 538. A large cell 521 is the cell of the base station 511. The base stations 531 to 538 are (small-sized) base stations having a smaller transmission power than the base station 511, forming the picocells, nanocells, phantom cells, etc. Cells having a smaller cell radius are called the picocell, nanocell, and phantom cell in the mentioned order. Small cells 541 to 548 are cells of the base stations 531 to 538.

The communication system 500 has a hierarchical cell structure in which the base stations 531 to 538 (small cells 541 to 548) are arranged in the large cell 521. A case will be described where the carrier aggregation is carried out for the communication system 500 having the hierarchical cell structure.

Figure 5B:
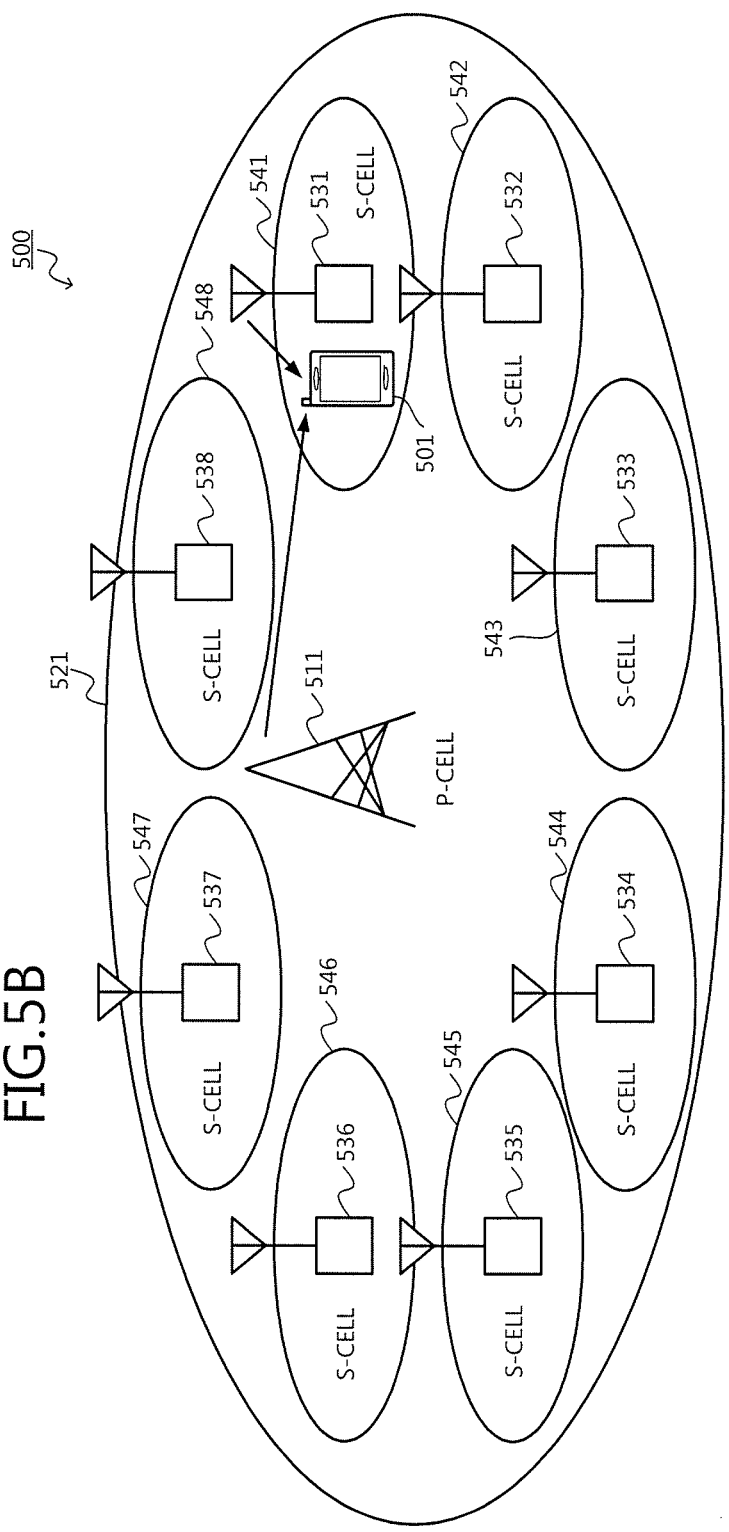
FIG. 5B is a diagram depicting an example of the carrier aggregation in the hierarchical cell structure.

FIG. 5B is a diagram depicting an example of the carrier aggregation in the hierarchical cell structure. For example, as depicted in FIG. 5B, the carrier aggregation is performed in the communication system 500 with the large cell 521 as the P-cell and the small cells 541 to 548 as the S-cells. However, the carrier aggregation may be performed with the large cell 521 as the S-cell and the small cells 541 to 548 as the P-cells.

There may be cells connectable as both the P-cell and the S-cell. The following description will be given of a case where the carrier aggregation is performed with the large cell 521 as the P-cell and the small cells 541 to 548 as the S-cells.

For example, in the communication system 500, the P-cell mainly transmits a control signal while the S-cell mainly transmits user data. This enables frequency use efficiency to be improved. This is an effect arising from the subdivision of the cell. The propagation loss is small due to a small terminal-to-base station distance of the S-cell. For this reason, the transmission power required for the user data transmission may be reduced in the uplink data transmission, enabling the power consumption to be reduced in the terminal 501.

Figure 6A:
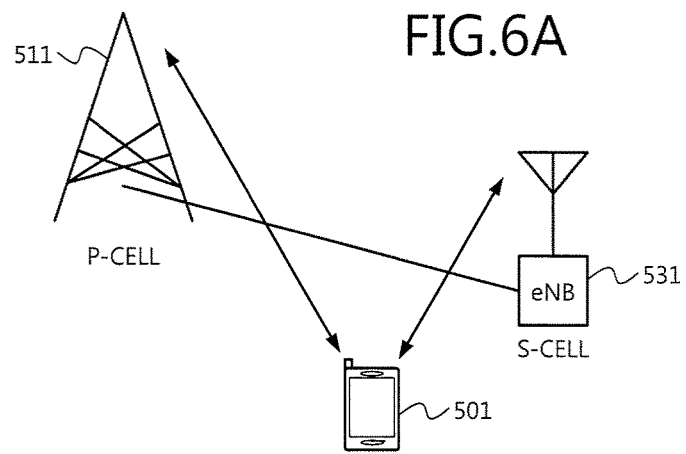
FIG. 6A is a diagram depicting Example 1 of a base station acting as the S-cell.

FIG. 6A is a diagram depicting Example 1 of the base station acting as the S-cell. In FIG. 6A, parts similar to those depicted in FIG. 5A are designated by the same reference numerals used in FIG. 5A and will not again be described. A case will be described where the carrier aggregation is performed with the base station 511 as the P-cell and the base station 531 as the S-cell.

For example, as depicted in FIG. 6A, the base station 531 acting as the S-cell may be for example a base station (evolved Node B (eNB)) connected by wire to the base station 511 (macro base station). In this case, the base stations 511 and 531 are connected to each other via the Internet or Intranet using Ethernet (registered trademark).

The base stations 511 and 531 may be connected to the MME (e.g. MME/S-GWs 211 and 212 depicted in FIG. 2), which is a higher-level apparatus of the base stations 511 and 531 and that manages the movement of the terminal 501. Here, the base station 531 configuring the small cell 541 may be connected directly to the MME or may be connected to the MME by way of the base station 511 configuring the large cell 521. The base station 531 may be a femto base station connected by a public channel (public circuit, public line) for example or may be a small base station (or a pico base station) connected via a dedicated channel (dedicated circuit, dedicated line) owned by a mobile network operator.

Figure 6B:
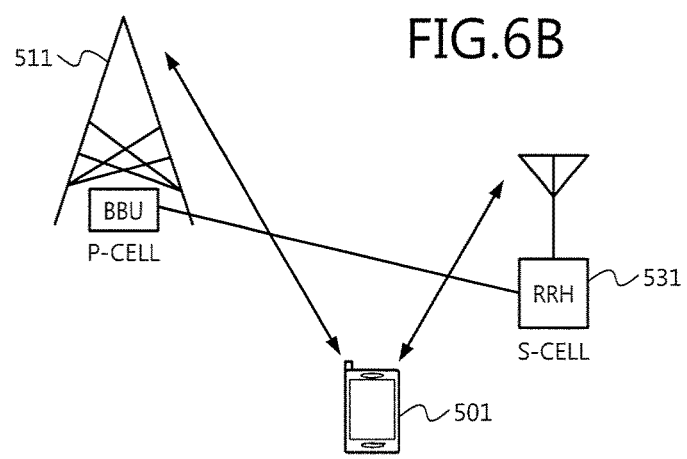
FIG. 6B is a diagram depicting Example 2 of the base station acting as the S-cell.

FIG. 6B is a diagram depicting Example 2 of the base station acting as the S-cell. In FIG. 6B, parts similar to those depicted in FIG. 6A are designated by the same reference numerals used in FIG. 6A and will not again be described. As depicted in FIG. 6B, the base station 531 may be a remote radio head (RRH) connected to a baseband unit (BBU) disposed in the base station 511. The RRH performs e.g. amplification of transmitting signals and receiving signals. The BBU performs processing such as modulation and demodulation. A dedicated channel such as optical channel may be used for the connection between the BBU and the RRH. The RRH may be called a satellite base station.

Figure 6C:
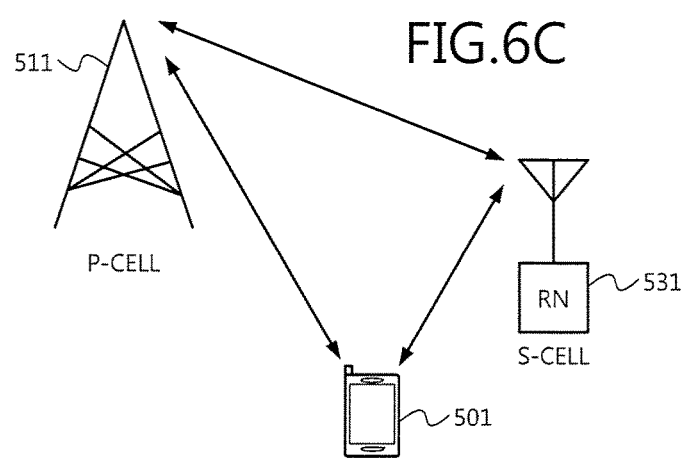
FIG. 6C is a diagram depicting Example 3 of the base station acting as the S-cell.

FIG. 6C is a diagram depicting Example 3 of the base station acting as the S-cell. In FIG. 6C, parts similar to those depicted in FIG. 6A are designated by the same reference numerals used in FIG. 6A and will not again be described. As depicted in FIG. 6C, the base station 531 may be a relay node (RN) that wireless relays communications of the base station 511. In this case, the base stations 511 and 531 are connected by wireless to each other.

In the following description, the configuration depicted in FIG. 6A will be described. It is, however, to be noted that the present invention may be implemented similarly also in the configurations depicted in FIGS. 6B and 6C.

A first selection of a cell in the hierarchical cell structure will be described. An example of TS36.304 that is the LTE specification will here be described.

In a first cell selection of the P-cell for example, the terminal 501 selects a cell satisfying formulae (1) to (3) below.

$$Srxlev > 0 \text{ AND } Squal > 0 \quad (1)$$

$$Srxlev = Q_{rxlevmeas} - (Q_{rxlevmin} + Q_{rxlevminoffset}) - P\text{compensation} \quad (2)$$

$$Squal = Q_{qualmeas} - (Q_{qualmin} + Q_{qualminoffset}) \quad (3)$$

In formula (1), Srxlev is a compensated received power of a target cell in the terminal 501. Squal is a compensated reception quality of the target cell in the terminal 501.

In formula (2), $Q_{rxleveas}$ is a result of measurement of the received power of the target cell in the terminal 501. The measurement result of the received power is, for example, a reference signal received power (RSRP). $Q_{rxlevmin}$ is a required received power. The required received power is a minimum received power [dBm] for satisfying a required error rate (e.g. bit error rate BER=0.01 or block error rate BLER=0.1) or a required transmission speed, for example. A reference signal (RS) corresponds to a pilot in a typical wireless communication system.

$Q_{rxlevminoffset}$ is an offset of the received power. Pcompensation is a compensation value that depends on the transmission power of a base station. For example, since the received power decreases if the transmission power of the base station decreases, compensation is carried out using Pcompensation. $Q_{rxlevmin}$, $Q_{rxlevminoffset}$, etc. are broadcasted as system information (system information block type 1 (SIB1)) to the terminal 501.

In this manner, the compensated received power Srxlev is a reception quality evaluation result based on the result obtained by subtracting the sum of the required received power and the broadcasted received power offset, from the measured received power. That is, Srxlev evaluates the margin for the required received power, while taking the received power offset into consideration.

In formula (3), $Q_{qualmeas}$ is a result of measurement of the reception quality of the target cell in the terminal 501. The reception quality measurement result is for example a reference signal reception quality (RSRQ). $Q_{qualmin}$ is a required reception quality. The required reception quality is a minimum reception quality for satisfying the required error rate or the required transmission speed for example. The reception quality is for example a signal noise ratio (SNR) or a signal-to-interference ratio (SIR).

$Q_{qualminoffset}$ is an offset of the required reception quality. Pcompensation is a compensation value that depends on the transmission power of a base station. For example, since the reception quality decreases if the transmission power of the base station decreases, compensation is carried out by Pcompensation. $Q_{qualmin}$, $Q_{qualminoffset}$, etc. are broadcasted as system information (SIB1) to the terminal 501.

In this manner, the compensated reception quality Squal is a reception quality evaluation result based on the result obtained by subtracting the sum of the required reception quality and the broadcasted reception quality offset, from the measured reception quality. That is, Squal evaluates the margin for the required reception quality, while taking the reception quality offset into consideration.

Although both Srxlev and Squal are used in a frequency division duplex (FDD) of the W-CDMA system, only the Srxlev is used in a time division duplex (TDD) of the W-CDMA system. The LTE Release8 also uses only Srxlev.

A cell reselection in the hierarchical cell structure will be described. The cell reselection is to again select a cell in the case of the elapse of a certain time in no communication state or due to cutoff of the channel after channel connection (see e.g., TS25.304 of the 3GPP).

In the cell reselection of the P-cell for example, the terminal 501 calculates $H_s$ and $H_n$ indicated in formula (4) below. The terminal 501 then ranks cells based on $H_s$ and $H_n$, to select a cell with a highest rank.

$$H_s = Q_{meas,s} - Qhcs_s$$

$$H_n = Q_{meas,n} - Qhcs_n - TO_n * L_n \quad (4)$$

$H_s$ in formula (4) is a reception quality evaluation result for the cell (serving cell) in connection. $H_s$ is a value obtained by subtracting a threshold value ($Qhcs_s$) of the quality of the wireless channel from the cell in connection, from the quality ($Q_{meas,s}$) of the downlink wireless channel from the cell in connection. $Q_{meas,s}$ is a reception quality (CPICH Ec/No) of a common pilot channel for example. "s" is a suffix indicating serving (serving cell), i.e. a destination cell or a standby cell.

$H_n$ in formula (4) is a reception quality evaluation result for a neighboring cell, i.e., an adjacent cell. $H_n$ is a value obtained by subtracting a threshold value ($Qhcs_n$) of the quality of the wireless channel from the neighboring cell and the product of $TO_n$ and $L_n$, from the quality ($Q_{meas,n}$) of the downlink wireless channel from the neighboring cell. $Q_{meas,n}$ is for example the reception quality (CPICH Ec/No) of the common pilot channel. "n" is a suffix indicating neighboring, i.e., a neighboring cell.

$TO_n$ is an adjustment value (offset) for different measurement timing. $L_n$ is a value becoming 0 when the priority of a cell in connection and the priority of a neighboring base station coincide with each other, but becoming 1 when they do not coincide with each other. $TO_n$ and $L_n$ in formula (4) may be obtained by formula (5), for example.

$$TO_n = \text{TEMP\_OFFSET}_n * W(\text{PENALTY\_TIME}_n - T_n)$$

$$L_n = 0 (\text{HCS\_PRIO}_n = \text{HCS\_PRIO}_s)$$

$$L_n = 1 (\text{HCS\_PRIO}_n \neq \text{HCS\_PRIO}_s)$$

$$W(x) = 0 (x < 0)$$

$$W(x) = 1 (x \geq 0) \quad (5)$$

In formula (5), $\text{PENALTY\_TIME}_n$ is an offset for different measurement timing of a neighboring cell (peripheral cell). $\text{TEMP\_OFFSET}_n$ is an offset for the duration of $\text{PENALTY\_TIME}_n$. $\text{HCS\_PRIO}_s$ is the priority in the cell in connection. $\text{HCS\_PRIO}_n$ is the priority in the neighboring cell. $W(x)$ is a weighting function. $T_n$ is a reception quality measurement timing.

$\text{Qhcs}_s$, $\text{Qhcs}n$, $\text{HCS\_PRIO}_s$, $\text{HCS\_PRIO}n$, $\text{PENALTY\_TIME}_n$, etc. are broadcasted as system information to the terminal 501 (see, e.g., TS36.304 and TS36.331 of the 3GPP).

For example, if the measurement timing $T_n$ is longer than $\text{PENALTY\_TIME}_n$, $W(x)=0$ is obtained. For this reason, if the quality ($Q_{meas,n}$) of the downlink wireless channel from the neighboring cell is higher than the threshold value ($\text{Qhcs}_n$), the reception quality evaluation result ($H_n$) of the neighboring cell becomes a value greater than 0. In the same manner, if the quality ($Q_{meas,s}$) of the downlink wireless channel from the cell in connection is higher than the threshold value ($\text{Qhcs}_s$), the reception quality evaluation result ($H_s$) of the cell in connection becomes a value greater than 0.

The measurement of the wireless channel quality by the terminal 501 will be described. By allowing the symbol synchronization, the terminal 501 can fetch only a pilot signal from the base station. The terminal 501 then measures the received power (RSRQ) of the fetched pilot signal. The terminal 501 compares a calculated pilot signal sequence with the received pilot signal sequence, to measure the received signal quality (RSRQ).

The reception of system information by the terminal 501 will be described. By synchronization with a transmitting signal from the neighboring base station, the terminal 501 can receive system information broadcasted from the neighboring base station. In the LTE system for example, the system information is a master information block (MIB) and a system information block (SIB).

The MIB includes information such as downlink frequency bandwidth and wireless frame number. At present, the SIB is defined from SIB1 up to SIB16 (system information block type 16). However, the SIB may further be increased.

These types of system information are transmitted through a broadcast control channel (BCCH) that is a logical channel. The BCCH is mapped to a broadcast channel (BCH) or a downlink shared channel (DL-SCH) that are transport channels.

The system information is further transmitted to the terminal 501 using a wireless channel in the form of the PBCH or the PDSCH. The system information is broadcasted as common control information to the terminal 501 connected to the base station for waiting or receiving, not only through the wireless broadcast channel but also through the wireless downlink shared channel. The broadcast refers to so-called broadcasting, and the terminal 501 does not transmit to the base station, a response to the broadcast signal.

These types of system information, including information (hereinafter, "P-cell selection information") for selecting a large cell as the P-cell, may or may not be broadcasted to the terminal 501. The P-cell selection information includes, for example, being the P-cell, a priority when selected as the P-cell, and offset information for the quality of the wireless channel used at the time of cell selection. Control information for executing the carrier aggregation and indicating having the hierarchical cell structure may also be transmitted as the system information.

Information (hereinafter, "S-cell selection information") for selection as the S-cell may or may not be broadcasted to the terminal 501. The S-cell selection information includes, for example, information such as being the S-cell, a priority when selected as the P-cell, and an offset for the wireless channel quality used at the time of cell selection.

The conventional cell selection information is the priority, the offset information used for the cell selection, etc. and it has not yet been defined whether each cell is to be used as the P-cell or as the S-cell. Therefore, in the case of executing the cell selection using the conventional cell selection information, failure such as errant selection of a cell to be used as the S-cell, as the P-cell has occurred.

Meanwhile, since for example, P-cell selection information includes a parameter indicating being the P-cell, the terminal 501 can specify a cell to be used as the P-cell and select the cell to be used as the P-cell, as the P-cell.

For example, depending on the wireless channel quality threshold value, wireless channel quality, priority, measurement timing, and the value of penalty time, of each cell, a neighboring cell available only as the S-cell, instead of the base station in connection (e.g. a cell used as the P-cell), may be selected as the P-cell.

FIG. 7A is a diagram depicting an example of contention-based random access. In FIG. 7A, a case will be described where the terminal (UE) 501 selects the base station 511 that is a large cell, as the P-cell, and performs a contention-based random access procedure with respect to the selected base station 511. First, the terminal 501 transmits a random access preamble as a message 1 to the base station 511 (step S711).

The base station 511 then identifies the terminal 501 based on the random access preamble received at step S711 and configures a cell-radio network temporary identifier (C-RNTI) as an identifier of the terminal 501. The C-RNTI configured here is a temporary C-RNTI as a temporary identifier, for example.

The base station 511 configures, for the terminal 501, a UL grant, timing alignment information, a channel quality indicator (CQI) request, etc. The base station 511 then transmits a random access response including these configuration results and the random access preamble received at step S711, as a message 2, to the terminal 501 (step S712).

The terminal 501 then verifies whether the random access preamble transmitted at step S711 coincides with the random access preamble received at step S712. If not, the terminal 501 determines that the random access response received at step S712 is addressed to another terminal and again transmits the random access preamble. Here, the terminal 501 may transmit the most-recently transmitted random access preamble or select and transmit a different random access preamble.

If the random access preambles coincide, the terminal 501 recognizes that the random access response received at step S712 is addressed to the terminal 501. The terminal 501 then transmits a scheduled transmission including an RRC connection request, etc., as a message 3, to the base station 511 (step S713). The transmitting at step S713 is performed using the UL grant included in the random access response received at step S712 or using a wireless resource and a modulation scheme specified by the random access response.

The base station 511 transmits a contention resolution that is a response signal (ACK/NACK) to the scheduled transmission received at step S713, as a message 4 (step S714). This completes the wireless channel configuration between the terminal 501 and the base station 511.

FIG. 7B is a diagram depicting an example of non-contention-based random access. In FIG. 7B, a case will be described where the terminal (UE) 501 selects the base station 531 that is a small cell, as the S-cell, and performs a non-contention-based random access procedure with respect to the selected base station 531.

First, the base station 531 transmits a random access preamble assignment including a dedicated preamble, as a message 0, to the terminal 501 (step S721). The random access preamble assignment may include control information such as system information for allowing the base station 531 selected as the S-cell and the terminal 501 to execute a random access procedure.

The terminal 501 transmits a random access preamble as the message 1 to the base station 531 (step S722). The random access preamble transmitted at step S722 is a dedicated preamble included in the random access preamble assignment received at step S721.

The base station 531 transmits as the message 2 to the terminal 501, a random access response to the dedicated preamble received at step S722 (step S723). This terminates a series of non-contention-based random access procedure, configuring a channel between the terminal 501 and the base station 531. That is, the S-cell is added to the terminal 501 so that the carrier aggregation is configured therein.

The S-cell may be configured only through the downlink channel. The addition of the S-cell in this case is configured by allowing the P-cell to notify the terminal 501 of a request to add the S-cell (i.e. a request to receive the S-cell) and information for adding the S-cell (e.g. information on S-cell to be added (e.g. a cell ID, etc.) so that the notified terminal 501 receives the notified S-cell. As a result, the S-cell is added and the carrier aggregation is configured.

Figure 8A:
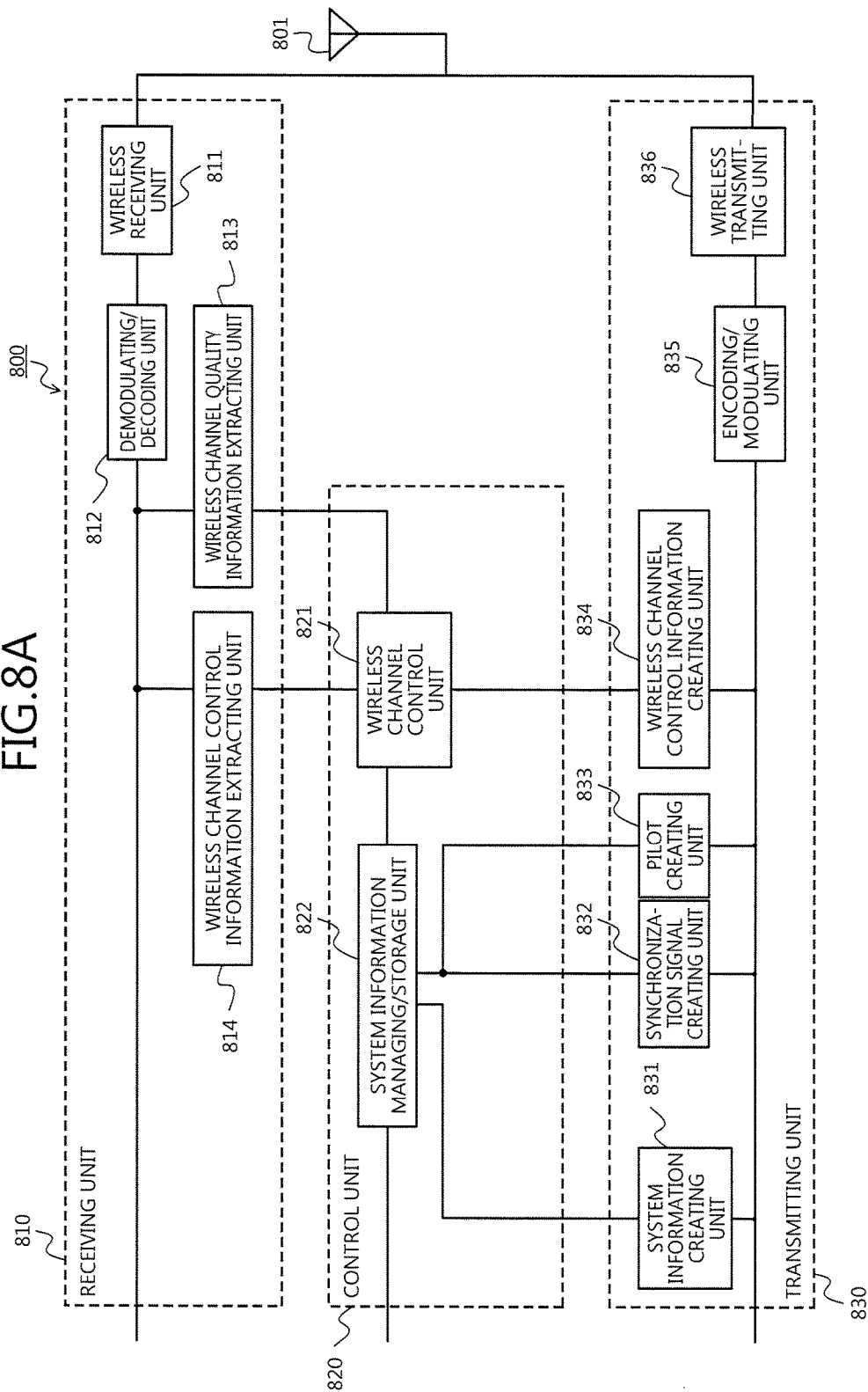
FIG. 8A is a diagram depicting an example of the base station.
Figure 8B:
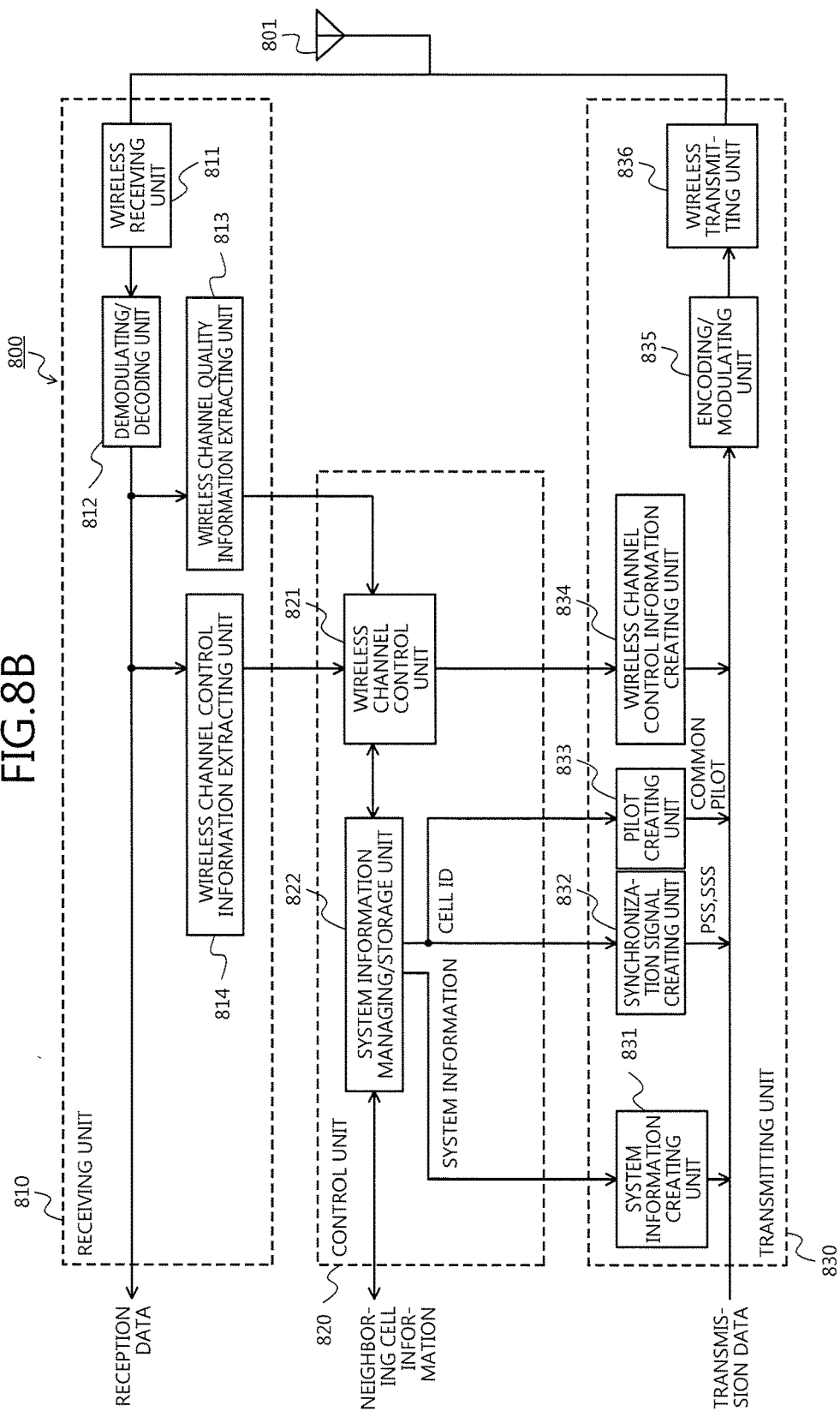
FIG. 8B is a diagram depicting an example of signal flow in the base station depicted in FIG. 8A.

FIG. 8A is a diagram depicting an example of the base station. FIG. 8B is a diagram depicting an example of signal flow in the base station depicted in FIG. 8A. Each of the base stations 511 and 531 to 538 may be implemented by a base station 800 depicted in FIGS. 8A and 8B for example. The base station 800 includes an antenna 801, a receiving unit 810, a control unit 820, and a transmitting unit 830. The receiving unit 810 includes a wireless receiving unit 811, a demodulating/decoding unit 812, a wireless channel quality information extracting unit 813, and a wireless channel control information extracting unit 814.

The control unit 820 includes a wireless channel control unit 821, and a system information managing/storage unit 822. The transmitting unit 830 includes a system information creating unit 831, a synchronization signal creating unit 832, a pilot creating unit 833, a wireless channel control information creating unit 834, a encoding/modulating unit 835, and a wireless transmitting unit 836.

The transmitting units 111 and 121 depicted in FIGS. 1A to 1D may be implemented by the antenna 801 and the transmitting unit 830 for example. The control units 112 and 122 depicted in FIGS. 1A to 1D may be implemented by the control unit 820, for example.

The antenna 801 receives a signal transmitted by wireless from a terminal (e.g. the terminal 501) located in a cell of the base station 800 and outputs the received signal to the wireless receiving unit 811. The antenna 801 transmits a signal output from the wireless transmitting unit 836, wirelessly, to the terminal located in the cell of the base station 800.

The wireless receiving unit 811 performs reception processing of the signal output from the antenna 801. The reception processing in the wireless receiving unit 811 includes, e.g., amplification, frequency conversion from the high frequency band to the baseband, and conversion from an analog signal to a digital signal. The wireless receiving unit 811 outputs the reception-processed signal to the demodulating/decoding unit 812.

The demodulating/decoding unit 812 demodulates and decodes the signal output from the wireless receiving unit 811. The demodulating/decoding unit 812 then outputs reception data obtained by the demodulation and decoding. The reception data output from the demodulating/decoding unit 812 is output to a processing unit in the upper layer of the receiving unit 810, the wireless channel quality information extracting unit 813, and the wireless channel control information extracting unit 814.

The wireless channel quality information extracting unit 813 extracts wireless channel quality information included in the reception data output from the demodulating/decoding unit 812. The wireless channel quality information is for example the CQI, RSRP, and RSRQ. The wireless channel quality information extracting unit 813 outputs the extracted wireless channel quality information to the wireless channel control unit 821.

The wireless channel control information extracting unit 814 extracts wireless channel control information included in the reception data output from the demodulating/decoding unit 812. The wireless channel control information is, for example, a random access preamble, each random access message, and various response signals (ACK/NACK). The wireless channel control information extracting unit 814 outputs the extracted wireless channel control information to the wireless channel control unit 821.

The wireless channel control unit 821 performs control of the wireless channel in the base station 800. For the wireless channel control, for example, wireless channel quality information output from the wireless channel quality information extracting unit 813, wireless channel control information output from the wireless channel control information extracting unit 814, and system information (bandwidth or preamble) stored in the system information managing/storage unit 822 are used. The wireless channel control includes, for example, random access control and scheduling of the terminal (e.g., the base station 800). For example, the wireless channel control unit 821 notifies the wireless channel control information creating unit 834 of wireless channel control information addressed to the terminal in accordance with the wireless channel control.

The control of wireless channels includes, for example, control of random access, scheduling of a terminal (e.g., the base station 800), and a measurement request to a terminal. The control of wireless channels includes detection of the errant selection of the P-cell and the errant selection of the S-cell by a terminal. For example, the wireless channel control unit 821 notifies the wireless channel control information creating unit 834 of the wireless channel control information addressed to a terminal corresponding to the control of wireless channels.

The wireless channel control information also includes handover request to the P-cell when the errant selection of the P-cell is detected, handover request to the S-cell when the errant selection of the S-cell is detected, etc. The wireless channel control information may also include a measurement request for wireless channel quality of P-cells when the errant selection of the P-cell is detected, a measurement request for wireless channel quality of S-cells when the errant selection of the S-cell is detected, etc.

The system information managing/storage unit 822 performs the management and storage of system information. For example, the system information managing/storage unit 822 acquires and stores system information obtained by the wireless channel control of the wireless channel control unit 821, from the wireless channel control unit 821. The system information managing/storage unit 822 outputs to the wireless channel control unit 821, system information needed for the wireless channel control of the wireless channel control unit 821 among the stored system information.

The system information managing/storage unit 822 receives system information of a neighboring cell of the base station 800, as neighboring cell information, from the neighboring cell. The system information managing/storage unit 822 transmits system information of the base station 800, as neighboring information, to the neighboring cell of the base station 800.

The system information managing/storage unit 822 notifies the system information creating unit 831 of system information. The system information includes for example information (e.g., cell ID and bandwidth) related to the base station 800. The system information includes information (e.g., an available random access preamble) at the time of executing the random access procedure. The system information includes information (such as a cell priority and offset) related to the cell selection. The system information includes information related to the neighboring base station.

These types of system information are broadcasted as common control information by the base station 800 to the terminals within the cell of the base station 800, using the BCCH as the logical channel and using the PBCH or the PDSCH. When the system information includes a cell priority and offset used for the cell selection, the cell selection is carried out based on those types of information.

For example, when the base station 800 is the base station 511 forming the large cell 521 (P-cell), the system information includes e.g. a parameter indicating that the cell of the station is the P-cell and a priority and offset used when selecting the cell of the station as the P-cell. For example, when the base station 800 is the base station 531 forming the small cell 541 (S-cell), the system information includes e.g. a parameter indicating that the cell of the station is the S-cell and a priority and offset used when selecting the cell of the station as the S-cell.

The system information managing/storage unit 822 outputs a cell ID of the base station 800 to the synchronization signal creating unit 832 and the pilot creating unit 833.

The transmitting unit 830 receives transmitting data to be transmitted by the base station 800, from the processing unit in the upper layer of the transmitting unit 830. The transmitting data received by the transmitting unit 830 is input to the encoding/modulating unit 835.

The system information creating unit 831 creates system information notified from the system information managing/storage unit 822 and maps the created system information to the broadcast channel, for output to the encoding/modulating unit 835.

The synchronization signal creating unit 832 creates a primary synchronization signal (PSS) (first synchronization signal) and a secondary synchronization signal (SSS) (second synchronization signal) that are synchronization signals based on the cell ID output from the system information managing/storage unit 822. The synchronization signal creating unit 832 then maps the created synchronization signals to the broadcast channel, for the output to the encoding/modulating unit 835.

The pilot creating unit 833 creates a common pilot that is a pilot signal based on the cell ID output from the system information managing/storage unit 822 and, maps the created common pilot to a wireless frame, similar to the wireless control channel or the shared channel, for the output to the encoding/modulating unit 835. The pilot creating unit 833 may map the common pilot to a pilot channel and may map it to the wireless frame in the same manner.

The pilot created by the pilot creating unit 833 may include, for example, a cell specific pilot common to plural terminals in the cell. The pilot created by the pilot creating unit 833 may include a dedicated pilot (UE specific RS) allocated to individual terminals. The pilot created by the pilot creating unit 833 may include a pilot (positioning pilot or positioning RS) for position measurement. The pilot created by the pilot creating unit 833 may include a pilot (channel state information pilot or CSI-RS) for measuring the wireless channel quality. That is, the pilot created by the pilot creating unit 833 may be a known signal that is decided in advance between the base station 800 and the terminals or in the wireless communication system.

The wireless channel control information creating unit 834 creates wireless channel control information notified from the wireless channel control unit 821 and maps the created wireless channel control information to the broadcast channel or the shared channel, for the output to the encoding/modulating unit 835.

The encoding/modulating unit 835 performs encoding and modulation of input transmitting data and each information (signals) output from the system information creating unit 831, the synchronization signal creating unit 832, the pilot creating unit 833, and the wireless channel control information creating unit 834. The encoding/modulating unit 835 then outputs the signal obtained by the encoding and modulation to the wireless transmitting unit 836.

The wireless transmitting unit 836 performs a transmitting process of the signal output from the encoding/modulating unit 835. The transmitting process at the wireless transmitting unit 836 includes, for example, conversion from a digital signal to an analog signal, frequency conversion from the baseband to the high-frequency band, and amplification. The wireless transmitting unit 836 outputs the signal obtained by the transmitting process to the antenna 801.

FIG. 8C is a diagram depicting an example of the hardware configuration of the base station. In FIG. 8C, parts similar to those depicted in FIGS. 8A and 8B are designated by the same reference numerals and will not again be described. The base station 800 depicted in FIGS. 8A and 8B may be implemented by a communication device 840 depicted in FIG. 8C for example. The communication device 840 includes an antenna 801, a large scale integration (LSI)

841, a digital signal processor (DSP) 842, a memory 843, and a communication interface (I/F) 844.

The LSI 841 is connected to the antenna 801 and the DSP 842. The wireless receiving unit 811 and the wireless transmitting unit 836 depicted in FIGS. 8A and 8B may be implemented by a circuit such as the LSI 841 for example.

The DSP 842 is connected to the LSI 841, the memory 843, and the communication interface 844. The DSP 842 provides overall control of the communication device 840. The memory 843 includes, for example, a main memory and an auxiliary memory. The main memory is a random access memory (RAM), for example. The main memory is used as a work area of the DSP 842. The auxiliary memory is a non-volatile memory such as a magnetic disk and a flash memory, for example. The auxiliary memory stores various programs operating the communication device 840. The programs stored in the auxiliary memory are loaded onto the main memory and executed by the DSP 842.

The communication interface 844 is an interface performing communication with an external communication device. The communication interface 844 may be, for example, a wired communication interface.

The demodulating/decoding unit 812, the wireless channel quality information extracting unit 813, the wireless channel control information extracting unit 814, the wireless channel control unit 821, and the system information managing/storage unit 822 depicted in FIGS. 8A and 8B may be implemented by a circuit such the DSP 842 and the memory 843, for example. The system information creating unit 831, the synchronization signal creating unit 832, the pilot creating unit 833, the wireless channel control information creating unit 834, and the encoding/modulating unit 835 depicted in FIGS. 8A and 8B may be implemented by a circuit such as the DSP 842 and the memory 843, for example. The interface for communication with a neighboring cell of the system information managing/storage unit 822 depicted in FIGS. 8A and 8B may be implemented by the communication interface 844, for example.

The DSP 842 may be replaced by a central processing unit (CPU) or by a combination of the DSP and the CPU.

Figure 9A:
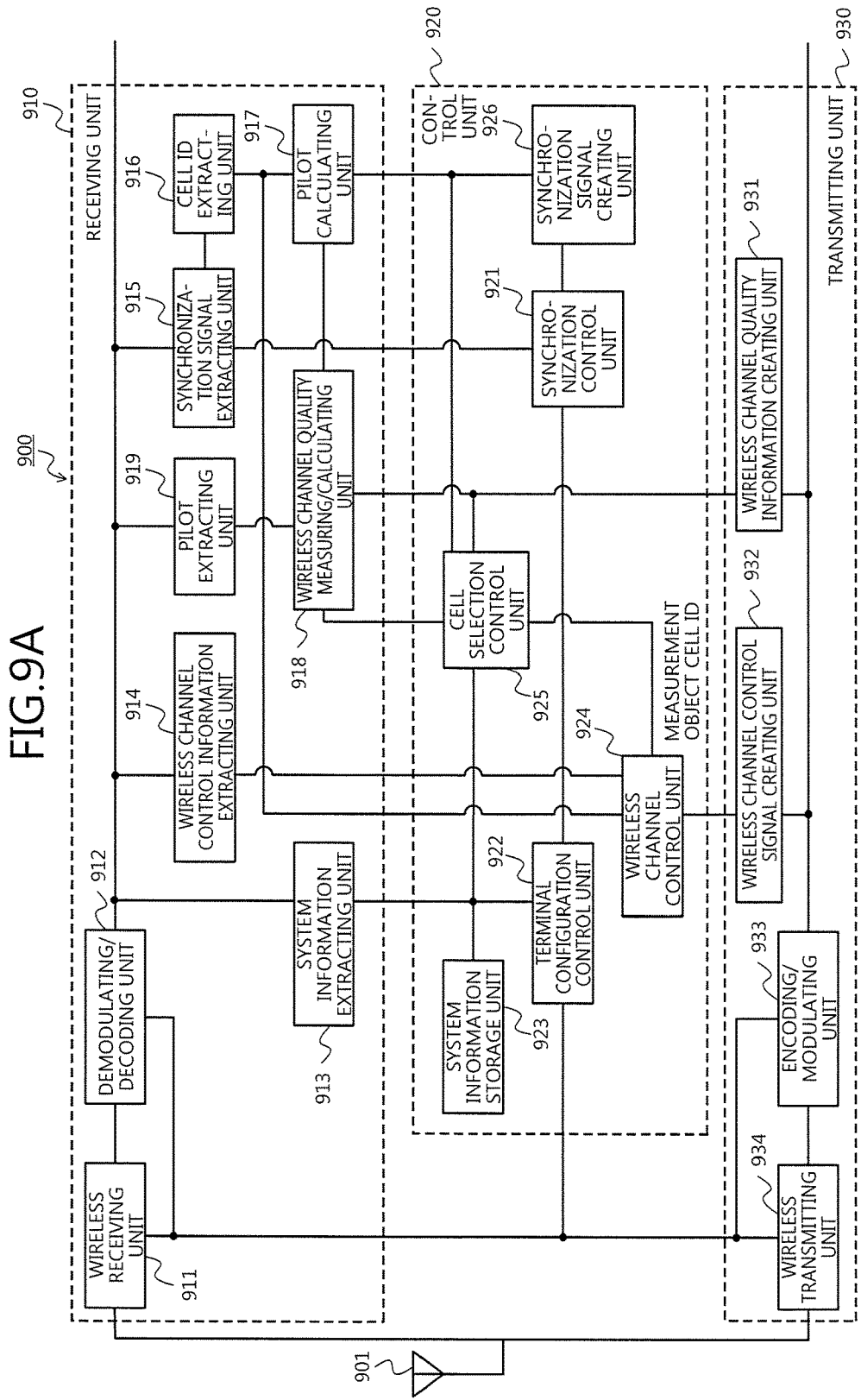
FIG. 9A is a diagram depicting an example of a terminal.
Figure 9B:
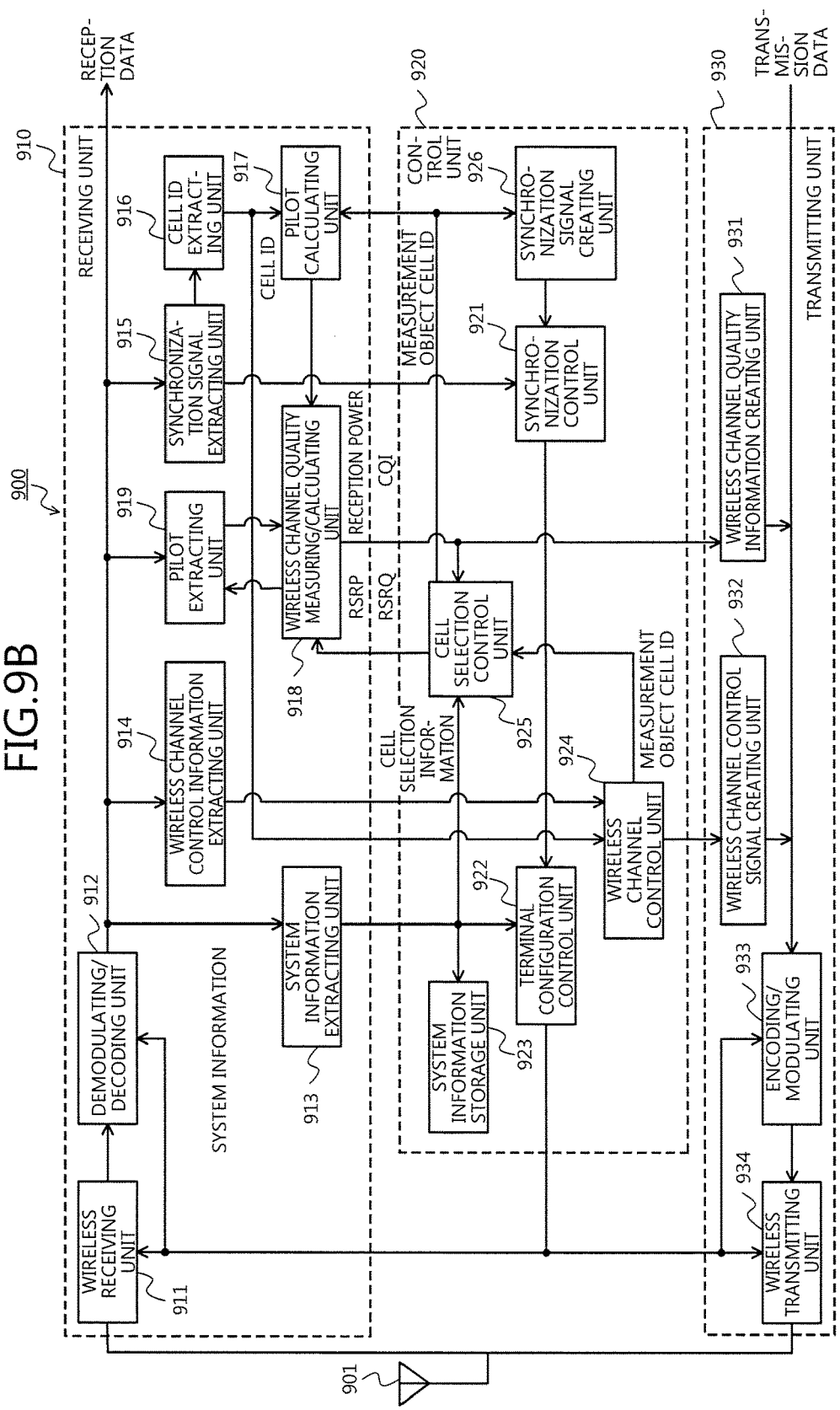
FIG. 9B is a diagram depicting an example of signal flow in the terminal depicted in FIG. 9A.

FIG. 9A is a diagram depicting an example of the terminal. FIG. 9B is a diagram depicting an example of signal flow in the terminal depicted in FIG. 9A. As depicted in FIGS. 9A and 9B, a terminal 900 includes an antenna 901, a receiving unit 910, a control unit, 920 and transmitting unit 930.

The receiving unit 910 includes a wireless receiving unit 911, a demodulating/decoding unit 912, a system information extracting unit 913, a wireless channel control information extracting unit 914, a synchronization signal extracting unit 915, and a cell ID extracting unit 916. The receiving unit 910 includes a pilot calculating unit 917, a wireless channel quality measuring/calculating unit 918, and a pilot extracting unit 919.

The control unit 920 includes a synchronization control unit 921, a terminal configuration control unit 922, a system information storage unit 923, a wireless channel control unit 924, a cell selection control unit 925, and a synchronization signal creating unit 926. The transmitting unit 930 includes a wireless channel quality information creating unit 931, a wireless channel control signal creating unit 932, an encoding/modulating unit 933, and a wireless transmitting unit 934.

The selecting unit 131 depicted in FIGS. 1A, 1B may be implemented by the antenna 901, the receiving unit 910, and the control unit 920, for example. The control unit 132 depicted in FIGS. 1A, 1B may be implemented by the control unit 920, for example.

The antenna 901 receives a signal transmitted wirelessly from the base station (e.g. base station 511, 531, or 800) and outputs the received signal to the wireless receiving unit 911. The antenna 901 transmits wirelessly to the base station, a signal output from the wireless transmitting unit 934.

The wireless receiving unit 911 performs reception processing of the signal output from the antenna 901. The reception processing at the wireless receiving unit 911 includes, e.g., amplification, frequency conversion from the high frequency band to the baseband, and conversion from an analog signal to a digital signal. The wireless receiving unit 911 outputs the reception-processed signal to the demodulating/decoding unit 912.

The demodulating/decoding unit 912 demodulates and decodes the signal output from the wireless receiving unit 911. The demodulating/decoding unit 912 then outputs reception data obtained by the demodulation and decoding. The reception data output from the demodulating/decoding unit 912 is provided to a processing unit in the upper layer of the receiving unit 910, the system information extracting unit 913, the wireless channel control information extracting unit 914, the synchronization signal extracting unit 915, and the pilot extracting unit 919.

The system information extracting unit 913 extracts system information transmitted as broadcast information from the base station 800, included in the reception data imparted from the demodulating/decoding unit 912. The system information includes, for example, information on the execution of the carrier aggregation, P-cell selection information, and S-cell selection information. The system information extracting unit 913 outputs the extracted system information to the terminal configuration control unit 922, and the cell selection control unit 925.

In a case where the cell ID, frequency, and bandwidth of each cell subordinate to the base station 511, for example, are previously decided, the system information extracting unit 913 may store the extracted system information to the system information storage unit 923. In this case, the terminal 900 need not receive the system information later on in the large cell 521 of the base station 511. The system information may be stored in advance in the system information storage unit 923.

The wireless channel control information extracting unit 914 extracts wireless channel control information included in the reception data output from the demodulating/decoding unit 912 and outputs the extracted wireless channel control information to the wireless channel control unit 924. The wireless channel control information includes a random access response, a handover instruction, etc.

The synchronization signal extracting unit 915 extracts the PSS and the SSS that are synchronization signals included in the reception data output from the demodulating/decoding unit 912. The synchronization signal extracting unit 915 outputs the PSS and SSS extraction results to the cell ID extracting unit 916 and the synchronization control unit 921.

The cell ID extracting unit 916 extracts a cell ID of the PSS and SSS transmitter cell, based on the extraction results output from the synchronization signal extracting unit 915. The cell ID extracting unit 916 then outputs the extracted cell ID to the pilot calculating unit 917 and the wireless channel control unit 924.

The pilot calculating unit 917 calculates a pattern of a pilot based on the cell ID output from the cell ID extracting unit 916 and the measurement object cell ID output from the cell selection control unit 925. The pilot calculating unit 917 notifies the wireless channel quality measuring/calculating unit 918 of the calculated pattern of the pilot.

The wireless channel quality measuring/calculating unit 918 controls the pilot extracting unit 919 so as to extract a pilot of the pattern notified from the pilot calculating unit 917. The wireless channel quality measuring/calculating unit 918 then measures the wireless channel quality based on the pilot output from the pilot extracting unit 919 and calculates wireless channel quality information based on the measurement result. The wireless channel quality measuring/calculating unit 918 outputs the calculated wireless channel quality information to the cell selection control unit 925 and the wireless channel quality information creating unit 931. The wireless channel quality information is, for example, the CQI, RSRP, RSRQ, etc.

The synchronization control unit 921 synchronizes with a transmission-source base station of a pilot based on an extraction result output from the synchronization signal extracting unit 915 and a synchronization signal output from the synchronization signal creating unit 926. The synchronization is, for example, synchronization of wireless frames established by matching timing of the start of the frames etc., or synchronization of slots making up the wireless frames or symbols (or wireless signals) making up the slots. It is noted that one wireless frame is made up of 20 slots or 10 sub-frames each made up of two slots.

The synchronization control unit 921 provides synchronization control for controlling the reception or transmitting timing of the terminal 900, based on the synchronized timing. For example, the synchronization control unit 921 notifies the terminal configuration control unit 922 of the timing synchronized with the base station.

The terminal configuration control unit 922 provides control of the wireless receiving unit 911, the demodulating/decoding unit 912, the encoding/modulating unit 933, and the wireless transmitting unit 934, based on the timing notified from the synchronization control unit 921. The control by the terminal configuration control unit 922 uses system information output from the system information extracting unit 913 and the system information stored in the system information storage unit 923. The control by the terminal configuration control unit 922 includes control related to the carrier aggregation, etc.

The wireless channel control unit 924 performs control of the wireless channel of the terminal 900. The wireless channel control of the terminal 900 includes, for example, the random access procedure and the handover procedure. The wireless channel control of the terminal 900 is performed based on, for example, the cell ID output from the cell ID extracting unit 916 or the wireless channel control information output from the wireless channel control information extracting unit 914. The wireless channel control unit 924 notifies the wireless channel control signal creating unit 932 of wireless channel control information in accordance with the wireless channel control. The wireless channel control unit 924 outputs to the cell selection control unit 925, the measurement object cell ID indicating a cell to be subject synchronization or for which a pilot is extracted.

The cell selection control unit 925 performs selection of a P-cell and an S-cell to which the terminal 900 is connected. The cell selection by the cell selection control unit 925 is performed based on, for example, the wireless channel quality information output from the wireless channel quality measuring/calculating unit 918, the system information output from the system information extracting unit 913, or the system information stored in the system information storage unit 923. The cell selection control unit 925 outputs to the pilot calculating unit 917 and the synchronization signal creating unit 926, the measurement cell ID output from the wireless channel control unit 924.

For example, in the case of selecting a P-cell to which the terminal 900 is to be connected, the cell selection control unit 925 selects a cell connectable as the P-cell, based on P-cell selection information included in the system information output from the system information extracting unit 913.

In the case of selecting an S-cell to which the terminal 900 is to be connected, the cell selection control unit 925 selects a cell connectable as the S-cell, based on S-cell selection information included in the system information output from the system information extracting unit 913. However, in a case where the base station 800 selects an S-cell to which the terminal 900 is to be connected, the cell selection control unit 925 selects an S-cell specified by the system information.

The cell selection control unit 925 controls a cell subject to measurement and calculation of wireless channel quality at the wireless channel quality measuring/calculating unit 918 based on the measurement object cell ID output from the wireless channel control unit 924.

The synchronization signal creating unit 926 generates a synchronization signal based on the measurement object cell ID output from the cell selection control unit 925. The synchronization signal creating unit 926 outputs the generated synchronization signal to the synchronization control unit 921. By disposing the synchronization signal creating unit 926 in the terminal 900, matching may be made between the synchronization signal received by the terminal 900 and the generated synchronization signal.

To the transmitting unit 930, transmission data to be transmitted by the terminal 900 is input from a processing unit on a higher-level layer of the transmitting unit 930. The transmission data input to the transmitting unit 930 is input to the encoding/modulating unit 933.

The wireless channel quality information creating unit 931 generates wireless channel quality information based on the wireless channel quality information given in the notification from the wireless channel quality measuring/calculating unit 918. The wireless channel quality information creating unit 931 maps and outputs the generated wireless channel quality information on the control channel to the encoding/modulating unit 933.

The wireless channel control signal creating unit 932 creates wireless channel control information notified from the wireless channel control unit 924, maps the created wireless channel control information to the control channel, and outputs the result to the encoding/modulating unit 933.

The encoding/modulating unit 933 performs encoding and modulation of input transmitting data and each information (signals) output from the wireless channel quality information creating unit 931 and the wireless channel control signal creating unit 932. The encoding/modulating unit 933 then outputs to the wireless transmitting unit 934, a signal obtained by the encoding and modulation.

The wireless transmitting unit 934 performs a transmitting process on the signal output from the encoding/modulating unit 933. The transmitting process at the wireless transmitting unit 934 includes, for example, conversion from a digital signal to an analog signal, frequency conversion from the baseband to the high-frequency band, and amplification. The wireless transmitting unit 934 outputs the signal obtained by the transmitting process to the antenna 901.

Figure 9C:
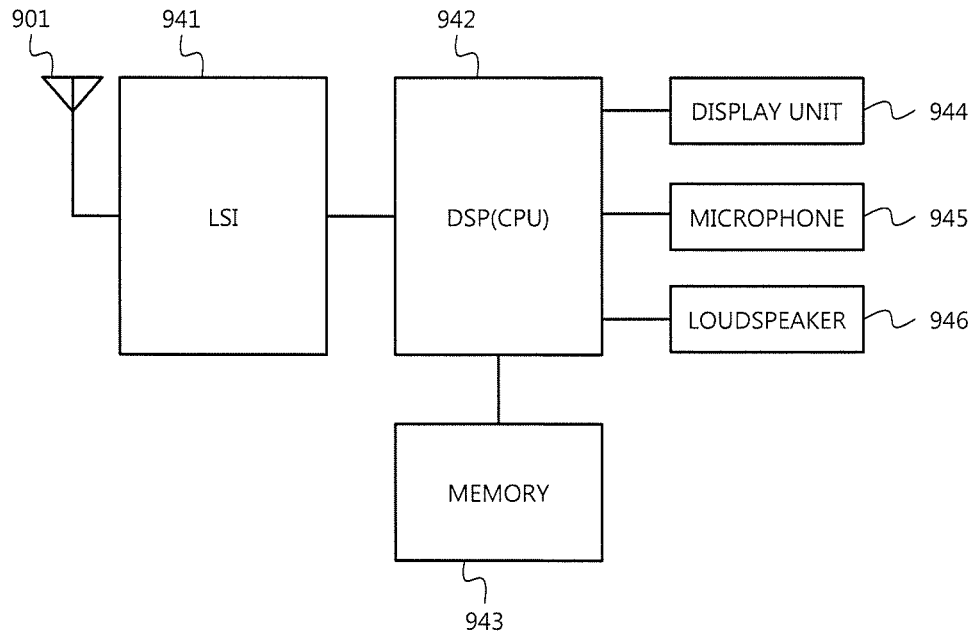
FIG. 9C is a diagram depicting an example of hardware configuration of the terminal.

FIG. 9C is a diagram depicting an example of hardware configuration of the terminal. In FIG. 9C, parts similar to those depicted in FIGS. 9A and 9B are designated by the same reference numerals used in FIGS. 9A and 9B and will not again be described. The terminal 900 depicted in FIGS. 9A and 9B may be implemented by a communication device 940 depicted in FIG. 9C, for example. The communication device 940 includes an antenna 901, an LSI 941, a DSP 942, a memory 943, a display unit 944, a microphone 945, and a loudspeaker 946.

The LSI 941 is connected to the antenna 901 and the DSP 942. The wireless receiving unit 911 and the wireless transmitting unit 934 depicted in FIGS. 9A and 9B may be implemented by a circuit such as the LSI 941, for example.

The DSP 942 is connected to the LSI 941 and the memory 943. The DSP 942 provides control of the entire communication device 940. The memory 943 includes, for example, a main memory and an auxiliary memory. The main memory is the RAM, for example. The main memory is used as a work area of the DSP 942. The auxiliary memory is a non-volatile memory such as a magnetic disk and a flash memory, for example. The auxiliary memory stores various programs operating the communication device 940. The programs stored in the auxiliary memory are loaded onto the main memory and executed by the DSP 942.

A circuit such the DSP 942 and the memory 943, for example, may implement the demodulating/decoding unit 912, the system information extracting unit 913, the wireless channel control information extracting unit 914, the synchronization signal extracting unit 915, and the cell ID extracting unit 916 depicted in FIGS. 9A and 9B. A circuit such as the DSP 942 and the memory 943, for example, may implement the pilot calculating unit 917, the wireless channel quality measuring/calculating unit 918, and the pilot extracting unit 919 depicted in FIGS. 9A and 9B.

A circuit such as the DSP 942 and the memory 943, for example, may implement the synchronization control unit 921, the terminal configuration control unit 922, the system information storage unit 923, the wireless channel control unit 924, the cell selection control unit 925, and the synchronization signal creating unit 926 depicted in FIGS. 9A and 9B. A circuit such as the DSP 942 and the memory 943, for example, may implement the wireless channel quality information creating unit 931, the wireless channel control signal creating unit 932, and the encoding/modulating unit 933 depicted in FIGS. 9A and 9B. The DSP 942 may be replaced by a CPU or by a combination of the DSP and the CPU.

The display unit 944, the microphone 945, and the loudspeaker 946 are user interfaces of the user of the communication device 940. The display unit 944 may be a device functioning also as an input device, such as a touch panel, for example.

The synchronization such as frame synchronization and slot synchronization and the cell ID will be described. The PSS and SSS as synchronization signals of the LTE system are created on the basis of the cell ID. A total of 504 cell IDs are defined with 168 groups each consisting of three cell IDs. $N_{ID}(1)$ indicating a group is an integer value from 0 to 167 and $N_{ID}(2)$ indicating an element of a group is an integer value from 0 to 2. The cell ID is expressed, for example, as $N_{ID}(cell)=3N_{ID}(1)+N_{ID}(2)$.

Here, $N_{ID}(cell)$ represents a cell ID; $N_{ID}(1)$ represents 168 types of groups (cell groups); and $N_{ID}(2)$ represents three different identifiers. This enables 504 types of cell IDs to be represented. In the LTE or the LTE-Advanced, the PSS is correlated with the SSS so that a cell ID may be specified by specifying the PSS and the SSS.

The PSS (root sequence) will be described. The PSS is a 62-bit signal sequence. The PSS is created by using Zadoff-Chu sequence of the frequency range and may be expressed by formula (6) below, for example.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad (6)$$

Here, a root index u is correlated with the cell group identifier $N_{ID}(2)$. The root index u indicates an index of the Zadoff-Chu root sequence, with three different root indexes u being defined in advance. The terminal 900 performs blind-estimation of the PSS so that the $N_{ID}(2)$ may be specified from the detected sequence.

It can therefore be seen that three signal sequences are formed as the PSS. That is, in the case of executing the synchronization using the PSS, three signal sequences may be prepared in advance so that coincident signal sequences may be found. For example, the terminal 900 confirms the correlation between the signal sequence of the received PSS and the above-described three signal sequences to select a most highly correlated, i.e., most likely signal sequence.

In addition, the PSS is transmitted with slots #0 and #10 among 10 subframes (subframes #0 to #9) and 20 slots (slots #0 to #19) making up the wireless frame. Thus, the slot detecting the PSS is either the slot #0 or #10. Based on this, the beginning of the slot #0 or #10 may be calculated so that the slot synchronization may be carried out. The beginnings of the subframe #0 including the slot #0 and of the subframe #5 including the slot #10 may be calculated so that the subframe synchronization may be carried out. Furthermore, since the slot #0 is the beginning of the wireless frame, the frame synchronization may be carried out.

The SSS will be described. The SSS is a 62-bit signal sequence, similar to the PSS, and may be expressed by formula (7) below. The SSS is of a structure having an interleaved 31-long binary sequence and is scrambled using a scrambling sequence $(C_0(n), C_1(n))$ given in the PSS, with $0 \leq n \leq 30$.

$$d(2n) = \begin{cases} s_0(m_0)(n)c_0(n) & \text{in subframe0} \\ s_1(m_1)(n)c_0(n) & \text{in subframe5} \end{cases} \quad (7)$$

$$d(2n+1) = \begin{cases} s_1(m_1)(n)c_1(n)z_1(m_0)(n) & \text{in subframe0} \\ s_0(m_0)(n)c_1(n)z_1(m_1)(n) & \text{in subframe5} \end{cases}$$

$m_0$ and $m_1$ are correlated with $N_{ID}(1)$ and may be expressed by formula (8) below.

$$m_0 = m' \bmod 31 \quad (8)$$
$$m_1 = (m_0 + \lfloor m'/31 \rfloor + 1) \bmod 31$$
$$m' = N_{ID}(1) + q(q+1)/2,$$
$$q = \left\lfloor \frac{N_{ID}(1) + q'(q'+1)/2}{30} \right\rfloor,$$
$$q' = \lfloor N_{ID}(1)/30 \rfloor$$

The relationship between $m_0$, $m_1$, and $N_{ID}(1)$ in formula (8) is previously defined in the system. $s_0(m_0)(n)$ and $s_1(m_1)(n)$ are created by cyclically shifting an m-sequence $\hat{s}(n)$. That is, $s_0(m_0)(n)$ and $s_1(m_1)(n)$ may be expressed by formula (9) below.

$$s_0(m_0)(n) = \hat{s}(n+m_0) \bmod 31$$

$$s_1(m_1)(n) = \hat{s}((n+m_1) \bmod 31) \quad \hat{s}(i)=1-2x(i) \quad 0 \leq i \leq 30 \tag{9}$$

The m-sequence $\hat{s}(n)$ may be expressed by equation (10) below.

$$x(\bar{i}+5)=(x(\bar{i}+2)+x(\bar{i})) \bmod 2 \quad 0\leq i\leq 25, x(0)=0, x(1)=0, x(2)=0, x(3)=0, x(4)=1 \tag{10}$$

In the initial state, $x(0)=0$, $x(1)=0$, $x(2)=0$, $x(3)=0$, and $x(4)=1$ are given.

$c_0(n)$ and $c_1(n)$ will be described. $c_0(n)$ and $c_1(n)$ are scrambling sequences that depend on the PSS and are expressed as cyclically shifting the m-sequence $\hat{s}(n)$. That is, $c_0(n)$ and $c_1(n)$ may be expressed by formula (11) below, for example.

$$c_0(n) = \hat{c}((n+N_{ID}(2)) \bmod 3)$$

$$c_1(n) = \hat{c}((n+N_{ID}(2)+3) \bmod 31) \quad \hat{c}(i)=1-2x(i) \quad 0\leq i\leq 30 \tag{11}$$

$\hat{c}(n)$ is expressed as $\hat{c}(i)=1-2\times(i)$, similar to the m-sequence $\hat{s}(n)$, but it differs from the m-sequence $\hat{s}(n)$ in that $x(i)$ is given as formula (12) below.

$$x(\bar{i}+5)=(x(\bar{i}+3)+x(\bar{i})) \bmod 2 \quad 0\leq \bar{i}\leq 25 \tag{12}$$

$z_1(m_0)(n)$ and $z_1(m_1)(n)$ will be described. $z_1(m_0)(n)$ and $z_1(m_1)(n)$ are also created by cyclically shifting the m-sequence $\hat{s}(n)$ and may be expressed by formula (13) below, for example.

$$z_1(m_0)(n) = \hat{z}((n+(m_0 \bmod 8)) \bmod 31)$$

$$z_1(m_1)(n) = \hat{z}((n+(m_1 \bmod 8)) \bmod 31) \tag{13}$$

$$\hat{z}(i) = 1-2x(i), 0 \leq i \leq 30$$

$\hat{z}(n)$ is expressed as $\hat{z}(i)=1-2\times(i)$, similar to the m-sequence $\hat{s}(n)$, but it differs from the m-sequence $\hat{s}(n)$ in that $x(i)$ is given as formula (14) below.

$$x(\bar{i}+5)=(x(\bar{i}+4)+x(\bar{i}+2)+x(\bar{i}+1)+x(\bar{i})) \bmod 2, \quad 0\leq \bar{i}\leq 25$$
$$x(0)=0, x(1)=0, x(2)=0, x(3)=0, x(4)=1 \tag{14}$$

Since the SSS creation mechanism (such as m-sequence or PSS-based scrambling) is known at the terminal 900, $m_0$ and $m_1$ are specified based on such information so as to be able to derive $N_{ID}(1)$. $N_{ID}(\text{cell})$ may be derived based on $N_{ID}(1)$ and $N_{ID}(2)$.

The terminal 900 receiving the SSS divides even numbers (d(2n)) of the received SSS by $c_0(n)$ and $c_1(n)$ calculated from $N_{ID}(2)$ obtained for the PSS, to thereby find $s_0(m_0)(n)$ and $s_1(m_1)(n)$ as received signals.

The terminal calculates the correlation between $s_0(m_0)(n)$ and $s_1(m_1)(n)$ created from the specified $m_0$ and $m_1$, to derive $m_0$ and $m_1$ of the received SSS to obtain $N_{ID}(1)$. As a result, the cell ID may be calculated. The cell-ID-based slot synchronization and frame synchronization also become feasible.

When the slot synchronization (or the frame synchronization) is established and $N_{ID}(\text{cell})$ is found as the cell ID, the pilot signal to be transmitted by the neighboring base station can also be derived. The pilot signal sequence in the LTE is calculated by expressions (15) to (17) which follow.

$$r_{l,n_s}(m) = \frac{1}{\sqrt{2}}(1-2\cdot c(2m)) + j\frac{1}{\sqrt{2}}(1-2\cdot c(2m+1)), \tag{15}$$

$$m = 0, 1, \ldots, 2N_{RB}(\max, DL) - 1$$

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \tag{16}$$

$$N_C = 1600, x_1(0) = 1, x_1(n) = 0, n = 1, 2, \ldots, 30$$

$$c_{init} = 2^{10}\cdot(7\cdot(n_s+1)+l+1)(2\cdot N_{ID}(\text{cell})+1) + 2\cdot N_{ID}(\text{cell}) + N_{CP}c_{init} \tag{17}$$

$n_s$ denotes a slot number. The slot number may be identified by establishing the slot synchronization. I denotes an OFDM symbol number in the slot. As for the OFDM symbol number, the arrangement of the pilot signals along the axis of time is defined in advance. c(i) denotes a pseudo-random signal sequence (pseudo-random noise (PN)).

$N_{CP}$ is a normal CP or an extended CP. The extended CP is used when executing a large cell or multicast-broadcast single frequency network (MBSFN) transmission and has less time than the normal CP.

In this manner, if the ID is found, the pilot signal sequence may be calculated. Thus, the terminal 900 receiving the pilot signal sequence compares the received pilot signal sequence with a pilot signal sequence created from the cell ID calculated as a result of reception of the synchronization signal, thereby enabling synchronization in units of OFDM-symbol (hereinafter, simply "symbol").

Figure 10:
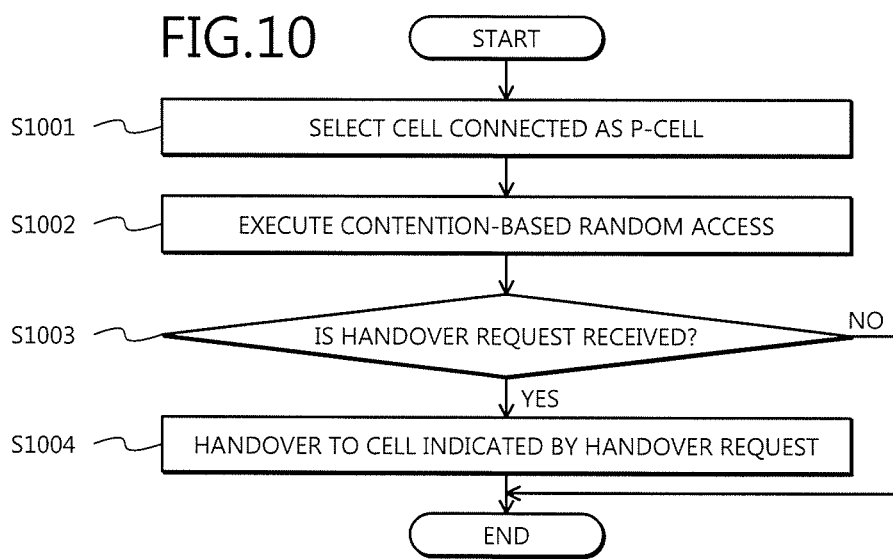
FIG. 10 is a flowchart of an example of a P-cell connection process by the terminal.

FIG. 10 is a flowchart of an example of a P-cell connection process by the terminal. The terminal 900 executes steps depicted in FIG. 10 as the P-cell connection process, for example. First, the terminal 900 selects a cell connected as the P-cell from among connection candidate cells (step S1001). A method of selecting the P-cell at step S1001 will be described later (see, e.g., FIGS. 14 to 16).

The selection of the P-cell at step S1001 may be made according to a measurement result of wireless channel quality of each of the connection candidate cells, the priority or offset of the connection candidate cells, etc. However, the selection of the P-cell at step S1001 may be such that a cell not connectable as the P-cell is errantly selected for the P-cell.

For example, the terminal 900 executes contention-based random access (e.g., refer to FIG. 7A) to the cell selected at step S1001 (step S1002). The terminal 900 synchronizes with the cell selected at step S1001 and receives system information related to channel connection from the selected cell. This system information includes, for example, a set of available random access preambles, a transmitting format of the random access preamble, transmitting timing of the random access preamble, and an initial value of the transmission power of the random access preamble. In the LTE system, these types of information are included in SIB2 defined in TS36.331 of the 3GPP, for example.

The terminal 900 starts the contention-based random access procedure depicted in FIG. 7A, for example, based on information for channel connection included in the SIB2. Here, the random access preamble is used as information for identifying the terminal 900. For the contention-based random access procedure, the terminal 900 may use configuration information of a random access channel (RACH) or a physical RACH (PRACH).

Subsequently, the terminal 900 determines whether handover request is received from the cell to which the contention-based random access is performed at step S1002 (step S1003). The handover request includes information indicating a handover-destination cell and a dedicated preamble for performing the non-contention-based random access to the handover destination, for example. The information indicating the handover-destination cell may include system information such as a cell ID and a usage frequency, for example. The handover request may include information such as the priority and offset of the handover-destination cell, for example.

If no handover request is received at step S1003 (step S1003: NO), it may be determined that the connection is correctly made to a cell connectable as the P-cell. In this case, the terminal 900 terminates a sequence of the P-cell connection process.

If handover request is received at step S1003 (step S1003: YES), it may be determined that a cell not connectable as the P-cell is errantly selected for the P-cell at step S1001. In this case, the terminal 900 performs handover to a cell indicated by the received handover request (step S1004) and terminates a sequence of the P-cell connection process. At step S1004, for example, the terminal 900 may perform the handover by performing non-contention-based random access using the dedicated preamble included in the received handover request.

Figure 11:
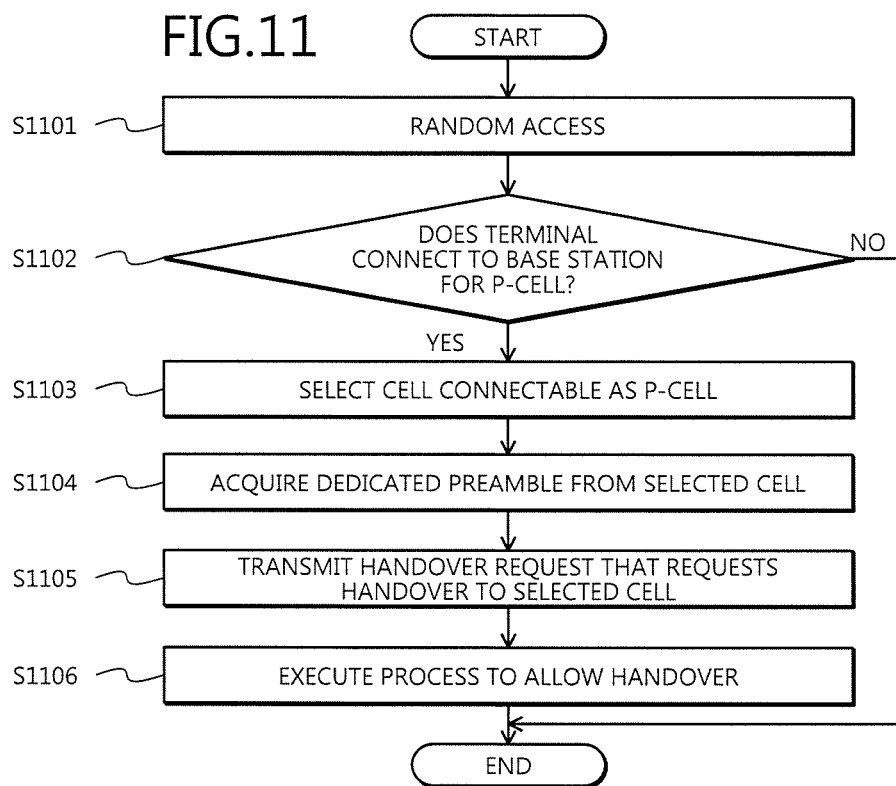
FIG. 11 is a flowchart of an example of a connection process by the base station.

FIG. 11 is a flowchart of an example of a connection process by the base station. The base station 800 (e.g., the base station 531) forming the S-cell not connectable as the P-cell executes steps depicted in FIG. 11 as the connection process, for example. First, the base station 800 performs random access according to a request from the terminal 900 (step S1101). For example, the random access at step S1101 is the contention-based random access depicted in FIG. 7A or the non-contention-based random access depicted in FIG. 7B.

Subsequently, the base station 800 determines whether the terminal 900 connects to the base station 800 for the P-cell at step S1101 (step S1102). A determination method at step S1102 will be described later. If the terminal 900 connects to the base station 800 for the S-cell (step S1102: NO), the base station 800 terminates a sequence of the connection process.

If the terminal 900 connects to the base station 800 for the P-cell at step S1102 (step S1102: YES), the base station 800 selects a cell connectable as the P-cell (step S1103). For example, the candidates of the cell connectable as the P-cell may be stored in advance in the base station 800 or may be acquired from neighboring information (or neighboring base station information, neighboring cell information) by the base station 800. For example, if the base station 800 is the base station 531, a candidate of the cell connectable as the P-cell may be the base station 511, for example (see, e.g., FIGS. 5A and 5B).

Subsequently, the base station 800 acquires from the cell (or the base station) selected at step S1103 the dedicated preamble for performing the non-contention-based random access to the cell selected at step S1103 (step S1104).

The base station 800 transmits to the terminal 900, a handover request that requests handover to the cell selected at step S1103 and that includes the dedicated preamble acquired at step S1104 (step S1105).

The base station 800 executes a process of allowing the terminal 900 receiving the handover request transmitted at step S1105 to perform handover to the cell selected at step S1103 (step S1106) and terminates a sequence of the connection process. As a result, if the terminal 900 errantly selects the cell of the base station 800 as the P-cell, the base station 800 can allow the terminal 900 to perform the handover to the P-cell.

A method of determining whether connection to the station is made for the P-cell at step S1102 will be described. For example, if the random access at step S1101 is the contention-based random access, the base station 800 may determine that the connection is made for the P-cell. For example, if the random access preamble received as the message 1 from the terminal 900 at step S1101 is a common preamble, the base station 800 may determine that the random access is the contention-based random access.

Alternatively, if the random access at step S1101 is the non-contention-based random access, the base station 800 may determine that the connection is made for the S-cell. For example, if the random access preamble received as the message 1 from the terminal 900 at step S1101 is a predetermined dedicated preamble, the base station 800 may determine that the random access is the non-contention-based random access.

Figure 12:
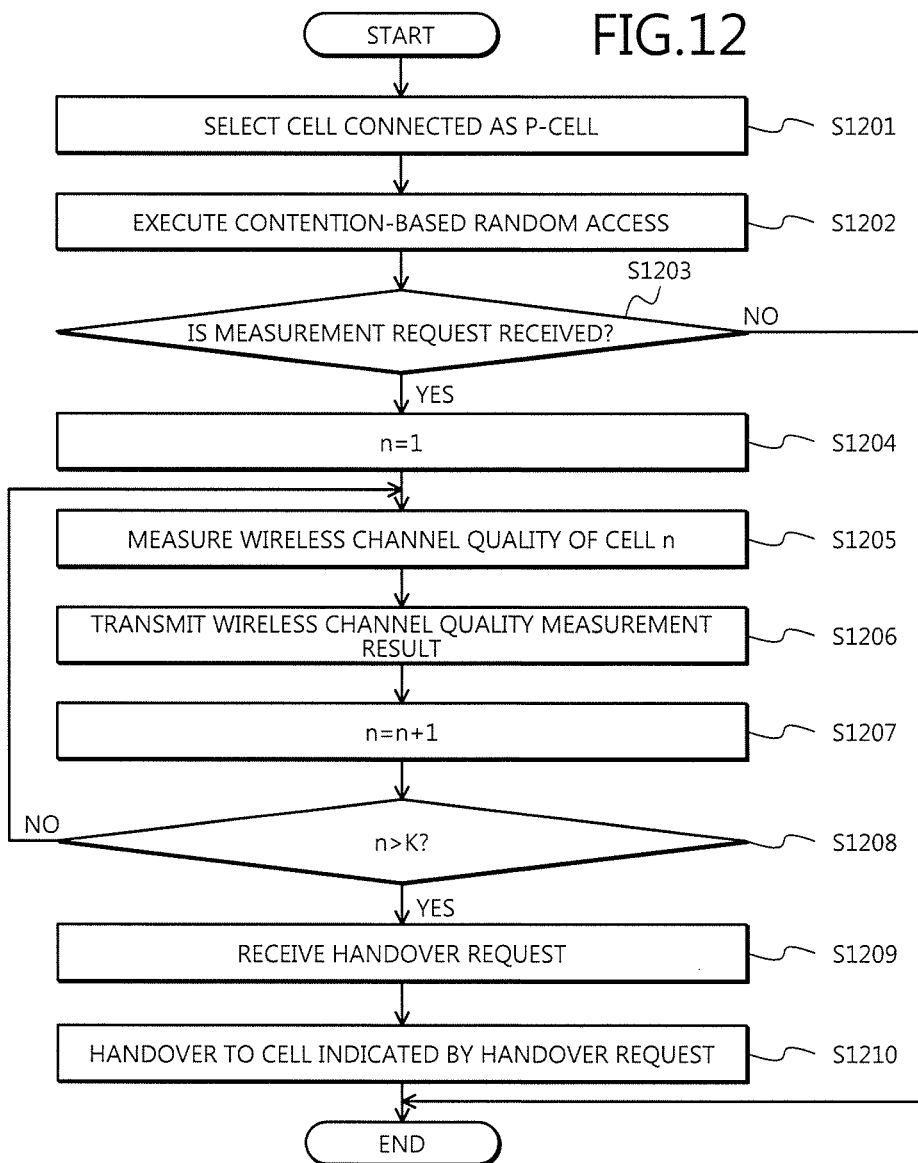
FIG. 12 is a flowchart of a variant of the P-cell connection process by a terminal.

FIG. 12 is a flowchart of a variant of the P-cell connection process by a terminal. The terminal 900 may execute steps depicted in FIG. 12 as the P-cell connection process, for example. Steps S1201 and S1202 depicted in FIG. 12 are the same as steps S1001 and S1002 depicted in FIG. 10.

After step S1202, the terminal 900 determines whether a measurement request for measurement of wireless channel quality is received from the cell to which the contention-based random access is performed at step S1202 (step S1203). The measurement request includes information indicating one or more cells connectable as the P-cell. If the measurement request is not received (step S1203: NO), it may be determined that the connection is made to a cell connectable as the P-cell. In this case, the terminal 900 terminates a sequence of the P-cell connection process.

If the measurement request is received at step S1203 (step S1203: YES), it may be determined that a cell not connectable as the P-cell is errantly selected for the P-cell at step S1201. In this case, the terminal 900 initializes n (n=1) (step S1204). It is noted that n is a variable for storing an index of a cell indicated by the received measurement request.

The terminal 900 measures the wireless channel quality of a cell n (step S1205). The wireless channel quality measured at step S1205 is RSRQ or RSRP, for example. Alternatively, the wireless channel quality measured at step S1205 may be wireless channel quality based on envelope detection, etc. These wireless channel qualities are detectable without synchronization with the cell n. The terminal 900 then transmits a measurement result of the wireless channel quality at step S1205 to the transmission-source cell of the measurement request (step S1206).

Subsequently, the terminal 900 increments n (n=n+1) (step S1207). The terminal 900 determines whether n becomes larger than K (step S1208). K is the number of cells indicated by the measurement request, the number of cells having the wireless channel quality equal to or greater than a threshold value at the last measurement, etc. If n is not larger than the K (step S1208: NO), the terminal 900 returns to step S1205.

If n is larger than the K at step S1208 (step S1208: YES), the terminal 900 receives handover request from the transmission-source cell of the measurement request (step S1209). The terminal 900 performs handover to a cell indicted by the handover request by using the dedicated preamble included in the handover request received at step S1209 (step S1210) and terminates a sequence of the P-cell connection process.

For example, at steps S1205 to S1207, the terminal 900 may measure the wireless channel quality of cells in the descending order of priority and transmit the measurement result. The terminal 900 may add cell IDs, priorities, etc. of measurement objects to the measurement result of the wireless channel quality.

Figure 13:
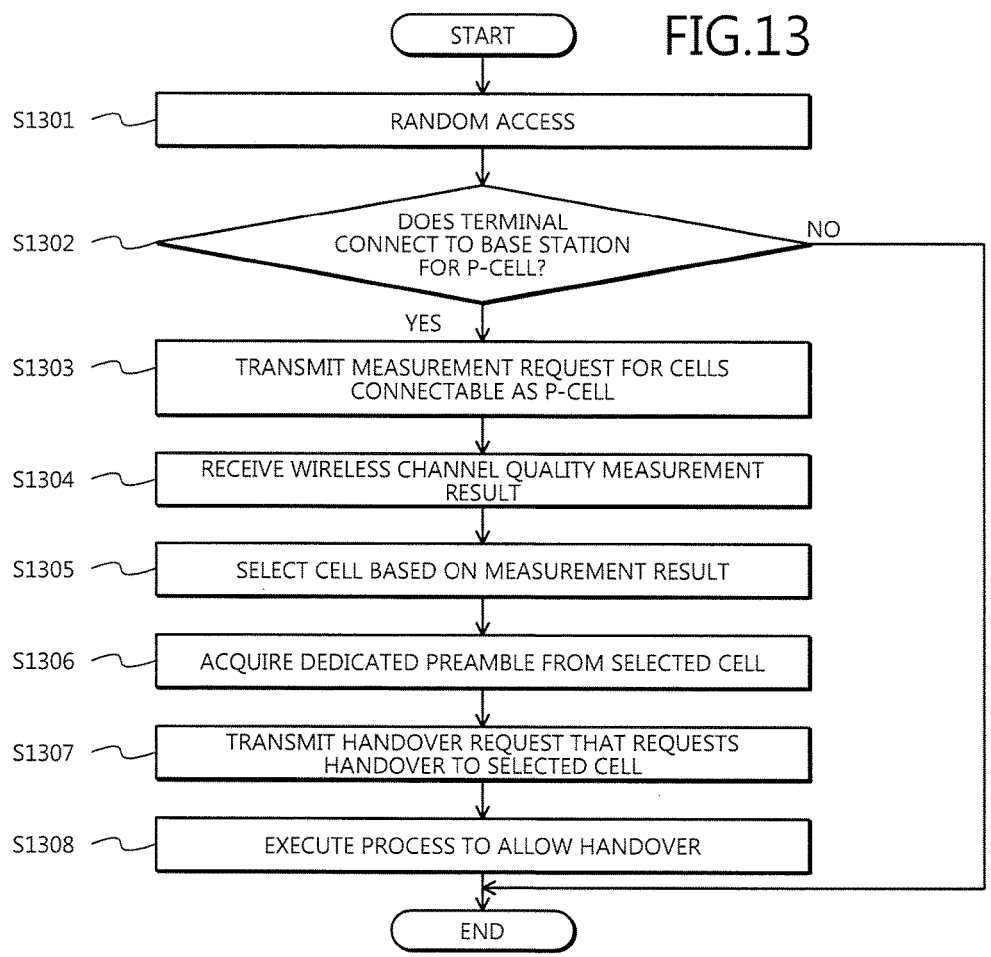
FIG. 13 is a flowchart of a variant of the connection process by a base station.

FIG. 13 is a flowchart of a variant of the connection process by a base station. If the terminal 900 executes the P-cell connection process depicted in FIG. 12, the base station 800 (e.g., the base station 531) forming the S-cell not connectable as the P-cell executes steps depicted in FIG. 13 as the connection process, for example. Steps S1301 and S1302 depicted in FIG. 13 are the same as steps S1101 and S1102 depicted in FIG. 11.

If the terminal 900 connects to the base station 800 for the P-cell at step S1302 (step S1302: YES), the base station 800 transmits to the terminal 900, a measurement request for wireless channel quality of one or more cells connectable as the P-cell (step S1303). For example, the cells connectable as the P-cell may be stored in advance in the base station 800 or may be acquired from neighboring information (or neighboring base station information, neighboring cell information) by the base station 800. If only one cell is connectable as the P-cell, the measurement request is made so as to confirm that the wireless channel quality satisfies predetermined quality with respect to the one cell.

Subsequently, the base station 800 receives a measurement result of the wireless channel quality from the terminal 900 corresponding to the measurement request transmitted at step S1303 (step S1304). The base station 800 selects the cell to which the terminal 900 is allowed to connect for the P-cell, among the cells connectable as the P-cell based on the measurement result received at step S1304 (step S1305). The selection of the cell at step S1305 may be made by using the priority or offset of the cells.

Steps S1306 to S1308 depicted in FIG. 13 are the same as steps S1104 to S1106 depicted in FIG. 11. It is noted that at step S1306, the base station 800 acquires from the cell selected at step S1305, the dedicated preamble for performing the non-contention-based random access to the cell selected at step S1305.

Although the terminal 900 notifies the base station 800 of the measurement result of the wireless channel quality and the base station 800 selects the P-cell of the terminal 900 in the case described with reference to FIGS. 12 and 13, the selection of the P-cell based on the measurement result of the wireless channel quality may be made by the terminal 900. In this case, the terminal 900 notifies the base station 800 of the selected P-cell. The base station 800 acquires the dedicated preamble for the cell given in the notification from the terminal 900 and transmits the handover request including the acquired dedicated preamble to the terminal 900.

If the notification of the dedicated preamble is not made to the terminal 900, the terminal 900 may perform the handover by contention-based random access to the selected cell, for example. In this case, the base station 800 may terminate a sequence of the connection process when transmitting the measurement request at step S1303.

FIG. 14 is a flowchart of an example of a P-cell selection process by a terminal. The terminal 900 executes steps depicted in FIG. 14 as the P-cell selection process, for example. First, the terminal 900 initializes n (n=1) (step S1401). It is noted that n is a variable for storing an index of a connection candidate cell.

The terminal 900 synchronizes with a cell n (step S1402). The terminal 900 receives P-cell selection information from the cell n synchronized at step S1402 (step S1403). The P-cell selection information includes information indicating whether the cell n is connectable as the P-cell and adjustment information such as priority and offsets, for example.

Subsequently, the terminal 900 determines whether the cell n synchronized at step S1402 is a cell connectable as the P-cell based on the P-cell selection information received at step S1403 (step S1404). If the cell n is not a cell connectable as the P-cell (step S1404: NO), the terminal 900 goes to step S1407.

If the cell n is a cell connectable as the P-cell at step S1404 (step S1404: YES), the terminal 900 measures the wireless channel quality of the cell n (step S1405). The wireless channel quality measured at step S1405 is RSRQ or RSRP, for example.

The terminal 900 calculates a reception quality evaluation result of the cell n based on the wireless channel quality measured at step S1405 (step S1406). The reception quality evaluation result is calculated by using the adjustment information such as priority included in the P-cell selection information received at step S1403.

The terminal 900 increments n (n=n+1) (step S1407). The terminal 900 determines whether n becomes larger than K (step S1408). K is the number of the connection candidate cells of the terminal 900. If n is not larger than K (step S1408: NO), the terminal 900 returns to step S1402.

If n is larger than the K at step S1408 (step S1408: YES), the terminal 900 goes to step S1409. In particular, the terminal 900 selects a connection-destination cell among the cells determined as cells connectable as the P-cell at step S1404 (step S1409) and terminates a sequence of the P-cell selection process. The selection of the connection-destination cell is made based on a comparison result of the reception quality evaluation result calculated at step S1406, for example.

FIG. 15 is a flowchart of a variant 1 of the P-cell selection process by a terminal. The terminal 900 may execute steps depicted in FIG. 15 as the P-cell selection process, for example. First, the terminal 900 receives the P-cell selection information from the connection candidate cells of the terminal 900 (step S1501). The terminal 900 initializes n (n=1) (step S1502). The terminal 900 synchronizes with a cell n (step S1503).

Steps S1504 to S1509 depicted in FIG. 15 are the same as steps S1404 to S1409 depicted in FIG. 14. It is noted that at step S1504, the terminal 900 determines whether the cell is a cell connectable as the P-cell based on the P-cell selection information received at step S1501. At step S1506, the terminal 900 calculates the reception quality evaluation result by using the adjustment information such as priority included in the P-cell selection information received at step S1501.

As depicted in FIG. 15, the terminal 900 may receive the P-cell selection information from the connection candidate cells before synchronizing with each of the connection candidate cells.

FIG. 16 is a flowchart of a variant 2 of the P-cell selection process by a terminal. The terminal 900 may execute steps depicted in FIG. 16 as the P-cell selection process, for example. Steps S1601 to S1603 depicted in FIG. 16 are the same as steps S1401 to S1403 depicted in FIG. 14. After step S1603, the terminal 900 measures the wireless channel quality of the cell n (step S1604).

Subsequently, the terminal 900 determines whether the cell n synchronized at step S1602 is a cell connectable as the P-cell based on the P-cell selection information received at step S1603 (step S1605). If the cell n is a cell connectable as the P-cell (step S1605: YES), the terminal 900 goes to step S1607.

If the cell n is not a cell connectable as the P-cell at step S1605 (step S1605: NO), the terminal 900 compensates the priority, etc. included in the P-cell selection information received at step S1603 (step S1606).

Steps S1607 to S1610 depicted in FIG. 16 are the same as steps S1406 to S1409 depicted in FIG. 14. It is noted that if the priority, etc. are compensated at step S1606, the reception quality evaluation result is calculated at step S1607 by using the priority, etc. compensated at step S1606.

For example, if the reception quality evaluation result is calculated by multiplying the wireless channel quality (such as reception power) by the priority, the terminal 900 sets the priority to zero at step S1606. As a result, the reception quality evaluation result may be set to zero for a cell not connectable as the P-cell so that the cell not connectable as the P-cell is not selected at step S1610. In other words, the priority of the cell not connectable as the P-cell may be compensated to make the reception quality evaluation result lower.

It is to be noted that the method is not limited to compensating the priority of the cell not connectable as the P-cell. For example, the terminal 900 may adjust the priority of the cell connectable as the P-cell to the positive direction so that the reception quality evaluation result of the cell connectable as the P-cell becomes higher.

In the case of calculating the reception quality evaluation result by adding an offset to the wireless channel quality (such as received power), the terminal 900 compensates the offset to a negative value at step S1606. This allows the reception quality evaluation result of the cell not connectable as the P-cell to approximate 0 so that the cell not connectable as the P-cell cannot be selected at step S1610. That is, the offset of the cell not connectable as the P-cell may be compensated so that the reception quality evaluation result becomes lower.

It is to be noted that the method is not limited to compensating the offset of the cell not connectable as the P-cell. For example, the terminal 900 may adjust the offset of the cell connectable as the P-cell to the positive direction so that the reception quality evaluation result of the cell connectable as the P-cell becomes higher.

As depicted in FIG. 16, the wireless channel quality may be measured for all the connection candidate cells and a positive compensation may be made to a cell connectable as the P-cell in the calculation of the reception quality evaluation result. Alternatively, a negative compensation, etc. may be made to a cell not connectable as the P-cell. As a result, the cells not connectable as the P-cell may be substantially excluded from P-cell selection candidates.

In this manner, use of the reception quality evaluation result based on the P-cell selection information can keep the cells not connectable as the P-cell, for example, from being selected and connected, making it possible to select and connect an optimum cell as the P-cell. As used herein, the optimum cell may be a base station with a highest reception power or a cell with a highest reception signal quality. Both the reception power and the reception signal quality may be taken into consideration to select the optimum cell.

Even if the terminal 900 selects a cell not connectable as the P-cell for the P-cell due to an error in the P-cell selection information, handover of the terminal 900 may be conducted to a cell connectable as the P-cell under the control of the base station 800. Therefore, the stability of operation may be improved.

As depicted in FIGS. 14 and 15, the P-cell selection information may be used so as not to measure the wireless channel quality of a cell not connectable as the P-cell. As a result, the measurement of the wireless channel quality may be made more efficient.

In FIGS. 14 to 16, a case of broadcasting the P-cell selection information is described. In this case, for example, in the process depicted in FIG. 13, the base station 800 may simply transmit a measurement request for neighboring cells rather than a measurement request limited to the cells connectable as the P-cell. In this case, for example, in the process depicted in FIG. 12, the terminal 900 may measure the wireless channel quality only for the cells connectable as the P-cell based on the broadcasted P-cell selection information to transmit a measurement result.

Configuration may be such that the P-cell selection information is not broadcasted. In this case, for example, at step S1001 depicted in FIG. 10, the terminal 900 selects the cell connected as the P-cell based on the wireless channel quality of neighboring cells without using the P-cell selection information. Even if a cell not connectable as the P-cell is selected in this case, handover of the terminal 900 may be conducted to a cell connectable as the P-cell under the control of the base station 800.

FIG. 17 is a flowchart depicting an example of an S-cell connection process by a terminal. The terminal 900 executes steps depicted in FIG. 17, for example, as the S-cell connection process, while being connected to the P-cell (e.g., base station 511) by the P-cell connection process depicted in FIGS. 10 to 16, for example.

The terminal 900 first receives, from the P-cell, cell information of a neighboring cell of the P-cell (step S1701). The neighboring cell of the P-cell is a candidate cell of the S-cell of the terminal 900. The cell information may include system information such as the frequency, bandwidth, and cell ID of each of small cells subordinate to the P-cell, for example.

The terminal 900 receives a wireless channel quality measurement request requesting the measurement of the wireless channel quality, from the P-cell (step S1702). In a case where the terminal 900 periodically measures the wireless channel quality, the step S1702 may be excluded from the process.

The terminal 900 initializes n (n=1) (step S1703). n is a variable storing an index of a connection candidate cell indicated by the cell information received at step S1701. The terminal 900 is synchronized with a cell n (step S1704). The synchronization at step S1704 may be performed based on the frequency, bandwidth, cell ID, etc. included in the cell information received at step S1701, for example.

The terminal 900 receives S-cell selection information from the cell n synchronized therewith at step S1704 (step S1705). The S-cell selection information includes, for example, information indicating whether to be connectable as the S-cell.

The terminal 900 determines, based on the S-cell selection information received at step S1705, whether the cell n synchronized therewith at step S1704 is a cell connectable as the S-cell (step S1706). If not (step S1706: NO), the terminal 900 transitions to step S1709.

If connectable at step S1706 (step S1706: YES), the terminal 900 measures wireless channel quality of the cell n (step S1707). The wireless channel quality measured at step S1707 is the RSRQ, RSRP, etc., for example. The measurement of the wireless channel quality at step S1707 may be performed based on the frequency, bandwidth, cell ID, etc. included in the cell information received at step S1701, for example. The terminal 900 transmits the result of the wireless channel quality measurement at step S1707 to the P-cell in connection (step S1708).

The terminal 900 increments n (n=n+1) (step S1709). The terminal 900 determines whether n is greater than K (step S1710). K is the number of the connection candidate cells of the terminal 900 indicated by the cell information received at step S1701. If not (step S1710: NO), the terminal 900 transitions to step S1704.

If greater at step S1710 (step S1710: YES), the terminal 900 receives an S-cell addition request from the P-cell (step S1711). The S-cell addition request is a control signal requesting the terminal 900 to add, as the S-cell, a cell selected by the P-cell based on the measurement result transmitted at step S1708.

The terminal 900 executes a channel connection such as random access based on the S-cell addition request received at step S1711 (step S1712), to end a series of S-cell connection process steps. Since the channel connection at step S1712 is a connection to the S-cell, the non-contention-based random access is performed (see, FIG. 7B) for example.

The S-cell addition request includes, for example, a dedicated preamble of the non-contention-based random access available in the connection S-cell. The terminal 900 performs the non-contention-based random access using the dedicated preamble included in the S-cell addition request, allowing the connection to the S-cell selected by the P-cell.

Although the case has been described where the S-cell selection information is received from the cell n at step S1705, the S-cell selection information of each cell n may be included in the cell information of step S1701. In this case, step S1705 may be excluded from the process.

FIG. 18 is a flowchart depicting an example of the S-cell selection process by the base station (P-cell). The base station 800 (e.g., base station 511), to which the terminal 900 is connected as the P-cell, performs steps depicted in FIG. 18, for example, as the S-cell selection process for the terminal 900.

The base station 800 first transmits cell information of a neighboring cell (e.g., a cell of the base station 531), to the terminal 900 (step S1801). The base station 800 transmits a wireless channel quality measurement request requesting measurement of the wireless channel quality to the terminal 900 (step S1802). In a case where the terminal 900 periodically measures the wireless channel quality, the step S1802 may be excluded from the process. The base station 800 receives the wireless channel quality measurement result transmitted from the terminal 900 at step S1708 depicted in FIG. 17, for example (step S1803).

The base station 800 calculates a reception quality evaluation result based on the measurement result received at step S1803 (step S1804). The calculation of the reception quality evaluation result uses the priority, offset, etc. included in the S-cell selection information. The calculation of the reception quality evaluation result based on the priority or the offset is similar to the above-described calculation of the reception quality evaluation result of the P-cell, for example.

The base station 800 selects a cell to be connected by the terminal 900, from among cells connectable as the S-cell by the terminal 900 (step S1805). The selection of the connection cell is performed based on, for example, the result of comparison of the reception quality evaluation results calculated at step S1804. For example, the base station 800 selects, as the connection cell, either a cell with a highest reception quality evaluation result or a cell with a reception quality evaluation result greater than or equal to the threshold value.

The base station 800 transmits a connection information request requesting connection information for the connection of the terminal 900 thereto, to the cell (e.g., base station 531) selected at step S1805 (step S1806). The connection information includes a dedicated preamble for the non-contention-based random access, for example. This dedicated preamble is a random access preamble usable by only a specific terminal during a specific period and is also called a dedicated random access preamble.

The base station 800 receives from the cell selected at step S1805, connection information in response to the connection information request transmitted at step S1806 (step S1807). The base station 800 transmits an S-cell addition request including connection information such as the dedicated preamble received at step S1807 and requesting the addition of an S-cell thereto, to the terminal 900 (step S1808), to terminate a series of S-cell selection process steps.

The cells connectable as the S-cell include a cell having only a downlink without configuration of an uplink. Since uplink transmission is impossible, random access cannot be performed to the cell having only a downlink. In this case, link connection is performed by additionally configuration of a downlink without performing random access.

FIG. 19 is a flowchart depicting a variant of the S-cell connection process by the terminal. The terminal 900 may execute steps depicted in FIG. 19, for example, as the S-cell connection process, while being connected to the P-cell by the P-cell connection process depicted in FIGS. 10 to 12 for example.

The terminal 900 first receives cell information based on the S-cell selection information from the P-cell (step S1901). The cell information based on the S-cell selection information is information indicating a cell that is a neighboring cell of the P-cell and that is connectable as the S-cell.

Steps S1902 to S1904 depicted in FIG. 19 are similar to the steps S1702 to S1704 depicted in FIG. 17. Subsequent to the step S1904, the terminal 900 measures the wireless channel quality of the cell n (step S1905). The wireless channel quality measured at step S1905 is, for example, the RSRQ, RSRP, etc. Steps S1906 to S1910 depicted in FIG. 19 are similar to the steps S1708 to S1712 depicted in FIG. 17.

Thus, by receiving the cell information indicating a cell connectable as the S-cell, the terminal 900 may measure the wireless channel quality of only the cell connectable as the S-cell and select the S-cell, without receiving the S-cell selection information from the S-cell.

FIG. 20 is a flowchart depicting a variant of the S-cell selection process by the base station (P-cell). In a case where the terminal 900 performs the S-cell connection process depicted in FIG. 19, the base station 800 as the P-cell connected by the terminal 900 executes steps depicted in FIG. 20, for example, as the S-cell selection process for the terminal 900.

The base station 800 first transmits cell information based on S-cell selection information (step S2001). The cell information based on S-cell selection information is information indicating a cell connectable as the S-cell among neighboring cells. The cell information based on S-cell selection information may be created on the basis of S-cell selection information received from a neighboring cell by the base station 800. Steps S2002 to S2008 depicted in FIG. 20 are similar to the steps S1802 to S1808 depicted in FIG. 18.

As depicted in FIGS. 19 and 20, the cell connectable as the S-cell may be notified from the base station 800 to the terminal 900. As a result, without receiving the S-cell selection information from the S-cell, the terminal 900 can measure the wireless channel quality of only the cell connectable as the S-cell and select the S-cell.

A cell not connectable as the S-cell may be notified from the base station 800 to the terminal 900. In this case, the terminal 900 excludes the cell not connectable as the S-cell notified from the base station 800, from measurement of the wireless channel quality.

A cell errantly selected for the P-cell is highly likely to be high in the wireless channel quality at the terminal 900. Therefore, if the terminal 900 errantly selects a cell not connectable as the P-cell for the P-cell and the terminal 900 is allowed to perform the handover to the P-cell, the errantly selected cell may be selected for the S-cell.

For example, the base station 800 may provide control of connecting the terminal 900 to the cell of the base station 800 for the S-cell after the processes depicted in FIGS. 11 and 13, for example. For example, the base station 800 transmits to the terminal 900 a connection request including the dedicated preamble for performing non-contention-based random access to the cell of the base station 800.

The terminal 900 receives the connection request from the base station 800 after the processes depicted in FIGS. 10 and 12, for example. The terminal 900 can perform the non-contention-based random access (see, e.g., FIG. 7B) by using the dedicated preamble included in the received connection request so as to connect to the base station 800 for the S-cell.

Although the case has been described where the base station 800 selects the S-cell, the terminal 900 may perform the selection of the S-cell.

FIG. 21 is a flowchart depicting an example of the S-cell connection process by the terminal. The terminal 900 executes steps depicted in FIG. 21, for example, as the S-cell connection process. The terminal 900 first initializes n (n=1) (step S2101). n is a variable storing an index of a connection candidate cell.

The terminal 900 is synchronized with a cell n (step S2102). The terminal 900 receives S-cell selection information from the cell n synchronized therewith at step S2102 (step S2103). The S-cell selection information includes, for example, information indicating whether the cell n is connectable as the S-cell and adjustment information such as the priority and offset.

The terminal 900 determines whether the cell synchronized therewith at step S2102 is a cell connectable as the S-cell, based on the S-cell selection information received at step S2103 (step S2104). If not (step S2104: NO), the terminal 900 shifts to step S2107.

If connectable at S2104 (step S2104: YES), the terminal 900 measures the wireless channel quality of the cell n (step S2105). The wireless channel quality measured at step S2105 is, for example, the RSRQ, RSRP, etc.

The terminal 900 calculates the reception quality evaluation result of the cell n based on the wireless channel quality measured at step S2105 (step S2106). The calculation of the reception quality evaluation result uses adjustment information such as the priority included in the S-cell selection information received at step S2103.

The terminal 900 increments n (n=n+1) (step S2107). The terminal 900 determines whether n is greater than K (step S2108). K is the number of connection candidate cells of the terminal 900. If not (step S2108: NO), the terminal 900 returns to step S2102.

If greater at step S2108 (step S2108: YES), the terminal 900 selects a connection cell, from among cells determined to be cells connectable as the S-cell at step S2104 (step S2109). The selection of the connection cell is performed on the basis of the result of comparison of the reception quality evaluation results calculated at step S2106, for example.

The terminal 900 executes a channel connection such as the random access to the cell selected at step S2109 (step S2110), to terminate a series of S-cell connection process steps. The channel connection at step S2110 is performed by the contention-based random access procedure (see, e.g. FIG. 7A). The channel connection at step S2110 may be performed by the non-contention-based random access procedure (see, for example, FIG. 7B).

As described above, according to the second embodiment, the terminal 900 selecting a cell not connectable as the P-cell for the P-cell may be allowed to perform the handover to the P-cell in the hierarchical cell structure, so as to provide the stabilization of communication.

As described above, the system, the base station, and the terminal may provide stabilization of communication.

For example, conventionally, the base station notifies the terminal of the cell selection information such as the priority in the hierarchical cell structure and the offset in the cell selection. Regardless of the configuration allowing the selection of small cells using the priority or the offset, there has been a problem that a small cell cannot necessarily be selected. Particularly, in the case of communication using a large cell as the P-cell and small cells as the S-cells as depicted in FIG. 5B, a communication mode suitable for the object could not be achieved if a small cell is selected as the P-cell.

For example, it is assumed that when a base station of a small cell acts as a serving area to accommodate a terminal, carrier aggregation communication is started according to a calling request, etc. from the terminal being present in the accommodating small cell. In this case, although the small cell defined as the service area should be the P-cell, the base station is the S-cell and therefore, a forcible handover occurs to a macro cell acting as the P-cell at this time point and may result in a delay.

A cell selection error will hereinafter be described in detail.

A case will be described, for example, where the cell selection is made on the basis of the received power. For example, in a case of using the cell priority, the priority is expressed by a numeric value and a larger numeric value expresses a higher priority. Here, the cell selection is carried out on the basis of the product of the cell priority and the received power. In this case, if the received power is the same, a cell with a higher priority is selected.

In such a case, however, the selected cell may be different between a cell with a low priority but a high received power and a cell with a high priority but a low received power. That is, a cell with a high priority may not necessarily be selected.

Also, as described above, conventionally, the object is to achieve a preferential connection to small cells for the purpose of reducing the power consumption of the terminal and improving the frequency utilization efficiency. That is, the priority of the small cell is configured to be higher than the priority of the large cell. The offset of the small cell is configured to be greater than the offset of the large cell. Thus, a small cell may possibly be selected as the P-cell.

In a case of selecting the small cell as the P-cell and allowing the small cell to transmit only data, it becomes impossible to receive control signals after channel connection due to the random access, causing a difficulty in the channel configuration such as addition of the S-cell. Similarly, in a case of performing the cell selection using the received power and the offset, a small cell may possibly be selected as the P-cell.

These problems arise from the fact that the conventional priority and offset are premised on the hierarchical cell structure without limitation that the large cell acts as the P-cell and the small cell acts as the S-cell.

If successful in selecting the large as the P-cell, a small cell is then selected as the S-cell. Similar to the selection of the P-cell, the selection of the S-cell also uses the cell priority and offset. The conventional priority and offset are for selecting a single cell, but are not for using plural cells.

However, the priority and offset configured for selecting the P-cell are used also in selecting the S-cell. As a result, the large cell may possibly be selected as the S-cell, rendering the hierarchical cell structure meaningless.

A case will first be described where only one offset may be configured. For example, consider a case of configuring an offset to be added to the received power from the P-cell so as to preferentially select the P-cell at the time of cell selection with the macrocell as the P-cell and the picocell as the S-cell under the execution of the carrier aggregation. Assume that this offset is configured irrespective of the execution of the carrier aggregation.

A case will be described where the carrier aggregation is executed and the macrocell (P-cell) is preferentially selected. In this case, when (distance between terminal and macrocell)>(distance between terminal and picocell) is satisfied, a received power $R_{X\,pico}$ from the picocell becomes higher than a received power $R_{X\,macro}$ from the macrocell in the environment where the transmission loss occurs depending on the distance.

For this reason, in spite of configuring the offset of the received power from the macrocell so as to select the macrocell, $R_{X\,macro}+\text{Offset}<R_{X\,pico}$ is established, with the result that a picocell may possibly be selected instead of the macrocell to be selected. Furthermore, also in a case of (distance between terminal and macrocell)<(distance between terminal and picocell), the picocell may possibly be selected in the same manner.

Consider a case where the above offset is configured without executing the carrier aggregation. If (distance between terminal and macrocell)>(distance between terminal and picocell) is satisfied, the macrocell is selected by adding the offset even though the received power of the macrocell is smaller than that of the picocell.

Due to the inexecution of the carrier aggregation, however, either the macrocell or the picocell may be selected for the execution of the channel configuration, without connection to both the macrocell and the picocell. Furthermore, since the received power from the picocell is higher, the wireless channel quality with the picocell is better than that with the macrocell. Therefore, the picocell should be selected.

However, since the macrocell for executing the carrier aggregation is preferentially selected, connection is made to the macrocell having a poor wireless channel quality (or a slower wireless transmission speed).

In this manner, even though the offset is configured for a certain cell, the intended cell selection may not necessarily be able to be carried out. Furthermore, if only one offset is allowed to be configured for a certain cell, the switching of whether to execute the carrier aggregation cannot be made, making flexible operation difficult.

A case will be described where only one priority may be configured. For example, consider a case of configuring the priority of the macrocell to be higher than the priority of the picocell so as to preferentially select the P-cell at the time of cell selection with the macrocell as the P-cell and the picocell as the S-cell under the execution of the carrier aggregation. Assume that this offset is configured irrespective of the execution of the carrier aggregation.

For the simplicity of explanation, a case will be described where the received power is multiplied by the priority with the priority of the macrocell being 2 and the priority of the picocell being 1. A case will first be described where the carrier aggregation is executed and the macrocell is preferentially selected.

In this case, when (distance between terminal and macrocell)>(distance between terminal and picocell) is satisfied, a received power $R_{X\,pico}$ from the picocell becomes higher than a received power $R_{X\,macro}$ from the macrocell in the environment where the transmission loss occurs depending on the distance. To cope with this, a higher priority is configured for the macrocell, than the picocell, so as to select the macrocell.

However, $R_{X\,macro} \times P_{ri\,macro} < R_{X\,pico} \times P_{ri\,pico}$ is established, with the result that a picocell may possibly be selected instead of the macrocell to be selected. $P_{ri\,macro}$ is the priority of the macrocell, while $P_{ri\,pico}$ is the priority of the picocell. For example, if the priority of the macrocell is 2 and the priority of the picocell is 1, the picocell may possibly be selected when the received power of the macrocell is less than or equal to half of the received power of the picocell.

Consider a case where the offset is configured without executing the carrier aggregation. If (distance between terminal and macrocell)>(distance between terminal and picocell) is satisfied, the macrocell is selected by the priority even though the received power of the macrocell is smaller than that of the picocell.

Due to the inexecution of the carrier aggregation, however, either the macrocell or the picocell may be selected for the execution of the channel configuration, instead of connection to both the macrocell and the picocell. Furthermore, since the received power from the picocell is higher, the wireless channel quality with the picocell is better than that with the macrocell. Therefore, the picocell should be selected.

However, since the macrocell for executing the carrier aggregation is preferentially selected, connection is made to the macrocell having a poor wireless channel quality (or a slower wireless transmission speed).

In this manner, even though the priority is configured for a certain cell, the intended cell selection may not necessarily be carried out. Furthermore, if only one priority is allowed to be configured for a certain cell, the switching of whether to execute the carrier aggregation cannot be made, making flexible operation difficult.

In the description above, the cell selection at the time of an outgoing call has been described. Meanwhile, in the cases where the terminal is in camp-on state for a certain cell without executing data reception continuously for a certain period of time or more and where waiting for the certain cell is stopped, the terminal may move to a site different from the previous cell. In these cases, the channel is has to be updated or reconfigured and cell reselection is carried out. Similar to the first cell selection, also in the cell reselection, a picocell to act as the S-cell may be selected and a channel connection request may be issued to the picocell.

As described above, a problem of errant cell selection has existed due to establishment of the hierarchical cell structure. In this regard, according to the embodiments described above, the terminal selecting a cell not connectable as the P-cell such as a small cell for the P-cell may be allowed to perform the handover to a cell connectable as the P-cell such as a macro cell in the hierarchical cell structure. As a result, the stabilization of communication may be provided.

In the above embodiments, a case has been described where the carrier aggregation is carried out by two component carriers (i.e. one P-cell and one S-cell). It should be noted that a second and subsequent S-cells may be added so that the carrier aggregation may be carried out by three or more component carriers.

Although the case of applying the present invention to the LTE-Advanced system has been described, the present invention is applicable, for example, to a system communicating by simultaneously using plural cells (bands) in the hierarchical cell structure. Examples of such a system include DC-HSDPA and 4C-HSDPA of the W-CDMA.

In the 3GPP, the structure where cells having different cell sizes are arranged is called a heterogeneous network (HetNet), the hierarchical cell structure is also the heterogeneous network. Thus, the present invention may be carried out for a heterogeneous network.

However, in the conventional techniques described above, cell misselection may occur such as, for example, selecting, as a primary cell, a cell not supporting connection or waiting at the primary cell. That is, cell misselection may occur such as selecting a cell unsuitable for the connection or waiting.

One aspect of the present invention enables stabilization of communication to be facilitated.

Another aspect of the present application enables connection to a proper cell.

A further aspect of the present application enables connection to a proper cell among cells different in type.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
a terminal configured to perform wireless communication concurrently using a cell of a first type enabling connection without association with another cell and a cell of a second type enabling connection by being associated with the cell of the first type; and
a base station configured to form a first cell of the second type and when detecting that the terminal selects the first cell for the cell of the first type, the base station notifies the terminal of a second cell of the first type different from the first cell so as to allow the terminal to change connection to the second cell.

2. The wireless communication system according to claim 1, wherein
the base station notifies the terminal of a plurality of cells of the first type,
the terminal transmits to the base station, wireless channel qualities of the plurality of cells of the first type, and
the base station notifies the terminal of the second cell included in the plurality of cells of the first type based on the wireless channel qualities, so as to allow the terminal to change the connection to the second cell.

3. The wireless communication system according to claim 1, wherein
the base station notifies the terminal of a plurality of cells of the first type, and
the terminal changes the connection to the second cell included in the plurality of cells of the first type, based on a wireless channel qualities of the plurality of cells of the first type.

4. The wireless communication system according to claim 1, wherein
the base station allows the terminal to select the first cell as the cell of the second type.

5. The wireless communication system according to claim 1, wherein
the base station notifies the terminal of the second cell and a dedicated preamble for performing non-contention-based random access to the second cell.

6. The wireless communication system according to claim 1, wherein
the wireless communication is wireless communication concurrently using a cell of the first type and a cell of the second type at least partially included in the cell of the first type.

7. The wireless communication system according to claim 1, wherein
the wireless communication implements carrier aggregation,
the cell of the first type is a primary cell, and
the cell of the second type is a secondary cell.

8. A base station which communicates with a terminal in wireless communication system,
the base station comprising:
the base station configured to form a first cell of a second type; and
a detector configured to detect that the terminal selects the first cell for a cell of a first type; and
a transmitter configured to notify the terminal of a second cell of the first type different from the first cell so as to allow the terminal to change connection to the second cell, when the detector detects that the terminal selects the first cell for the cell of the first type, wherein
the terminal performs wireless communication concurrently using the cell of the first type enabling connection without association with another cell and a cell of the second type enabling connection by being associated with the cell of the first type.

9. A terminal comprising:
the terminal configured to perform wireless communication concurrently using a cell of a first type enabling connection without association with another cell and a cell of a second type enabling connection by being associated with the cell of the first type; and
a selector configured to select a first cell used as the cell of the first type; and
a controller configured to change connection to a second cell, when the first cell is the cell of the second type and the terminal receives from the base station forming the first cell, notification of the second cell of the first type different from the first cell.

10. A wireless communication system comprising:
a terminal configured to perform wireless communication concurrently using a cell of a first type enabling connection without association with another cell and a cell of a second type enabling connection by being associated with the cell of the first type; and a base station configured to form a second cell of the first type and when detecting that the terminal selects the second cell for the cell of the second type, the base station notifies the terminal of a first cell of the second type different from the second cell so as to allow the terminal to change connection to the first cell.

11. A base station which communicates with a terminal in a wireless communication system, the base station comprising:

the base station forming a second cell of a first type; and a detector configured to detect that a terminal selects the second cell for a cell of a second type; and a transmitter configured to notify the terminal of a first cell of the second type different from the second cell so as to allow the terminal to change connection to the first cell, when detecting that the terminal selects the second cell for the cell of the second type, wherein the terminal performs wireless communication concurrently using a cell of the first type enabling connection without association with another cell and the cell of the second type enabling connection by being associated with the cell of the first type, the base station forming the second cell of the first type.

12. A terminal comprising:

the terminal configured to perform wireless communication concurrently using a cell of a first type enabling connection without association with another cell and a cell of a second type enabling connection by being associated with the cell of the first type; and a selector configured to select a second cell used as the cell of the second type; and a controller configured to change connection to a first cell, when the selected second cell is the cell of the first type and the terminal receives from the base station forming the second cell, notification of the first cell of the second type different from the second cell.

* * * * *